(12) United States Patent
Denise

(10) Patent No.: US 8,495,499 B1
(45) Date of Patent: Jul. 23, 2013

(54) ELECTRONIC SEARCH INTERFACE TECHNOLOGY

(75) Inventor: Jason Adam Denise, Bowie, MD (US)

(73) Assignee: Shutterstock, Inc.

( * ) Notice: Subject to any disclaimer, the term of this patent is extended or adjusted under 35 U.S.C. 154(b) by 159 days.

(21) Appl. No.: 13/088,307

(22) Filed: Apr. 15, 2011

Related U.S. Application Data

(63) Continuation of application No. 12/331,406, filed on Dec. 9, 2008, now Pat. No. 7,934,161.

(51) Int. Cl.
*G06F 3/00* (2006.01)

(52) U.S. Cl.
USPC ........... 715/738; 715/739; 715/744; 707/706; 707/707; 707/708; 707/721; 707/805

(58) Field of Classification Search
USPC .................. 715/738, 739, 744; 707/706–708, 707/721, 805
See application file for complete search history.

(56) References Cited

U.S. PATENT DOCUMENTS

| | | |
|---|---|---|
| 5,761,436 A | 6/1998 | Nielsen |
| 6,012,053 A | 1/2000 | Pant et al. |
| 6,014,662 A | 1/2000 | Moran et al. |
| 6,018,342 A | 1/2000 | Bristor |
| 6,018,344 A | 1/2000 | Harada et al. |
| 6,248,946 B1 | 6/2001 | Dwek |
| 6,275,229 B1 | 8/2001 | Weiner et al. |
| 6,297,824 B1 | 10/2001 | Hearst et al. |
| 6,338,059 B1 | 1/2002 | Fields et al. |
| 6,353,448 B1 | 3/2002 | Scarborough et al. |
| 6,356,286 B1 | 3/2002 | Lawrence |
| 6,385,602 B1 | 5/2002 | Tso et al. |
| 6,404,446 B1 | 6/2002 | Bates et al. |
| 6,448,980 B1 | 9/2002 | Kumar et al. |
| 6,457,004 B1 | 9/2002 | Nishioka et al. |
| 6,460,060 B1 | 10/2002 | Maddalozzo, Jr. et al. |
| 6,480,837 B1 | 11/2002 | Dutta |
| 6,513,036 B2 | 1/2003 | Fruensgaard et al. |
| 6,523,021 B1 | 2/2003 | Monberg et al. |
| 6,633,867 B1 | 10/2003 | Kraft et al. |
| 6,658,423 B1 | 12/2003 | Pugh et al. |
| 6,667,751 B1 | 12/2003 | Wynn et al. |
| 6,693,651 B2 | 2/2004 | Biebesheimer et al. |
| 6,711,565 B1 | 3/2004 | Subramaniam et al. |
| 6,721,736 B1 | 4/2004 | Krug et al. |

(Continued)

OTHER PUBLICATIONS

Komlodi, Search History for User Support in Information-Seeking Interfaces, College of Library and Information Services/Human-Computer Interaction Laboratory, Apr. 2000.

(Continued)

*Primary Examiner* — Tadeese Hailu
(74) *Attorney, Agent, or Firm* — Jennifer Meredith, Esq.; Meredith & Keyhani, PLLC

(57) ABSTRACT

Techniques are described for displaying a representation of a list of electronic search results while a user is reviewing content linked to by electronic search results included in the list. While the user is reviewing the search results, the user may jump between content linked to by different search results using the representation of the list of electronic search results displayed. The displayed representation of the list of search results may be updated based on the user's browsing activities in reviewing the search results, user input manipulating the list of search results, and supplemental information added to the list of search results by the user.

10 Claims, 50 Drawing Sheets

U.S. PATENT DOCUMENTS

| | | | |
|---|---|---|---|
| 6,727,927 | B1 | 4/2004 | Dempski et al. |
| 6,738,766 | B2 | 5/2004 | Peng |
| 6,775,659 | B2 | 8/2004 | Clifton-Bligh |
| 6,807,539 | B2 | 10/2004 | Miller et al. |
| 6,810,395 | B1 | 10/2004 | Bharat |
| 6,826,443 | B2 | 11/2004 | Makinen |
| 6,839,702 | B1 | 1/2005 | Patel et al. |
| 6,873,982 | B1 | 3/2005 | Bates et al. |
| 6,925,608 | B1 | 8/2005 | Neale et al. |
| 6,987,513 | B2 | 1/2006 | Dewa et al. |
| 7,089,237 | B2 | 8/2006 | Turnbull et al. |
| 7,290,223 | B2 | 10/2007 | Decombe |
| 7,552,398 | B2 | 6/2009 | Bier et al. |
| 7,599,950 | B2 | 10/2009 | Walther et al. |
| 7,657,100 | B2 * | 2/2010 | Gokturk et al. ............... 382/209 |
| 2002/0112012 | A1 | 8/2002 | Jones et al. |
| 2004/0003351 | A1 | 1/2004 | Sommerer et al. |
| 2004/0162820 | A1 | 8/2004 | James et al. |
| 2005/0234891 | A1 | 10/2005 | Walther et al. |
| 2005/0234940 | A1 | 10/2005 | Apparao et al. |
| 2005/0256867 | A1 | 11/2005 | Walther et al. |
| 2005/0257131 | A1 | 11/2005 | Lim et al. |
| 2006/0004713 | A1 | 1/2006 | Korte et al. |
| 2006/0184512 | A1 | 8/2006 | Kohanim et al. |
| 2006/0224587 | A1 | 10/2006 | Zamir et al. |
| 2006/0224938 | A1 | 10/2006 | Fikes et al. |
| 2006/0224997 | A1 | 10/2006 | Wong et al. |
| 2006/0282416 | A1 | 12/2006 | Gross et al. |
| 2007/0022135 | A1 | 1/2007 | Malik |
| 2007/0043706 | A1 | 2/2007 | Burke et al. |
| 2007/0050734 | A1 | 3/2007 | Busey |
| 2007/0112738 | A1 | 5/2007 | Livaditis |
| 2007/0112758 | A1 | 5/2007 | Livaditis |
| 2007/0118811 | A1 | 5/2007 | Tsuchimura et al. |
| 2007/0130126 | A1 | 6/2007 | Lucovsky et al. |
| 2007/0143694 | A1 | 6/2007 | Rakowski et al. |
| 2007/0204232 | A1 | 8/2007 | Ray et al. |
| 2007/0219962 | A1 | 9/2007 | Noirot-Nerin |
| 2007/0250478 | A1 | 10/2007 | Copperman |
| 2007/0266342 | A1 | 11/2007 | Chang et al. |
| 2007/0271230 | A1 | 11/2007 | Hart et al. |
| 2008/0021880 | A1 | 1/2008 | Ren et al. |
| 2008/0033970 | A1 | 2/2008 | Jones et al. |
| 2008/0034381 | A1 * | 2/2008 | Jalon et al. .................... 719/329 |
| 2008/0072180 | A1 | 3/2008 | Chevalier et al. |
| 2008/0086457 | A1 | 4/2008 | Fei et al. |
| 2008/0104042 | A1 | 5/2008 | Gutt et al. |
| 2009/0234811 | A1 | 9/2009 | Jamil et al. |
| 2009/0282023 | A1 | 11/2009 | Bennett |

OTHER PUBLICATIONS

Twidale et al., Collaborative Browsing and Visualisation of the Search Process, Cooperative Systems Engineering Group, Technical Report : CSEG/3/1996, Mar. 1996.

Tan et al., Mining Long-Term Search History to Improve Search Accuracy, Department of Computer Science University of Illinois at Urbana-Champaign, Aug. 2006.

Liu et al., Personalized Web Search for Improving Retrieval Effectiveness, Department of Computer Science University of Illinois at Chicago, Department of Computer Science SUNY at Binghamton, NY, Jan. 2004.

Tamine et al., Inferring the user interests using the search history, IRIT-SIG, 2006.

Liu et al., Personalized Web Search by Mapping User Queries to Categories, ACM, Nov. 2002.

Teevan et al., Personalizing Search via Automated Analysis of Interests and Activities, ACM, SIGIR, Aug. 2005.

Camp et al., An Adaptive Visual Interface for Collaborative Knowledge Communities, Emergent Information Systems Laboratory the University of Calgary, Jul. 2007.

Camp et al., In-Order: Enhancing Google via Stigmergic Query Refinement, International Journal of Computer Systems Science and Engineering, vol. 22 No. 4, Jul. 2007.

Gauch et al., ProFusion: Intelligent Fusion from Multiple, Distributed Search Engines, Journal of Universal Computer Science, vol. 2, No. 9, Sep. 1996.

Brin et al., The Anatomy of a Large-Scale Hypertextual Web Search Engine, Computer Networks and ISDN Systems vol. 30, Issues 1-7, Apr. 1998.

Dupont, SearchWiki: make search your own, available at http://googleblog.blogspot.com/2008/11/searchwiki-makesearch-your-own.html, Nov. 2008.

Daoud et al., Learning Implicit User Interests Using Ontology and Search History for Personalization, Web Information Systems Engineering—WISE 2007 Workshops, Nov. 2007.

Lüer et al., Collaborative Web Search with WikiLinks, IEEE Computer Society, Apr. 2009.

* cited by examiner

4900

| | Result | Sub-Element | Comment | Clip | Status | Other Search |
|---|---|---|---|---|---|---|
| 4910 | \multicolumn{6}{c|}{Search 1 – Query 1} |
| | Result 1 | LINK3 | No | No | Reviewed | No |
| | LINK3 | No | No | No | Reviewed | No |
| | Result 2 | No | No | No | Removed | Search 2 |
| | Result 3 | No | No | Yes, File1 | Reviewed | Search 3 |
| | Result 4 | No | No | No | Reviewed | Search 2 & 3 |
| | Result 5 | LINK1, LINK2 | Yes, File2 | No | Reviewed | Search 3 |
| | LINK1 | Media File | No | No | Reviewed | No |
| | Media File | No | No | No | Reviewed | No |
| | LINK2 | No | No | No | Reviewed | No |
| | Result 6 | No | No | No | Unreviewed | Search 2 & 3 |
| | Result 7 | No | No | No | Reviewed | No |
| 4920 | \multicolumn{6}{c|}{Search 2 – Query 2} |
| | Result 8 | No | No | No | Reviewed | No |
| | Result 6 | No | No | No | Reviewed | Search 1 & 3 |
| | Result 9 | No | No | No | Unreviewed | Search 3 |
| | Result 2 | No | No | No | Unreviewed | Search 1 |
| | Result 10 | No | No | No | Unreviewed | No |
| | Result 4 | No | No | No | Unreviewed | Search 1 & 3 |
| 4930 | \multicolumn{6}{c|}{Search 3 – Query 3} |
| | Result 11 | No | No | No | Reviewed | No |
| | Result 12 | No | No | No | Unreviewed | No |
| | Result 13 | No | No | No | Unreviewed | No |
| | Result 4 | No | No | No | Unreviewed | Search 1 & 2 |
| | Result 6 | No | No | No | Unreviewed | Search 1 & 2 |
| | Result 3 | No | No | No | Unreviewed | Search 1 |
| | Result 5 | No | No | No | Unreviewed | Search 1 |
| | Result 9 | No | No | No | Unreviewed | Search 2 |

Fig. 49

ELECTRONIC SEARCH INTERFACE TECHNOLOGY

CROSS-REFERENCE TO RELATED APPLICATION(S)

This application is a continuation of U.S. application Ser. No. 12/331,406, filed Dec. 9, 2008, which is incorporated by reference herein in its entirety for all purposes.

FIELD

This document relates to electronic search interface technology.

BACKGROUND

An electronic search provider may enable a user to submit a search query related to information in which the user is interested. In response to the submitted search query, the electronic search provider identifies electronic documents that match the submitted search query and displays the matching electronic document as a list of search results.

SUMMARY

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

FIG. 49 is a diagram of an example data structure.

DETAILED DESCRIPTION

Techniques are described for displaying a representation of a list of electronic search results while a user is reviewing content linked to by electronic search results included in the list. While the user is reviewing the search results, the user may jump between content linked to by different search results using the representation of the list of electronic search results displayed. The displayed representation of the list of search results may be updated based on the user's browsing activities in reviewing the search results, user input manipulating the list of search results, and supplemental information added to the list of search results by the user.

Figure 1:
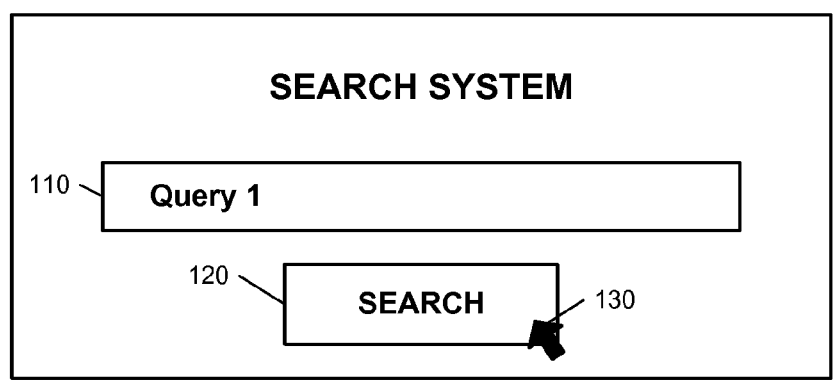
FIGS. 1-4, 7, 8, 10, 12, 13, 15, 17, 19, 20, 22-24, 26-28, 30, 32, 34, 35, 38, 40, 42, 44, and 46 illustrate examples of user interfaces.

Referring to FIG. 1, an interface 100 of a search system includes an input field 110 and a search control 120. The input field 110 enables a user to enter a search query that includes one or more terms and parameters (e.g., logical operators) defining the desired analysis of the search query. When a user selects the search control 120 using, for example, an input device 130, the search system performs a search using the search query entered in the input field 110 and displays results of the search to the user.

Figure 2:
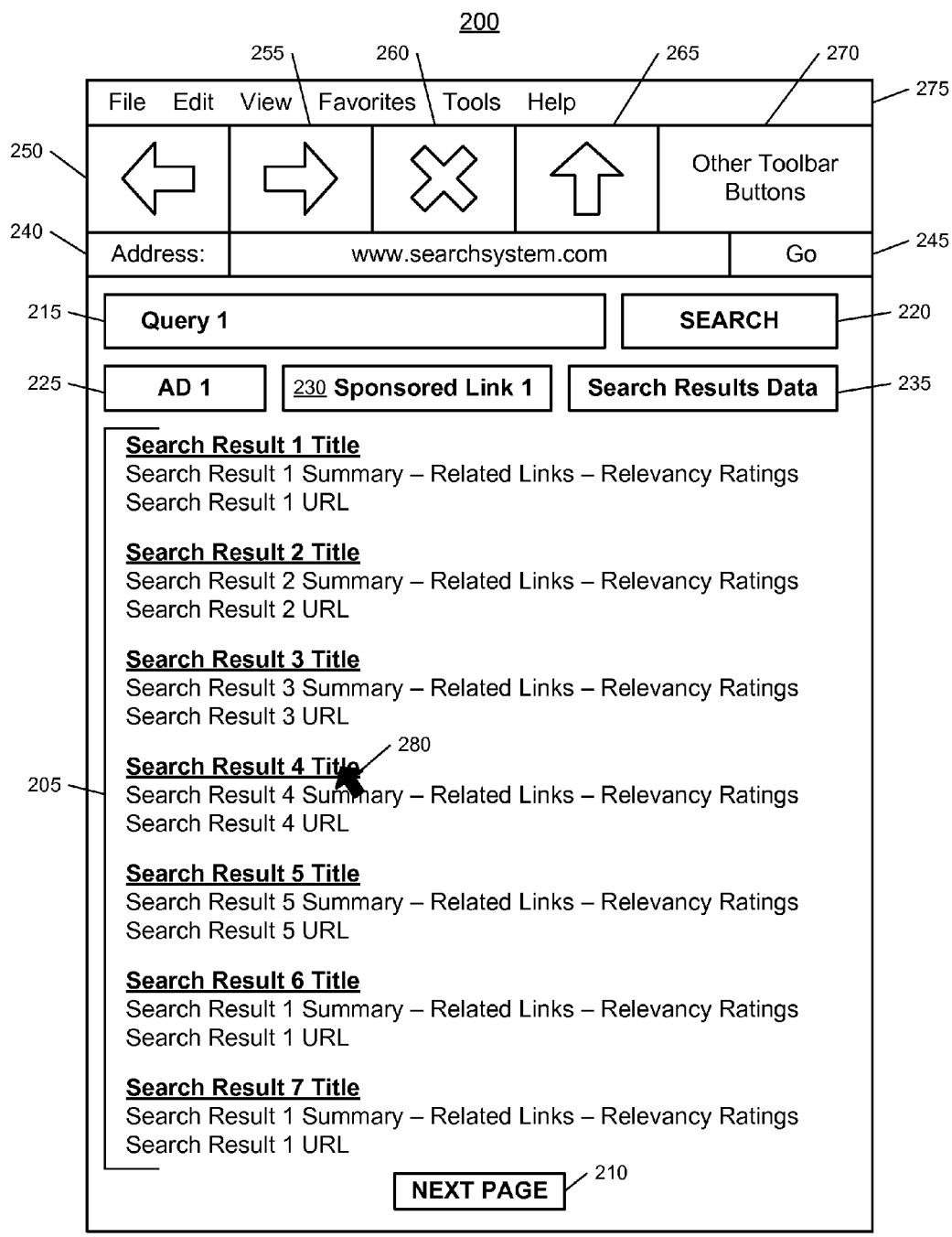

FIG. 2 illustrates an interface 200 that displays search results identified in response to a search query entered by a user. The interface 200 includes a list of search results 205. Each search result included in the list 205 links to electronic content associated with the search result and enables the user to view or link to the associated electronic content upon selection of the search result. Each search result also includes description information that is descriptive of the search result and its relevancy to the entered search query. The description information may include a summary, related links, relevancy ratings, a uniform resource locator (URL), etc.

The interface 200 also includes a next page input control 210 that enables a user to view more search results that are responsive to the search query and that are not displayed on the current page. The interface 200 further includes an input query field 215 and a search control 220. The input query field 215 and the search control 220 may be similar to the input field 110 and the search control 120 described above with respect to FIG. 1. In some implementations, the interface 200 includes an advertisement 225, one or more sponsored links 230, and search results data 235. The advertisement 225 and the one or more sponsored links 230 may be selected based on the search query to which the list of search results 205 is responsive and contextually targeted to information the user is seeking. The search results data 235 may include data related to the list of search results 205 (e.g., the number of results) and/or data related to the search process (e.g., the time it took to identify the search results).

As shown, the interface 200 is displayed in the context of a browser and includes several browser controls. For instance, the interface 200 includes an address input field 240 and a go input control 245. The address input field 240 enables a user to enter a network address and, when a user selects the go input control 245, the browser accesses and displays electronic content (e.g., a web page) associated with the network address entered into the address input field 240. The interface 200 also includes a back input control 250 that, when selected, causes the browser to access and display electronic content (e.g., web page) displayed immediately prior to the current electronic content (e.g., web page) in the user's browsing history, a forward input control 255 that, when selected, causes the browser to access and display the electronic content (e.g., web page) displayed immediately after the current electronic content (e.g., web page) in the user's browsing history, a stop input control 260 that, when selected, causes the browser to stop accessing and displaying content the browser is currently attempting to access and display, and a refresh input control 265 that, when selected, causes the browser to re-access and display the electronic content (e.g., web page) currently displayed. The interface 200 may include other toolbar buttons 270 and a menu list 275 that includes other input controls that enable a user to control the browser.

As shown in FIG. 2, a user input icon 280 may be displayed and manipulated by a user (e.g., using a mouse) to select a search result included in the list of search results 205. For example, the user input icon 280 may be positioned over Search Result 4 when the user provides user input of a selection command. In this example, the user input results in selection of Search Result 4. In response to the selection, the browser may access electronic content associated with the Search Result 4 and update a display based on the selection.

Figure 3:
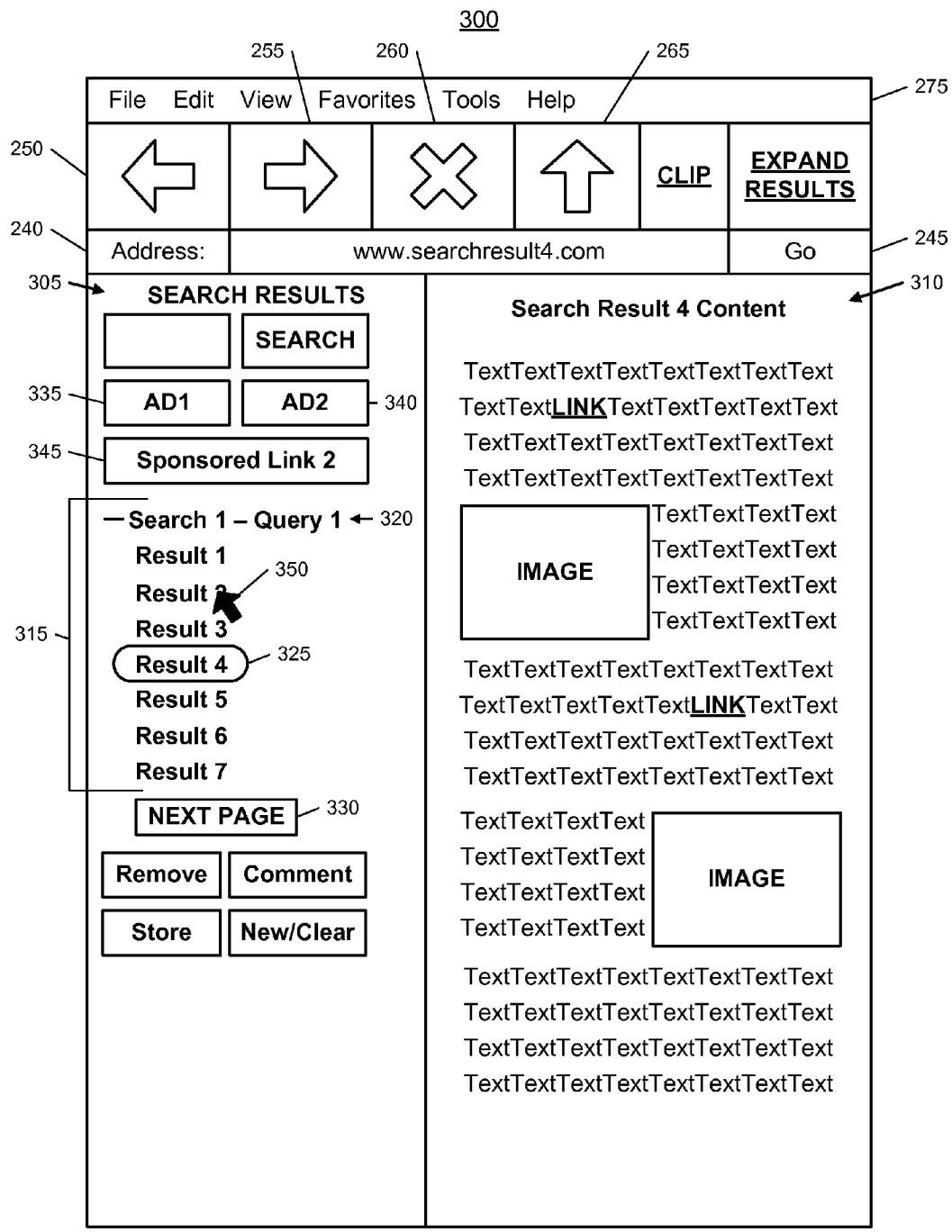

FIG. 3 illustrates an interface 300 that may be displayed in response to selection of a search result (e.g., Search Result 4) in the interface 200. The interface 300 includes a search results portion 305 and a content portion 310. The search results portion 305 provides a representation of the search results included in the list of search results 205 while the content portion 310 displays a representation of content corresponding to a selected search result. By displaying the list of search results 205 concurrently with content corresponding to a selected search result, the interface 300 enables a user to perceive search results (and other information related to the search results) as the user reviews content corresponding to the search results. In this regard, the interface 300 may provide an enhanced user experience by making search results review more efficient and allowing the user to review additional search results and monitor which results the user has reviewed without having to navigate back to the list of search results 205 displayed directly in response to entry of a search query.

The search results portion 305 includes a list of search results 315, a search identifier 320, a displayed result indicator 325, a next page interface control 330, a first advertisement 335, a second advertisement 340, and a sponsored link 345. The list of search results 315 represents a reformatted version of the list of search results 205 displayed directly in response to entry of the Query 1. Each search result included in the list 315 links to electronic content associated with the search result and enables the user to view or link to the associated electronic content upon selection of the search result. As shown, the search results included in the list 315 each have a result identifier that identifies individual search results included in the list 315, but have reduced description information from the list of search results 205. The reduced description information or reformatted identification of the search results may enable the search results to be displayed concurrently with content.

The search identifier 320 identifies a number of the search within a particular search session (e.g., Search 1) to which the list of search results 315 corresponds and also identifies the query (e.g., Query 1) to which the list of search results 315 is responsive. The search identifier 320 is associated with a control element that enables a user to expand (e.g., enable display) or minimize (e.g., hide from display) the list of search results 315.

The displayed result indicator 325 provides a visual indication of which search result included in the list of search results 315 is associated with the content displayed in the content portion. As shown, the displayed result indicator 325 identifies Result 4 to indicate that Result 4 is the currently selected search result for which content is displayed.

The next page interface control 330 updates the list of search results 315 with additional results upon user selection. For instance, in response to selection of the next page interface control 330, results one to seven may be removed from display and replaced with seven different search results that have the next seven highest relevancy ratings with respect to Query 1 of the results identified in the search process performed upon entry of Query 1.

In addition, the update of the list of search results 315 that occurs in response to selection of the next page interface control 330 may be based on browsing activities of the user in reviewing the list of search results 315. For example, the list of search results 315 may be updated by maintaining the search results that have been reviewed by the user and replacing the search results that have not been reviewed with new results (e.g., move Result 4 to the top of the list 315, remove Results 1-3 and 5-7, and add six new results to the list 315 when the next page interface control 330 is selected as shown in FIG. 3). Alternatively, the list of search results 315 may be updated by maintaining the search results that have not been reviewed by the user and replacing the search results that have been reviewed with new results (e.g., remove Result 4 from the list 315 and add one new result to the bottom of the list 315 when the next page interface control 330 is selected as shown in FIG. 3).

The first advertisement 335 may be an advertisement targeted based on the search query entered (e.g., the same as the advertisement 225) and the second advertisement 340 may be an advertisement targeted based on the search result selected (e.g., targeted specifically based on the user selection of Result 4) on based on a combination of the search query entered and the search result selected. The sponsored link 345 may be a sponsored link that is selected based on the search query entered and/or the search result selected. By maintaining display of advertisements and sponsored links while a user reviews search results and targeting the displayed advertisements and sponsored links based on the user's review of the search results, a search provider (or a search results interface provider) may be able to drive additional revenue based on the increased opportunity to display (and update) advertisements to a user as the user reviews search results.

The content portion 310 displays a representation of electronic content corresponding to a selected search result (e.g., Result 4). The electronic content may include text content, image content, video content, links (e.g., hyperlinks), or any other type of electronic content. For instance, the electronic content may be a web page, a web site, or any other type of content made available over a network, such as the Internet.

As shown in FIG. 3, a user input icon 350 may be displayed and manipulated by a user (e.g., using a mouse) to select a search result included in the list of search results 315. For example, the user input icon 350 may be positioned over Result 2 when the user provides user input of a selection command. In this example, the user input results in selection of Result 2. In response to the selection, the browser may access electronic content associated with the Result 2 and update a display based on the selection.

Figure 4:
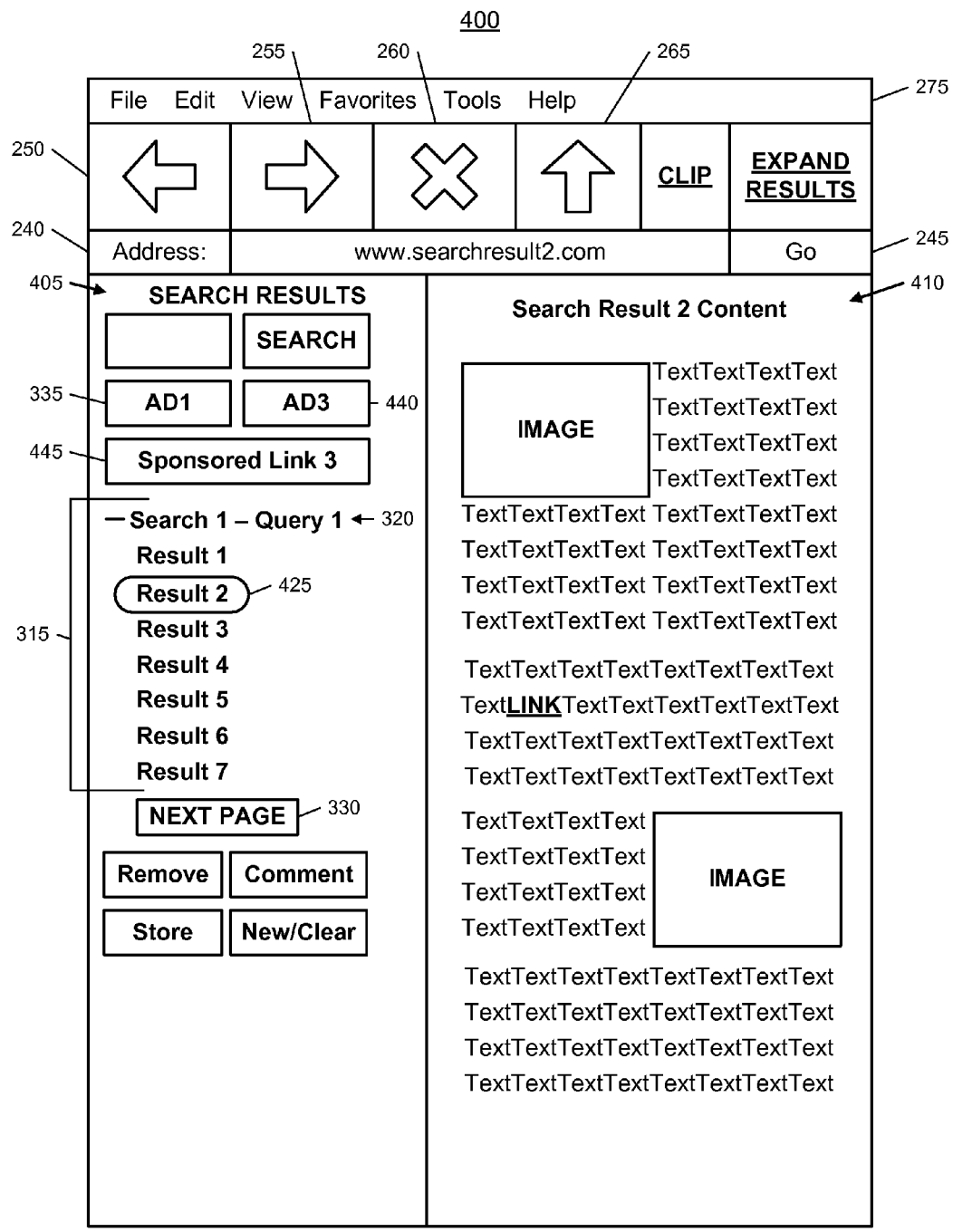

FIG. 4 illustrates an interface 400 that may be displayed in response to selection of a search result (e.g., Result 2) in the interface 300. The interface 400 includes a search results portion 405 and a content portion 410, each of which has been updated based on the selection of Result 2 while the user was reviewing electronic content corresponding to Result 4. For instance, the updated items in the search results portion 405 include a displayed result indicator 425, a second advertisement 440, and a sponsored link 445. As shown, the displayed result indicator 425 has been updated and now identifies Result 2 to indicate that Result 2 is the currently selected search result for which content is displayed. The second advertisement 440 and the sponsored link 445 represent a new advertisement and a new sponsored link that have been selected based on the user's selection of Result 2.

The content portion 410 displays a representation of electronic content corresponding to a selected search result (e.g., Result 2). In response to the selection of Result 2 in the interface 300, the electronic content associated with Result 2 may be accessed and displayed in the content portion 410 to replace the electronic content associated with Result 4.

Figure 5:
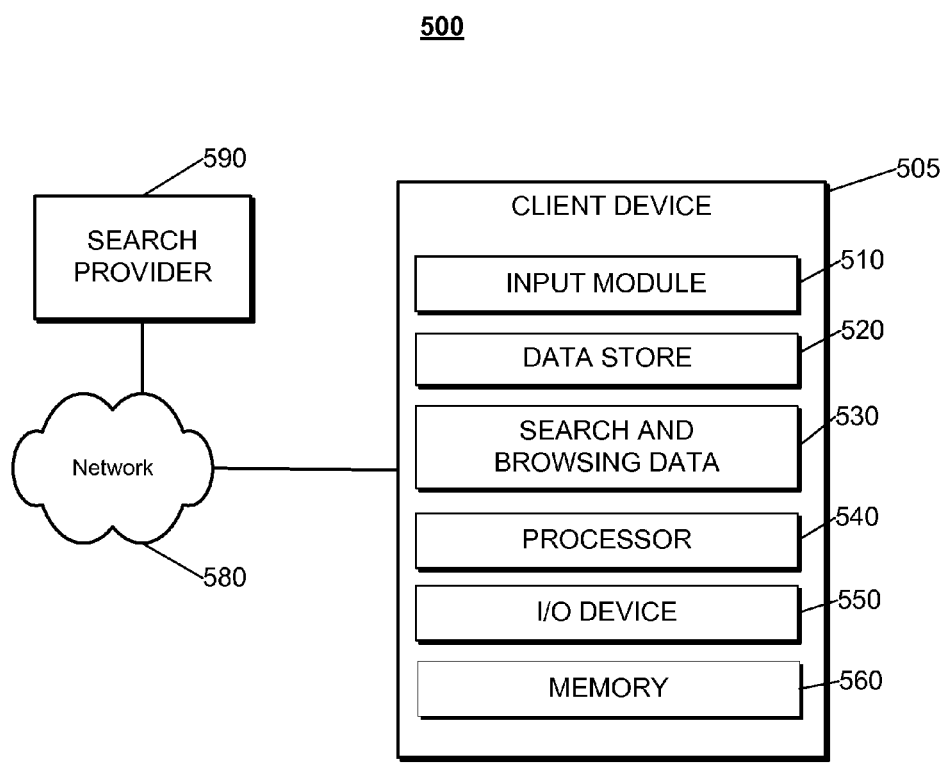
FIGS. 5 and 50 depict examples of electronic search systems.

Referring to FIG. 5, a block diagram of an electronic search system 500 is shown. The system 500 includes a client device 505, a network 580, and a search provider 590. The network 580 enables the client device 505 and the search provider 590 to exchange electronic communications.

The client device 505 includes an input module 510, a data store 520, search results and browsing data 530, a processor 540, an input/output (I/O) device 550, and a memory 560. The client device 505 may be used to display search results to a user. The client device 505 may be a portable device or a desktop computer. The client device 505 may be implemented within hardware or a combination of hardware and software.

The input module 510 imports data associated with search interfaces. The data may include data resulting from a search process. The data also may include data related to interface settings that are used in displaying search results. The input module 510 may input data from a device (e.g., the search provider 590) connected to the network 580. In some implementations, the input module 510 reformats and/or transforms the data such that the data may be processed and stored by other components within the client device 505.

The client device 505 also includes a data store 520. In some implementations, data from the input module 510 is stored in the data store 520. The data store 520 may be, for example, a database that logically organizes data into a series of database tables. The data store 520 may be a hard disk drive, non-volatile memory (e.g., Flash memory), or another type of electronic storage device.

The client device 505 also includes search results and browsing data 530. The search results and browsing data 530 may include search results responsive to a query entered by a user using the client device 505. The search results and browsing data 530 also may include data reflecting the browsing activity of a user reviewing the electronic search results using the client device 505 (e.g., whether the user has accessed search results, links selected by the user when reviewing the search results, etc.). The data 530 may be associated with particular queries entered using the client device 505 and may include data for many queries entered using the client device 505. Queries may be grouped based on search sessions to enable users to access results and browsing data for multiple queries at the same time. In addition, the results and browsing data 530 may include supplemental information (e.g., clipped content, comments, etc.) added to the electronic search results by a user reviewing the search results. In some implementations, the results and browsing data 530 may be received, by the client device 505, from the search provider 590, or may be stored, at least partially, by the search provider 590.

The client device 505 also includes a processor 540. The processor 540 may be a processor suitable for the execution of a computer program such as a general or special purpose microprocessor, and any one or more processors of any kind of digital computer. Generally, a processor receives instructions and data from a read-only memory or a random access memory or both. The processor 540 receives instructions and data from the components of the client device 505 to, for example, display interfaces related to search results and a user's review of the search results. In some implementations, the client device 505 includes more than one processor.

The client device 505 further includes the I/O device 550, which is configured to allow a user selection. For example, the I/O device 550 may be a mouse, a keyboard, a stylus, a touch screen, a track ball, a toggle control, one or more user input buttons, a microphone, or any other device that allows a user to input data into the client device 505 or otherwise communicate with the client device 505. In some implementations, the user may be a machine and the user input may be received from an automated process running on the machine. In other implementations, the user may be a person.

The I/O device 550 also may include a device configured to output electronic search results interfaces. For instance, the I/O device 550 may include a display device configured to display graphical user interfaces (e.g., the user interfaces shown in FIGS. 1-4, 7, 8, 10, 12, 13, 15, 17, 19, 20, 22-24, 26-28, 30, 32, 34, 35, 38, 40, 42, 44, and 46) that enable a user to perceive electronic search results information and enable a user to interact with the client device 505. The I/O device 550 also may include a speaker configured to provide audible output related to search results information (e.g., audible electronic content or alerts).

The client device 505 also includes a memory 560. The memory 560 may be any type of tangible machine-readable storage medium. The memory 560 may, for example, store the data included in the data store 520. In some implementations, the memory 560 may store instructions that, when executed, cause the client device 505 to, for example, process and display search results information concurrently with electronic content.

The search system 500 also includes a network 580. The network 580 is configured to enable exchange of electronic communications between devices connected to the network 580. For example, the network 50 may be configured to enable exchange of electronic communications between the client device 505 and the search provider 590. The network 580 may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (DSL)), radio, television, cable, satellite, or any other delivery or tunneling mechanism for carrying data. Network 580 may include multiple networks or subnetworks, each of which may include, for example, a wired or wireless data pathway. The network 580 may include a circuit-switched network, a packet-switched data network, or any other network able to carry electronic communications. For example, the network 580 may include networks based on the Internet protocol (IP) or asynchronous transfer mode (ATM).

The search provider 590 is an electronic device configured to execute programs and exchange communications with the client device 505 (e.g., multiple client devices) over the network 580. For example, the search provider 590 may be configured to execute a program that performs searching operations. In this example, the search provider 590 may exchange communications with the client device 505 to receive input associated with search queries and provide search results output to the client device 505.

Although the example client device 505 is shown as a single integrated component, one or more of the modules and applications included in the client device 505 may be implemented separately from the device 505 but in communication with the device 505. For example, the data store 520 may be implemented on a centralized server that communicates and exchanges data with the client device 505. In this example, the search provider 590 may communicate with the client device 505 and perform operations described throughout the disclosure as being performed by the client device 505 or may perform operations that assist in the client device 505 in performing described operations.

FIGS. 6, 9, 11, 14, 16, 18, 21, 25, 29, 31, 33, 36, 37, 39, 41, 43, 45, 47, and 48 illustrate example processes. The operations of the example processes are described generally as being performed by the search system 500. The operations may be performed exclusively by the client device 505, may be performed exclusively by the search provider 590, or may be performed by a combination of the client device 505 and the search provider 590. In some implementations, operations of the example processes may be performed by one or more processors included in one or more electronic devices.

Figure 6:
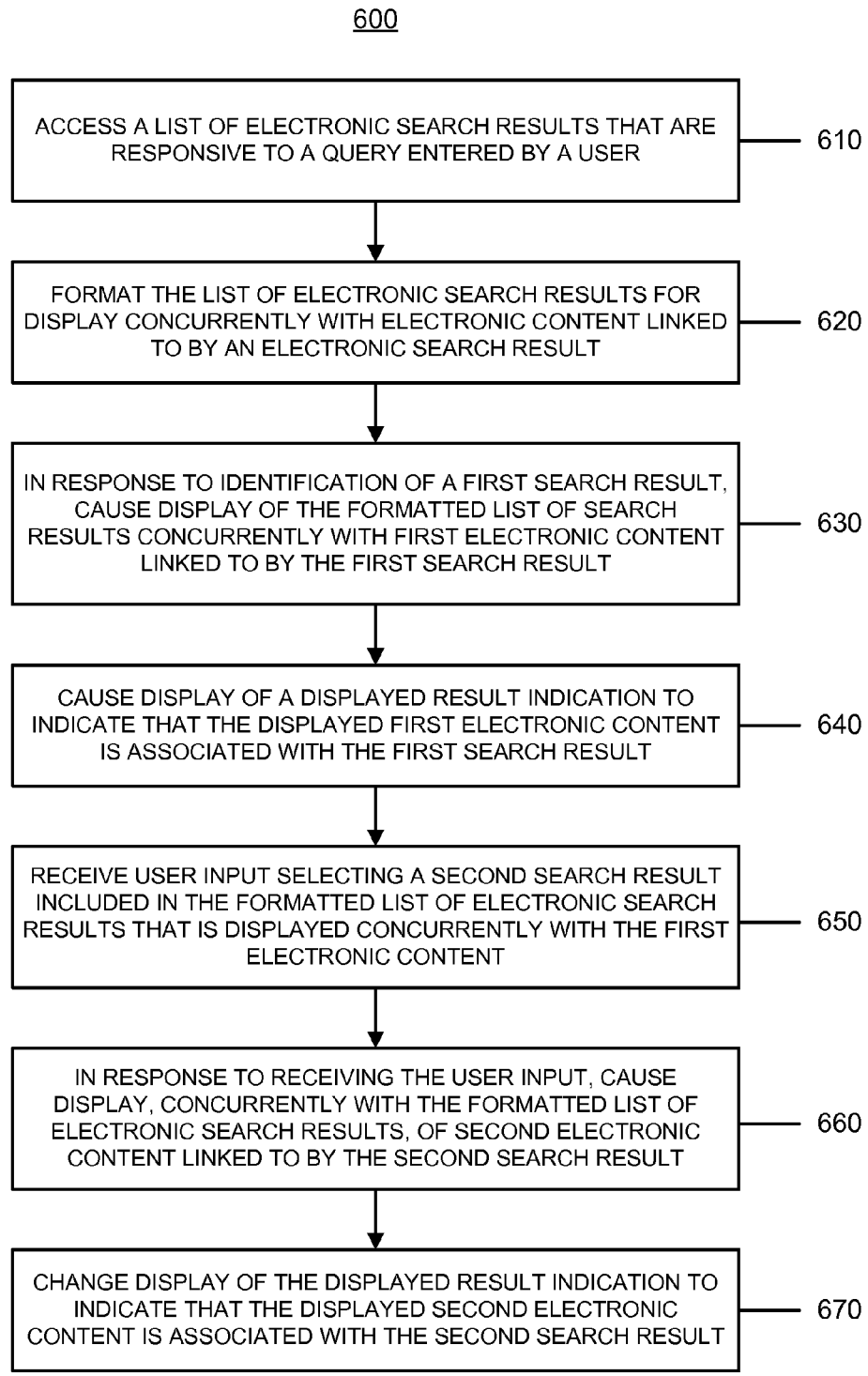
FIGS. 6, 9, 11, 14, 16, 18, 21, 25, 29, 31, 33, 36, 37, 39, 41, 43, 45, 47, and 48 are flowcharts of example processes.

FIG. 6 illustrates an example of a process 600 for displaying search results. The search system 500 accesses a list of electronic search results that are responsive to a query entered by a user (610). For example, the search system 500 may perform a search of electronic content based on the query and identify a list of electronic search results that are responsive to the query. The search system 500 also may submit the query to a search engine and receive a list of electronic search results identified by the search engine.

In some implementations, the search system 500 accesses a list of electronic search results that are displayed to the user in a browser interface on the display device in response to the query entered by the user. For instance, the search system 500 may access the list of search results 205 displayed in the interface 200 in response to user submission of a query.

The search system 500 formats the list of electronic search results for display concurrently with electronic content linked to by an electronic search result (620). For example, the search system 500 formats display of the list of electronic search results for display in a search results portion of a user interface that may be displayed concurrently with content corresponding to a search result. In this example, the search system 500 may reduce a display size of search result information, remove information from the list of search results to reduce the display size, and/or modify information included in the list of search results to reduce the display size. The formatting of the list of search results may occur prior to initial presentation of the list of search results or in response to user selection of a search result included in the list of search results.

FIG. 3 illustrates an example of a formatted list of electronic search results displayed concurrently with electronic content linked to by an electronic search result. As shown in FIG. 3, the list of electronic search results 205 has been reformatted as the list of search results 315 to reduce a size of the list of electronic search results 205. In reformatting the list of electronic search results 205, result description information that is associated with the electronic search results 205 and that describes the electronic search results has removed (e.g., the summary, related links, relevancy ratings, and URL have been removed) and titles of the search results have been modified (e.g., Search Result 1 Title has been modified to Result 1). The amount of information removed may correspond to a size of the search results portion 305 and preferences of the user.

Referring to FIG. 6, in response to identification of a first search result, the search system 500 causes display of the formatted list of search results concurrently with first electronic content linked to by the first search result (630). The identification of a first search result may involve user selection of a search result (e.g., user selection of the Search Result 4 in FIG. 2) and the formatted list of search results may be displayed concurrently with electronic content linked to by the user-selected search result (e.g., the Search Result 4 Content shown in FIG. 3). In other examples, a first search result may be automatically identified without human intervention. In these examples, when the formatted list of search results is displayed upon initial presentation of the list of search results, the search system 500 may identify the search result that is most relevant to the query and the formatted list of search results may be displayed concurrently with electronic content linked to by the search result that is most relevant to the query (e.g., the interface 300 shown in FIG. 3 may be displayed initially in response to a query, but with content associated with Result 1).

In some implementations, causing display of the formatted list of search results concurrently with first electronic content may included segmenting a browser interface on a display device into a search results portion and a content portion (e.g., as shown by the difference in FIGS. 2 and 3). In these implementations, the search results portion and the content portion may each be smaller in size than the browser interface when displaying the list of electronic search results initially in response to the query entered by the user. A reformatted list of electronic search results may be displayed in the search results portion of the browser interface, and the first electronic content linked to by the first search result may be displayed in the content portion of the browser interface.

The search system 500 causes display of a displayed result indication to indicate that the displayed first electronic content is associated with the first search result (640). The displayed result indication may identify a displayed representation of the first search result in the formatted list of electronic search results and, thereby, indicate that the first electronic content is associated with the first search result (e.g., the displayed result indicator 325 shown in FIG. 3). The displayed result indication may include any type of visual indication (e.g., highlighting, a change in color, a graphical symbol or icon, a text indication, etc.). The displayed result indication also may be displayed in any portion of the user interface.

The search system 500 receives user input selecting a second search result included in the formatted list of electronic search results that is displayed concurrently with the first electronic content (650). For instance, the search system 500 receives a user input command (e.g., a keyboard/keypad button press, a mouse click, a touch screen input, etc.) that selects a second search result included in the formatted list of electronic search results while the formatted list of electronic search results is displayed concurrently with content from another of the electronic search results (e.g., user selection of Result 2 as shown in FIG. 3).

In response to receiving the user input, the search system 500 causes display, concurrently with the formatted list of electronic search results, of second electronic content linked to by the second search result (660). For instance, the search system 500 causes a browser to access, over a network, second electronic content linked to by a URL of the second search result and display the second electronic content in a content portion of the browser (e.g., as shown in content portion 410 of FIG. 4). The search system 500 may change display, in a content portion of a browser interface on the display device, of the first electronic content linked to by the first search result to the second electronic content linked to by the second search result and may maintain display, in a search results portion of the browser interface on the display device, of the reformatted list of electronic search results.

The search system 500 changes display of the displayed result indication to indicate that the displayed second electronic content is associated with the second search result (670). For example, the search system 500 may update the displayed result indication to identify a displayed representation of the second search result in the formatted list of electronic search results (e.g., rather than the first search result) and, thereby, indicate that the second electronic content is associated with the second search result (e.g., as shown by the updated displayed result indicator 425 shown in FIG. 4). The search system 500 may change display of the displayed result indication by removing the prior displayed result indication and displaying a new displayed result indication for the second search result.

Figure 7:
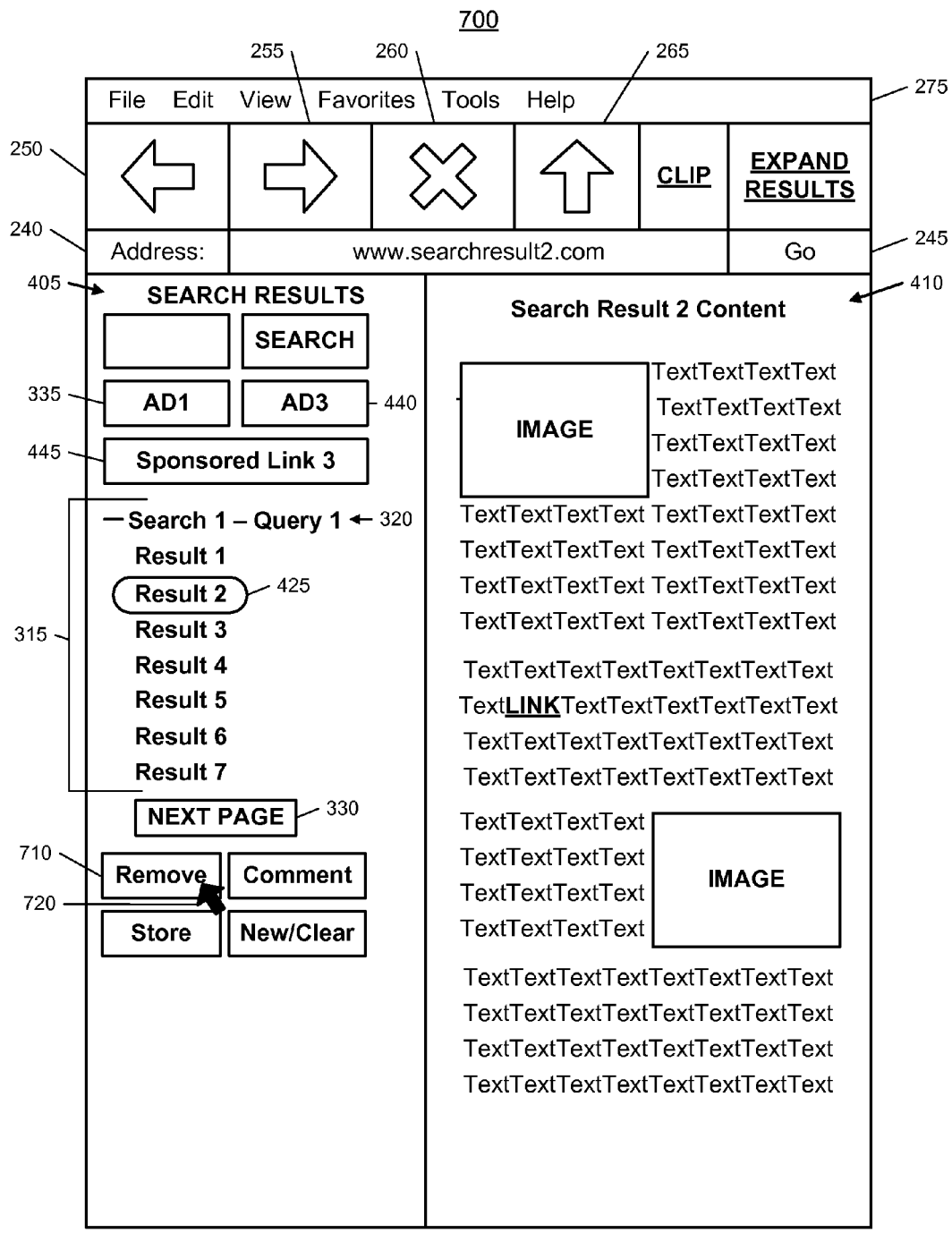

FIG. 7 illustrates an interface 700 that includes a remove interface control 710. The remove interface control 710 enables a user to remove a search result from the list of search results 315 by selecting the remove interface control 710 when the search result is currently selected. For instance, after a user reviews a search result and determines that the content associated with the search result is not relevant or redundant to the user's inquiry, the user may use the remove interface control 710 to remove the search result from the list 315. In this regard, the user may reduce the number of results in the list (e.g., keep only the most relevant results) and, thereby, may enhance convenience of the user's further review.

As shown in FIG. 7, a user input icon 720 may be displayed and manipulated by a user (e.g., using a mouse) to select the remove interface control 710 when Result 2 is currently selected. For example, the user input icon 720 may be positioned over the remove interface control 710 when the user provides user input of a selection command and content from Result 2 is currently selected. In response to the selection, the browser may remove Result 2 from the list of electronic search results 315.

Figure 8:
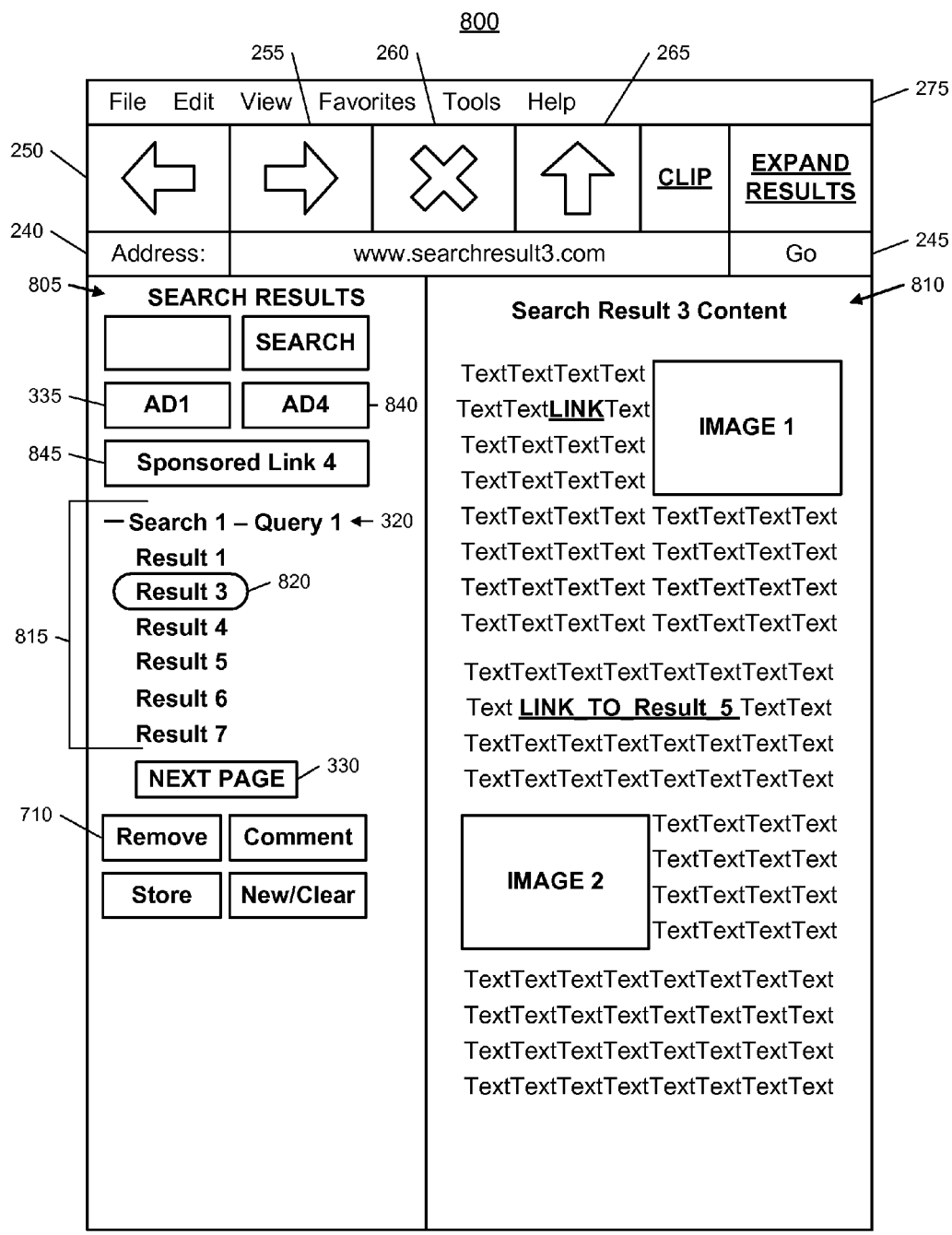

FIG. 8 illustrates an interface 800 that may be displayed in response to selection of a remove interface control 710 in the interface 700. The interface 800 includes a search results portion 805 and a content portion 810, each of which has been updated based on the removal of Result 2. For instance, the updated items in the search results portion 805 include an updated list of search results 815 that no longer includes Result 2, a displayed result indicator 820, an advertisement 840, and a sponsored link 845. As shown, the displayed result indicator 820 has been updated and now identifies Result 3 to indicate that Result 3 is the currently selected search result for which content is displayed. Result 3 was automatically selected upon removal of Result 2 because Result 3 was the result immediately following Result 2 in the list of search results 315. Other techniques may be used to automatically select a new search result upon removal of a search result (e.g., the user's tracked review of the search results (discussed in more detail below) may be used to select the new search result). The advertisement 840 and the sponsored link 845 represent a new advertisement and a new sponsored link that have been selected based on the selection of Result 3.

The content portion 810 displays a representation of electronic content corresponding to a selected search result (e.g., Result 3). In response to the selection of Result 3 upon removal of Result 2, the electronic content associated with Result 3 may be accessed and displayed in the content portion 810 to replace electronic content associated with Result 2.

Figure 9:
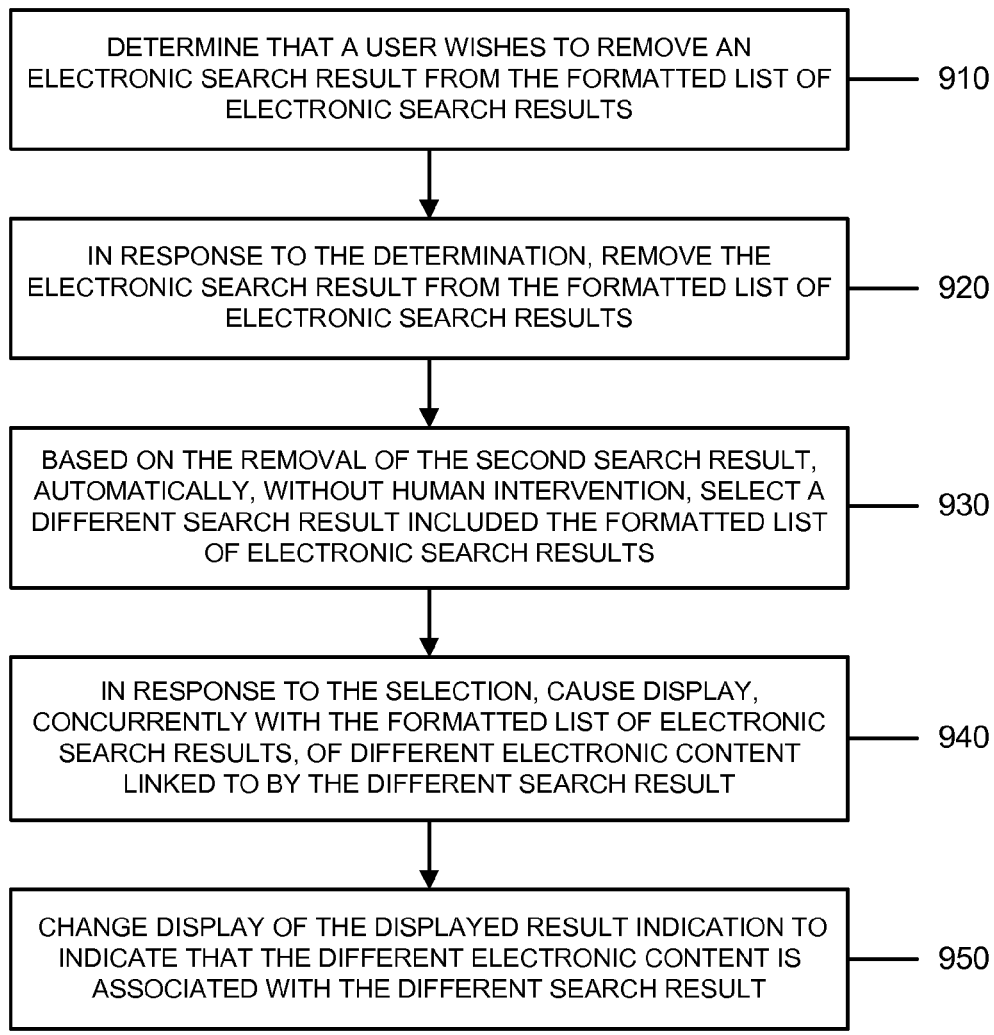

FIG. 9 illustrates an example of a process 900 for enabling removal of a search result. The search system 500 determines that a user wishes to remove an electronic search result from the formatted list of electronic search results (910). The search system 500 may determine that a user wishes to remove an electronic search result based on explicit user input provided by the user. For instance, as discussed above with respect to FIG. 7, the search system 500 may receive user input selecting a remove interface control or some other type of user input that explicitly identifies a search result to remove from the list.

The search system 500 also may infer that a user wishes to remove an electronic search result based on user input related to the user's review of the electronic search result. For example, the search system 500 may monitor a user's review of a search result and determine that the user wishes to remove the search result based on the user's review. In this example, the search system 500 may determine that a user wishes to remove a search result when the user selects the search result, but reviews the content for a relatively brief period of time or when the user has not selected a displayed search result (and, perhaps, selected other results with lower relevancy scores) for a relatively long period of time.

In response to the determination, the search system 500 removes the electronic search result from the formatted list of electronic search results (920). The search system 500 may update the formatted list of electronic search results to remove the search result from the list and arrange the other search results to account for the display area previously occupied by the removed search result (e.g., as shown in FIGS. 7 and 8). For instance, search results included in the list lower than the removed search result may be moved up to account for the removal of the search result and one or more hidden search results that are responsive to the query, but not displayed at the time of removal (e.g., the search system 500 limits the display to the ten most relevant results and the hidden results represent the results other than the ten most relevant results) may be added to the list of search results and displayed.

Based on the removal of the second search result, the search system 500 automatically, without human intervention, selects a different search result included in the formatted list of electronic search results (930). For instance, the search system 500 selects a different search result included the formatted list to replace the removed search result as the currently displayed search result. As shown in FIG. 8, the different search result may be the result (e.g., Result 3) immediately following the removed search result (e.g., Result 2) in the list of search results. In some implementations, the search system 500 may automatically select a different search result based on the user's tracked review of the search results. In these implementations, the search system 500 may select the next result in the list of search results that has not been reviewed by the user.

In response to the selection, the search system 500 causes display, concurrently with the formatted list of electronic search results, of different electronic content linked to by the different search result (940). For instance, the search system 500 causes a browser to access, over a network, different electronic content linked to by a URL of the different search result and display the different electronic content in a content portion of the browser (e.g., as shown in content portion 810 of FIG. 8). The search system 500 may change display, in a content portion of a browser interface on a display device, of the electronic content linked to by the removed search result to different electronic content linked to by the different search result and may display, in a search results portion of the browser interface on the display device, the updated list of electronic search results after removal of the removed search result.

The search system 500 changes display of the displayed result indication to indicate that the different electronic content is associated with the different search result (950). For example, the search system 500 may update the displayed result indication to identify a displayed representation of the different search result in the formatted list of electronic search results and, thereby, indicate that the different electronic content is associated with the different search result (e.g., as shown by the updated displayed result indicator 820 shown in FIG. 8). The search system 500 may change display of the displayed result indication by removing the prior displayed result indication and displaying a new displayed result indication for the different search result.

Figure 10:
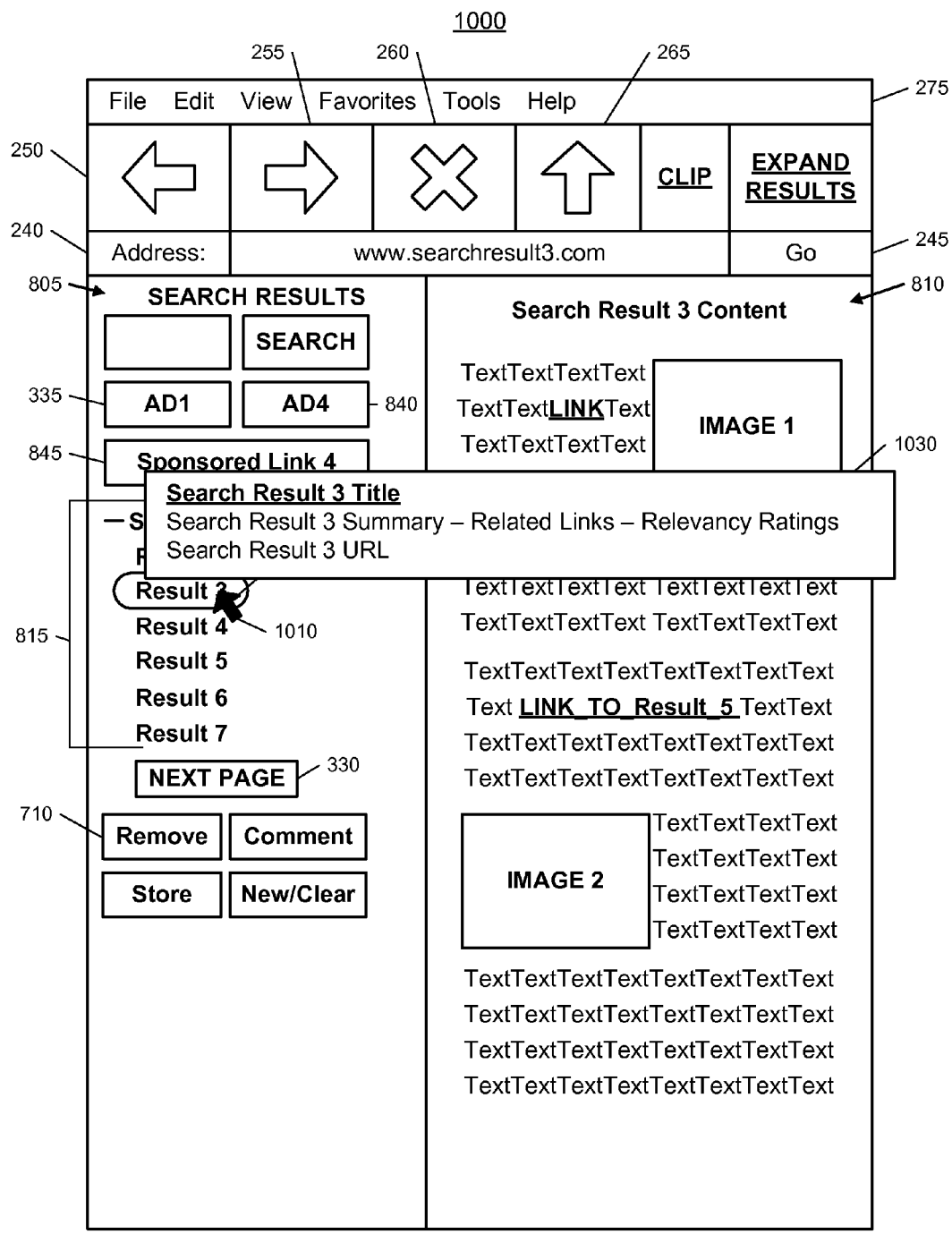

FIG. 10 illustrates an interface 1000 that enables a user to perceive more detailed summary information for a search result. As shown in FIG. 10, a user input icon 1010 may be displayed and manipulated by a user (e.g., using a mouse) to indicate a desire to receive more detailed summary information related to a search result (e.g., Result 3) included in the list of search results 815. For example, the user input icon 1010 may be positioned over Result 3 in the list 815 and, thereby, cause the display of a pop-up message 1030 that includes more detailed summary information for Result 3. The more detailed summary information may include any combination of the summary information shown for Result 3 in the interface 200 (e.g., a more detailed title, a descriptive summary, related links, relevancy ratings, and a URL). The pop-up message 1030 may be displayed in response to a user selection (e.g., mouse click) when the user input icon 1010 is positioned over Result 3 or may be displayed in response to a user causing the user input icon 1010 to hover over Result 3 for more than a predetermined threshold amount of time.

Although FIG. 10 illustrates more information about the search result that is currently displayed, the more detailed information may be displayed for any of the results included in the list. For instance, in response to the user input icon 1010 being hovered over Result 6 while the Search Result 3 Content is displayed, the pop-up message 1030 may include summary information for Result 6 without retrieving electronic content linked by Result 6. This may enhance a user's ability to choose which search result to review next by providing more information to user while maintaining the presently selected search result.

Figure 11:
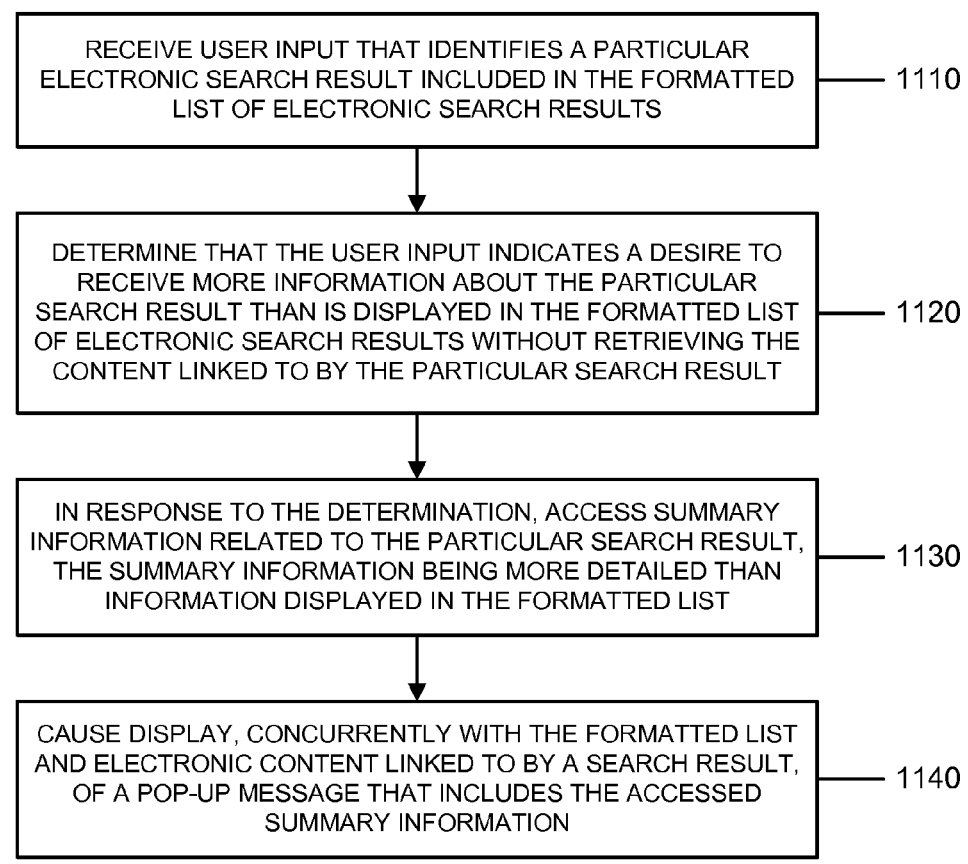

FIG. 11 illustrates an example of a process 1100 for displaying more detailed summary information of a search result. The search system 500 receives user input that identifies a particular electronic search result included in the formatted list of electronic search results (1110). For instance, the search system 500 may receive user input positioning a user input icon over a particular electronic search result (e.g., a user may hover a mouse icon over the particular result). The search system 500 also may receive user input selecting a particular electronic search result with a user input command (e.g., mouse click).

The search system 500 determines that the user input indicates a desire to receive more information about the particular search result than is displayed in the formatted list of electronic search results without retrieving the content linked to by the particular search result (1120). For instance, the search system 500 may determine that a user wishes to retrieve and display content associated with a particular search result when the user selects (e.g., clicks on) the particular search result, but may determine that a user wishes to display more information about the particular search result while maintaining the presently displayed content when the user causes a user input icon to hover over the particular search result for more than a predetermined threshold amount of time.

The search system 500 may use other distinct inputs to enable a user to distinguish between a desire to retrieve content associated with a search result or, instead, simply display more detailed information for the search result. For example, the search system 500 may retrieve content associated with a search result in response to a left click of a mouse, but may display more detailed summary information for the particular search result in response to a right click of a mouse. The search system 500 may retrieve content associated with a search result in response to a selection of a first interface control (e.g., a retrieve content button), but may display more detailed summary information for the particular search result in response to selection of a second interface control (e.g., a show summary button).

In response to the determination, the search system 500 accesses summary information related to the particular search result (1130). The summary information may be more detailed than information displayed in the formatted list. The search system 500 may access the summary information from local electronic storage or may receive, over a network, the summary information from a remote device (e.g., a search engine).

The search system 500 causes display, concurrently with the formatted list and electronic content linked to by a search result, of a pop-up message that includes the accessed summary information (1140). For instance, the search system 500 may display a pop-up window that includes the accessed summary information. The pop-up window may be displayed over the formatted list of search results and electronic content, while the formatted list of search results and electronic content are maintained in the display in the background. FIG. 10 shows an example of a pop-up message 1030 that includes summary information.

Figure 12:
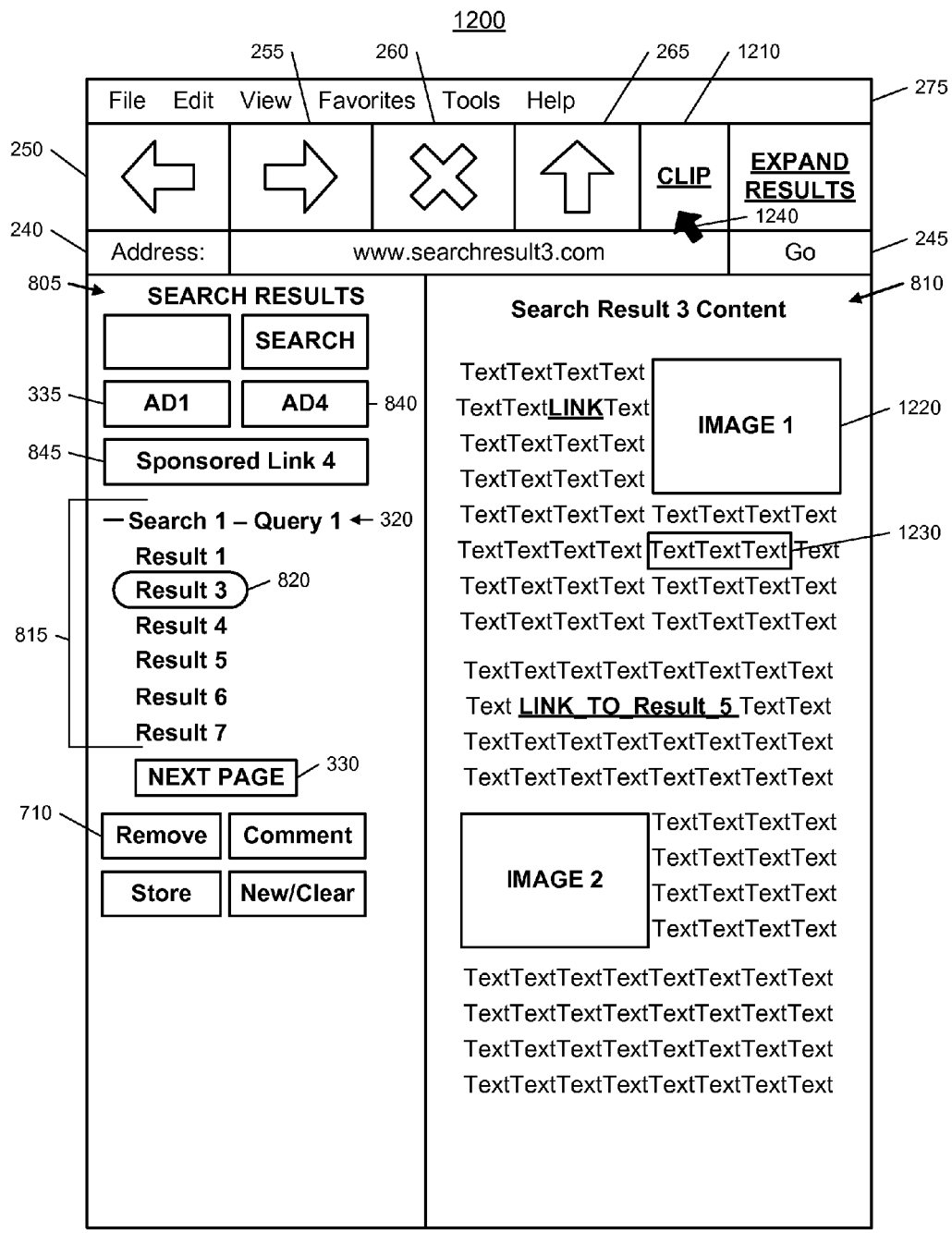

FIG. 12 illustrates an interface 1200 that includes a clip interface control 1210. The clip interface control 1210 may be an additional control added to a chrome portion of a browser as a user reviews search results. Adding the clip interface control 1210 to the chrome portion of the browser may enhance the functionality of the browser and may provide more area in the search results portion 805 for search results information and other controls.

The clip interface control 1210 enables a user to clip a portion of the content displayed in the content portion 1210. For instance, as a user reviews content corresponding to a search result, the user may determine that a portion of the content corresponding to the search result is particularly relevant to the user and the user wishes to clip the portion of the content. Accordingly, the user may provide user input that identifies the relevant portion of the content and select the clip interface control 1210 to perform a clip operation.

As shown in FIG. 12, a user may identify portions of the Search Result 3 Content that the user finds particularly relevant. For instance, the user may select "Image 1" 1220 as an image within the Search Result 3 Content that the user wishes to clip and highlight the text "TextTextText" 1230 as text within the Search Result 3 Content that the user wishes to clip. After identifying "Image 1" 1220 and "TextTextText" 1230, a user input icon 1240 may be displayed and manipulated by a user (e.g., using a mouse) to select the clip interface control 1210. For example, the user input icon 1240 may be positioned over the clip interface control 1210 when the user provides user input of a selection command and, in response to the selection, the identified portion (i.e., "Image 1" 1220 and "TextTextText" 1230) of the Search Result 3 Content may be clipped (e.g., extracted from the Search Result 3 Content and stored in electronic storage) and associated with Result 3.

Figure 13:
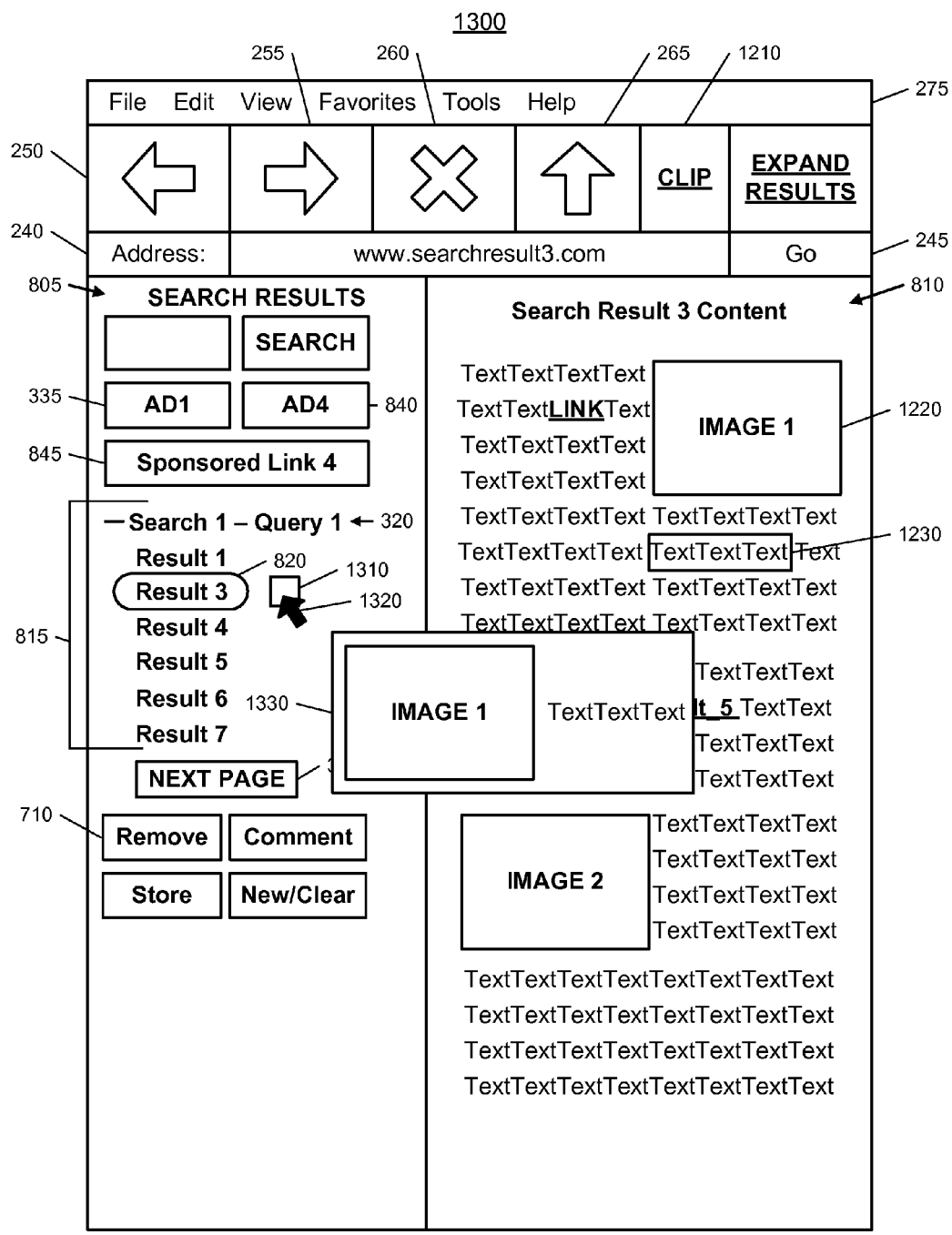

FIG. 13 illustrates an interface 1300 that may be displayed based on selection of a clip interface control 1210 in the interface 1200. The interface 1300 includes an update to the search results portion 805. Specifically, the search results portion 805 has been updated to include a clipped content indicator 1310 displayed in association with Result 3. The clipped content indicator 1310 provides a visual indication to a user that a portion of the content corresponding to Result 3 has been clipped. In addition, the clipped content indicator 1310 may be selectable to cause a display of the portion of the content corresponding to Result 3 that has been clipped. For instance, as shown, a user input icon 1320 may be displayed and manipulated by a user (e.g., using a mouse) to select (e.g., a mouse click, hover over, etc.) the clipped content indicator 1310. In response to the selection, a pop-up window 1330 is displayed that includes the portion of the content corresponding to Result 3 that has been clipped (i.e., "Image 1" 1220 and "TextTextText" 1230). The clipped content indicator 1310 may be persistently displayed in the search results portion 805 as the user reviews the search results. In this regard, as the user selects search results other than Result 3 and causes display of content corresponding to the other search results, the clipped content indicator 1310 remains displayed in the search results portion 805 and may be selected to cause a display of the portion of the content corresponding to Result 3 that has been clipped while the content corresponding to the other search results is displayed in the content portion 810. As such, the user may be able to quickly review and remind himself of the relevant content from Result 3 while reviewing the other search results without having to access the Search Result 3 Content and re-review the content to identify the relevant portion.

Figure 14:
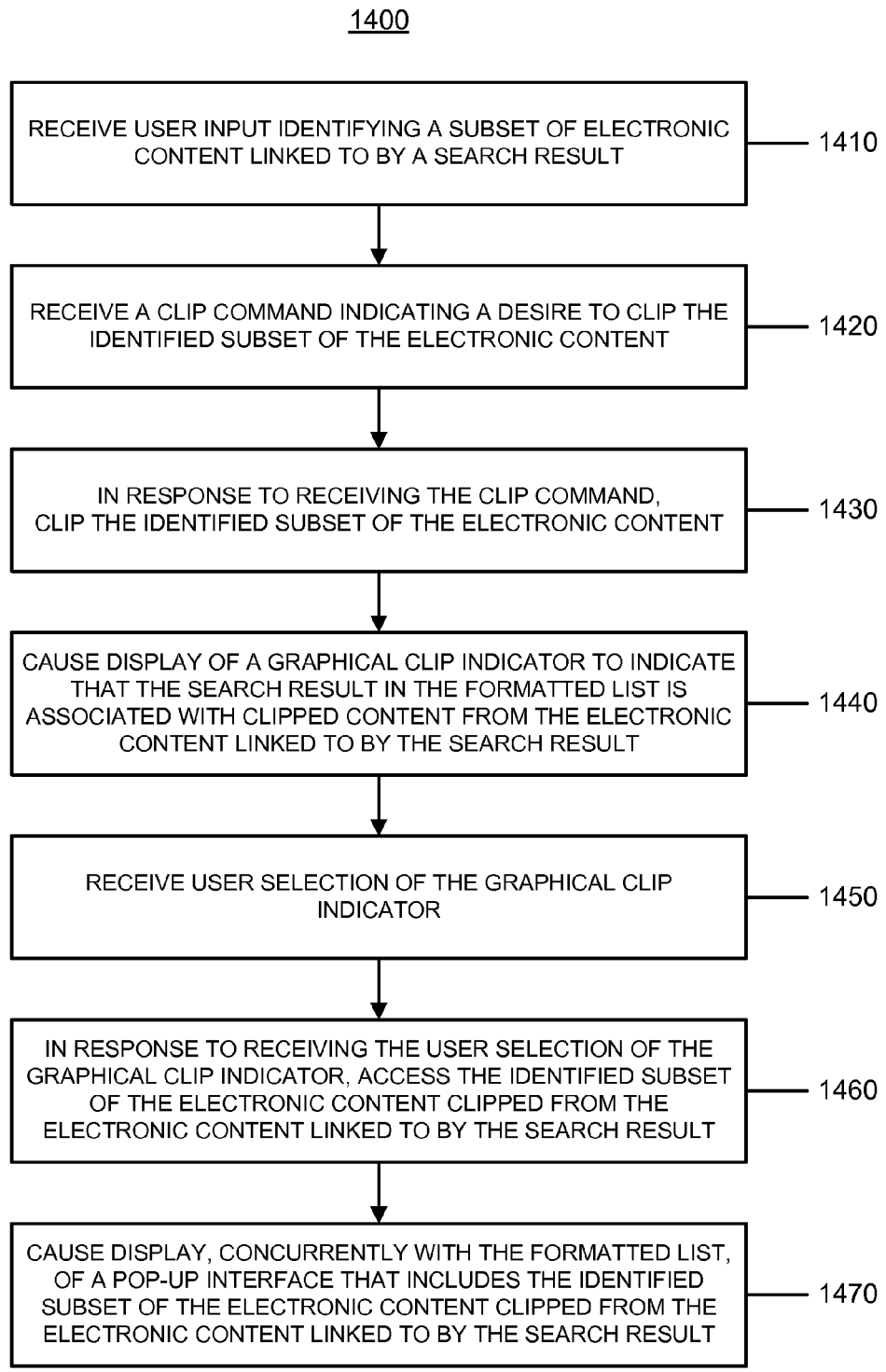

FIG. 14 illustrates an example of a process 1400 for associating clipped content with a search result. The search system 500 receives user input identifying a subset of electronic content linked to by a search result (1410). For instance, the search system 500 receives a user selection of a portion of the electronic content corresponding to a search result. The portion of the content may be text and/or an image and the user selection may be input that causes visual distinction of the identified content the user desires to clip.

The search system 500 receives a clip command indicating a desire to clip the identified subset of the electronic content (1420). For instance, as discussed above with respect to FIG. 12, the search system 500 may receive user input selecting a clip interface control or some other type of user input (e.g., an oral clip instruction, a gesture input, etc.) that explicitly indicates a desire to clip the identified content.

In response to receiving the clip command, the search system 500 clips the identified subset of the electronic content (1430). The search system 500 may clip the identified subset of the electronic content by extracting the identified subset of the electronic content from the content (e.g., electronic document) corresponding to the search result and stores the extracted content in electronic storage (e.g., local electronic storage at a client and/or remote electronic storage at a host). The search system 500 also may store clip information that identifies the user associated with the clipped content and the search result associated with the clipped content. The search system 500 may use the clip information to later control display of the clipped content to the appropriate user (e.g., different users may clip different portions of the content) and in association with the appropriate search result (e.g., content may be clipped from content corresponding to each of multiple different search results).

The search system 500 causes display of a graphical clip indicator to indicate that the search result in the formatted list is associated with clipped content from the electronic content linked to by the search result (1440). For example, the search system 500 displays a graphical clip indicator (e.g., the clipped content indicator 1310) adjacent to the search result in the formatted list (e.g., Result 3) that is associated with the clipped content. The graphical clip indicator may include any type of visual indication (e.g., highlighting, a change in color, a graphical symbol or icon, a text indication, etc.). The graphical clip indicator also may be displayed in any portion of the user interface.

The search system 500 receives user selection of the graphical clip indicator (1450). For instance, the search system 500 may receive a user input command (e.g., a keyboard/keypad button press, a mouse click, a touch screen input, etc.) that selects a graphical clip indicator while the formatted list of electronic search results is displayed concurrently with content from an electronic search result. The concurrently displayed content may be content from the electronic search result associated with the clipped content or may be content from a different electronic search result. The search system 500 also may receive user input causing a user input icon to hover over the graphical clip indicator.

In response to receiving the user selection of the graphical clip indicator, the search system 500 accesses the identified subset of the electronic content clipped from the electronic content linked to by the search result (1460). The search system 500 may access the identified subset of the electronic content from local electronic storage at a client device or from remote electronic storage at a host device. The search system 500 may identify the appropriate content based on the user providing the selection and/or the search result associated with the graphical clip indicator selected. For instance, the search system 500 may use identification information of the user providing the selection and/or identification information of the search result associated with the graphical clip indicator to index a repository of stored clipped content and identify the proper clipped content associated with the graphical clip indicator.

The search system 500 causes display, concurrently with the formatted list, of a pop-up interface that includes the identified subset of the electronic content clipped from the electronic content linked to by the search result (1470). For instance, the search system 500 may display a pop-up window that includes the accessed clipped content. The pop-up window may be displayed over the formatted list of search results and electronic content, while the formatted list of search results and electronic content are maintained in the display in the background. FIG. 13 shows an example of a pop-up window 1330 that includes clipped content.

Figure 15:
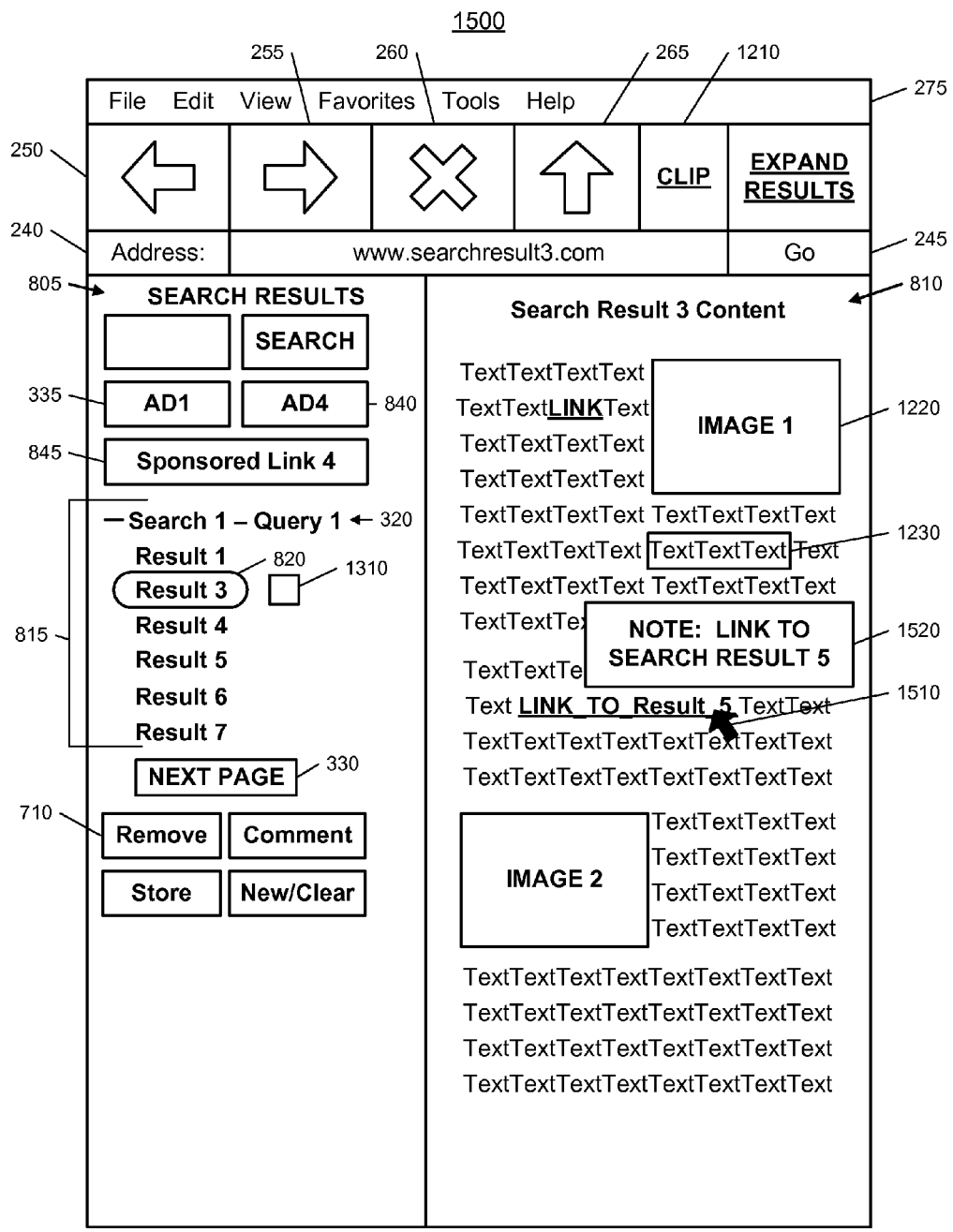

FIG. 15 illustrates an interface 1500 that includes a search result notification 1520. The search result notification 1520 provides a notification to a user that a link, displayed within content displayed in the content portion 810 (e.g., content linked to by a first search result), corresponds to a search result included in a list of search results (e.g., a second search result that is different than the first search result). As shown in FIG. 15, a user input icon 1510 may be displayed and manipulated by a user (e.g., using a mouse) to indicate interest in the link "LINK_TO_Result 5" displayed in the Search Result 3 Content. For example, the user input icon 1510 may be positioned over the link "LINK_TO_Result 5" to indicate interest in the link. In this example, the link "LINK_TO_Result 5" is a link to the same content linked to by Result 5 included in the list of search results. Accordingly, in response to the user input icon 1510 being positioned over the link "LINK_TO_Result 5", the search result notification 1520 is displayed to indicate to the user that the link corresponds to Result 5 included in the list of search results. By providing the user with an indication that the link corresponds to Result 5, the user may be able to make a more informed decision as to whether the user wishes to select the link. For instance, when the user has not reviewed Result 5, the user may be more inclined to select the link because the user knows that the link corresponds to content identified as being relevant to the search query entered by the user. Alternatively, when the user has reviewed Result 5, the user may be less inclined to select the link because the user has already reviewed the content corresponding to the link. This may save the user time because the user may not access and review content corresponding to the link to only find out that the user has already reviewed the content.

Figure 16:
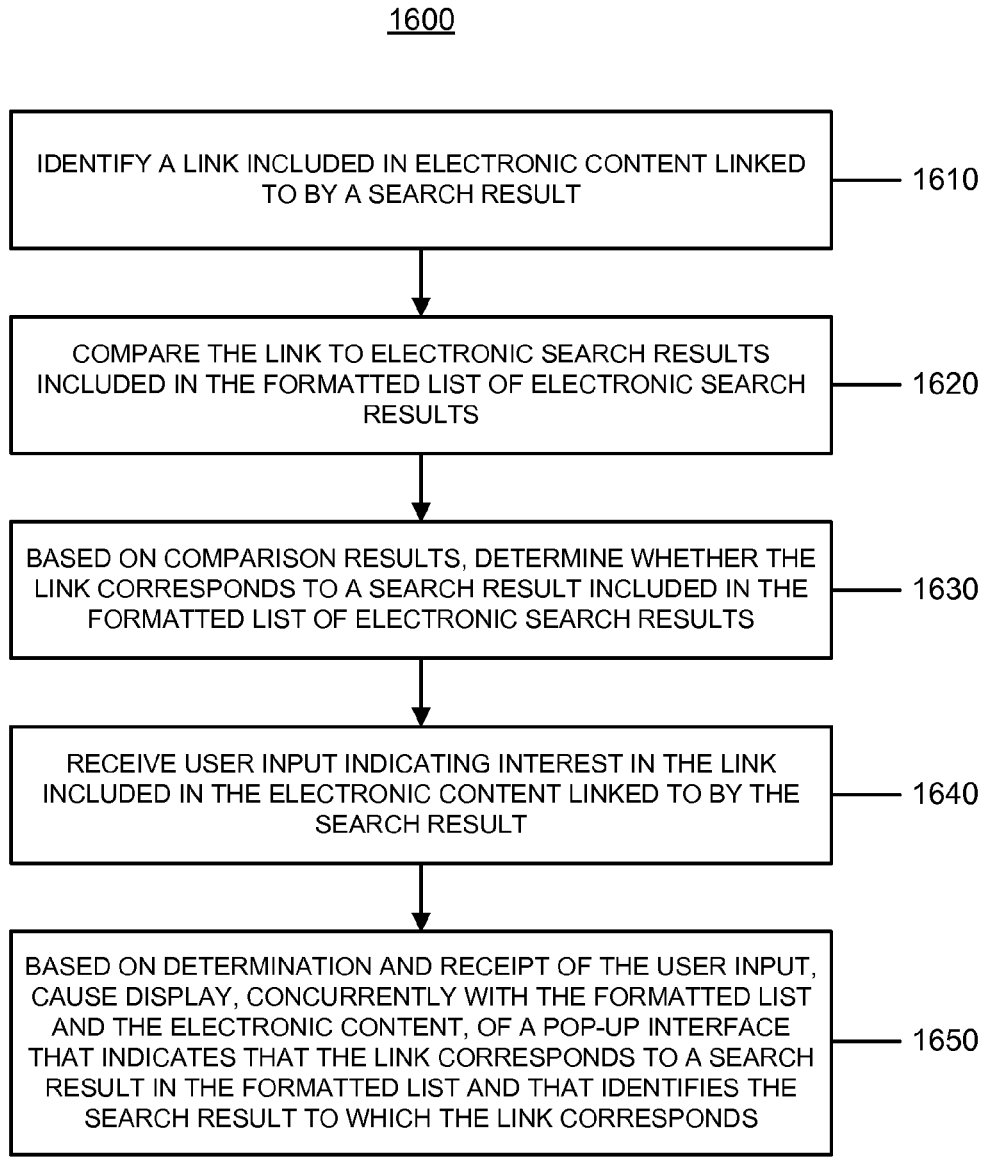

FIG. 16 illustrates an example of a process 1600 for displaying a search result notification. The search system 500 identifies a link included in electronic content linked to by a search result (1610). For instance, the search system 500 may scan an electronic document and electronically identify links (e.g., hyperlinks) included in the electronic document. The search system 500 may identify one or more links within an electronic document in response to the electronic document being accessed or may identify one or more links within an electronic document in response to events that occur during a user's review of the electronic document (e.g., when the user positions an input icon over the link).

The search system 500 compares the link to electronic search results included in the formatted list of electronic search results (1620). The search system 500 may compare a network address (e.g., a URL) associated with the identified link to network addresses (e.g., URLs) associated with the electronic search results included in the formatted list. In some implementations, the search system 500 may access content linked to by the link (e.g., without displaying the content), access content linked to by the electronic search results (e.g., without displaying the content), and compare the accessed content.

Based on comparison results, the search system 500 determines whether the link corresponds to a search result included in the formatted list of electronic search results (1630). For instance, when the search system 500 compares the network address (e.g., the URL) associated with the identified link to network addresses (e.g., URLs) associated with the electronic search results included in the formatted list, the search system 500 determines whether the network address (e.g., the URL) associated with the identified link matches any of the network addresses (e.g., URLs) associated with the electronic search results included in the formatted list. When the search system 500 compares the content linked to by the identified link to the content linked to by the electronic search results included in the formatted list, the search system 500 determines whether the content linked to by the identified link matches content linked to by any of the search results included in the list.

The search system 500 receives user input indicating interest in the link included in the electronic content linked to by the search result (1640). For instance, the search system 500 may receive a user input command (e.g., a keyboard/keypad button press, a mouse click, a touch screen input, etc.) that selects the link. The search system 500 also may receive user input causing a user input icon to hover over the link to indicate interest in the link.

Based on the determination and the receipt of the user input, the search system 500 causes display, concurrently with the formatted list and the electronic content, of a pop-up interface that indicates that the link corresponds to a search result in the formatted list and that identifies the search result to which the link corresponds (1650). The search system 500 may display the pop-up window over the formatted list of search results and electronic content, while the formatted list of search results and electronic content are maintained in the display in the background. The search system 500 may display the pop-up window proximate to the link, proximate to the search result to which the link corresponds, or in any other portion of the interface. FIG. 15 shows an example of a pop-up window (e.g., the search result notification 1520) that is displayed proximate to the link.

Figure 17:
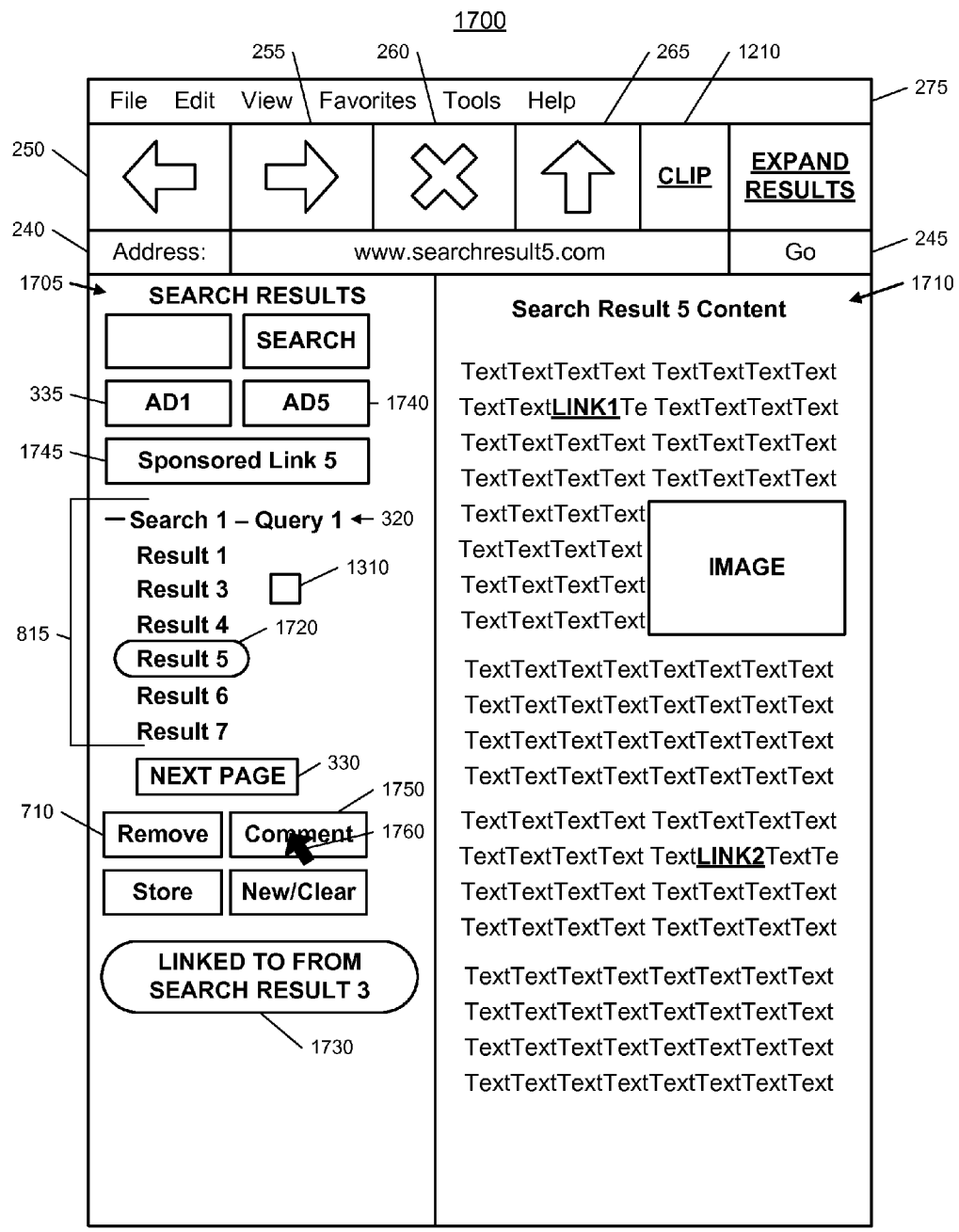

FIG. 17 illustrates an interface 1700 that may be displayed based on selection of a link to a search result included in content of another search result. For instance, the interface 1700 may be displayed in response to selection of the link "LINK_TO_Result 5" displayed in the Search Result 3 Content shown in the interface 1500. The interface 1700 includes a search results portion 1705 and a content portion 1710, each of which has been updated based on the selection of the link to content associated with Result 5 displayed in the content associated with Result 3. For instance, the updated items in the search results portion 1705 include a displayed result indicator 1720, an advertisement 1740, and a sponsored link 1745. As shown, the displayed result indicator 1720 has been updated and now identifies Result 5 to indicate that Result 5 is the currently selected search result for which content is displayed. The second advertisement 1740 and the sponsored link 1745 represent a new advertisement and a new sponsored link that have been selected based on the user's selection of a link that links to content associated with Result 5.

The content portion 1710 displays a representation of electronic content linked to the selected link (e.g., content corresponding to Result 5). In response to the selection of link, the electronic content linked to the selected link (e.g., content corresponding to Result 5) may be accessed and displayed in the content portion 1710. Accordingly, the interface 1700 may be similar to an interface that would have been displayed in response to user selection of the Result 5 in the formatted list of search results.

The interface 1700 also includes a graphical indication 1730 that the currently selected search result (e.g., the Result 5) was linked to from content corresponding to another search result (e.g., the Result 3). The graphical indication 1730 may provide a visually perceivable indication that the currently displayed content and/or currently selected search result was linked to from content corresponding to a previously selected search result.

Figure 18:
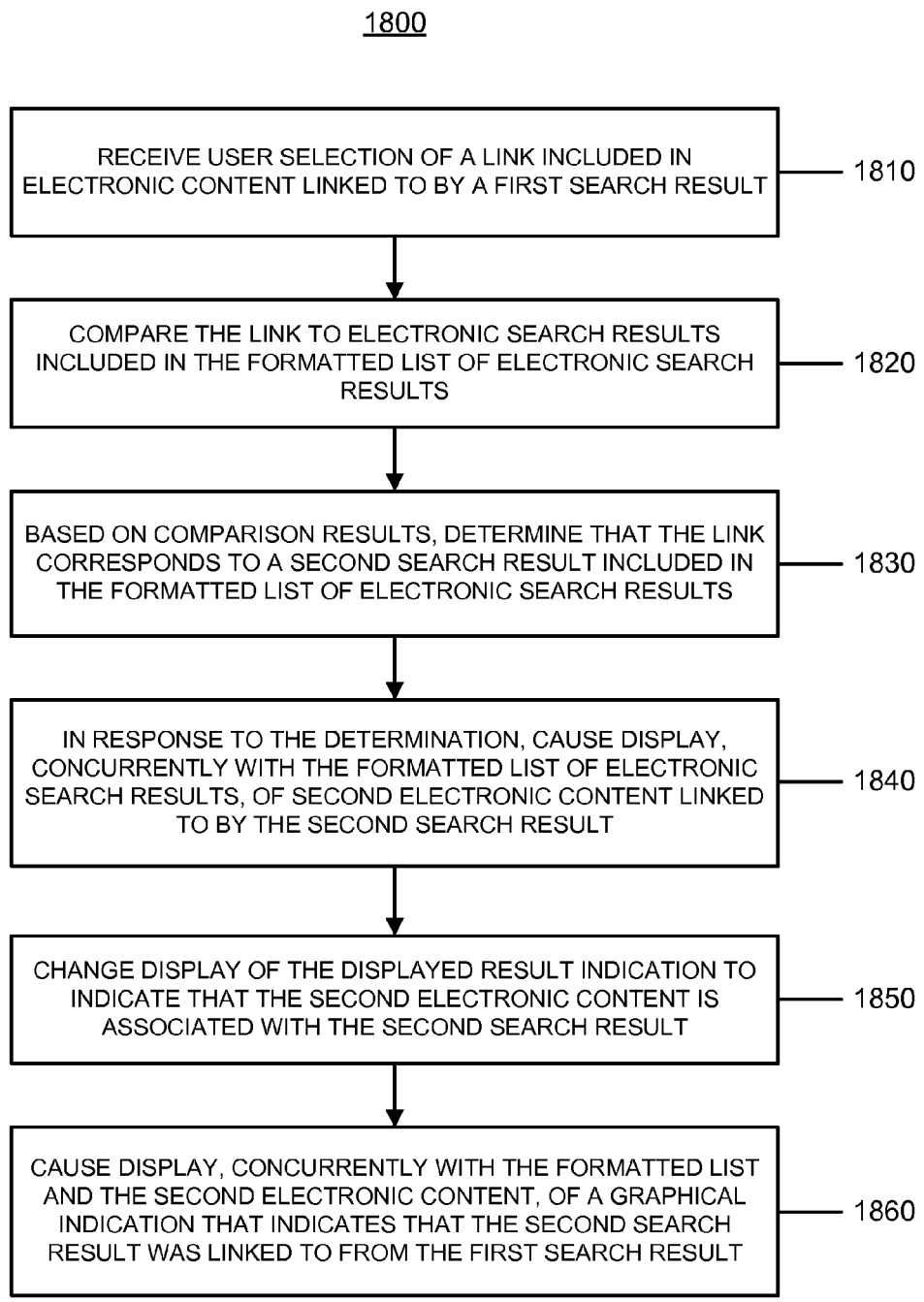

FIG. 18 illustrates an example of a process 1800 for displaying an indication that a search result was linked to by electronic content associated with another search result. The search system 500 receives user selection of a link included in electronic content linked to by a first search result (1810). For instance, the search system 500 may receive a user input command (e.g., a keyboard/keypad button press, a mouse click, a touch screen input, etc.) that selects a link included in electronic content linked to by a first search result.

The search system 500 compares the link to electronic search results included in the formatted list of electronic search results (1820). The search system 500 may compare a network address (e.g., a URL) associated with the selected link to network addresses (e.g., URLs) associated with the electronic search results included in the formatted list. In some implementations, the search system 500 may access content linked to by the selected link (e.g., without displaying the content), access content linked to by the electronic search results (e.g., without displaying the content), and compare the accessed content.

Based on comparison results, the search system 500 determines that the link corresponds to a second search result included in the formatted list of electronic search results (1830). For instance, when the search system 500 compares the network address (e.g., the URL) associated with the identified link to network addresses (e.g., URLs) associated with the electronic search results included in the formatted list, the search system 500 determines whether the network address (e.g., the URL) associated with the identified link matches any of the network addresses (e.g., URLs) associated with the electronic search results included in the formatted list. When the search system 500 compares the content linked to by the identified link to the content linked to by the electronic search results included in the list, the search system 500 determines whether the content linked to by the identified link matches content linked to by any of the search results included in the list.

In response to the determination, the search system 500 causes display, concurrently with the formatted list of electronic search results, of second electronic content linked to by the second search result (1840). For instance, the search system 500 causes a browser to access, over a network, second electronic content linked to by a URL of the second search result (e.g., the same URL as the selected link) and display the second electronic content in a content portion of the browser (e.g., as shown in content portion 1710 of FIG. 17). The search system 500 may change display, in a content portion of a browser interface on the display device, of first electronic content linked to by the first search result to the second electronic content linked to by the second search result and may maintain display, in a search results portion of the browser interface on the display device, of the formatted list of electronic search results.

The search system 500 changes display of the displayed result indication to indicate that the second electronic content is associated with the second search result (1850). For example, the search system 500 may update the displayed result indication to identify a displayed representation of the second search result in the formatted list of electronic search results (e.g., rather than the first search result) and, thereby, indicate that the second electronic content is associated with the second search result (e.g., as shown by the updated displayed result indicator 1720 shown in FIG. 17). The search system 500 may change display of the displayed result indication by removing the prior displayed result indication and displaying a new displayed result indication for the second search result.

The search system 500 causes display, concurrently with the formatted list and the second electronic content, of a graphical indication that indicates that the second search result was linked to from the first search result (1860). The search system 500 may display the graphical indication over the formatted list of search results and electronic content, while the formatted list of search results and electronic content are maintained in the display in the background. In some implementations, the search system 500 may display a pop-up window (or other indicator) in a search results portion of an interface, proximate to the search result currently selected (e.g., the search result linked to), proximate to the search result previously selected (e.g., the search result linked from), or in any other portion of the interface. FIG. 17 shows an example of a graphical indication 1730 that is displayed in a search results portion.

Referring again to FIG. 17, the interface 1700 includes a comment interface control 1750. The comment interface control 1750 enables a user to add a comment to a search result from the list of search results 815 by selecting comment interface control 1750 when the search result is currently selected. For instance, after a user reviews a search result and determines that the user wishes to add a comment related to the user's review of the search result, the user may use the comment interface control 1750 to add a comment to the search result from the list 815. In this regard, the user may store comment information associated with a search result to maintain a record of the user's review and quickly perceive the user's thinking when the user previously reviewed the search result.

As shown in FIG. 17, a user input icon 1760 may be displayed and manipulated by a user (e.g., using a mouse) to select the comment interface control 1750 when Result 5 is selected. For example, the user input icon 1760 may be positioned over the comment interface control 1750 when the user provides user input of a selection command.

Figure 19:
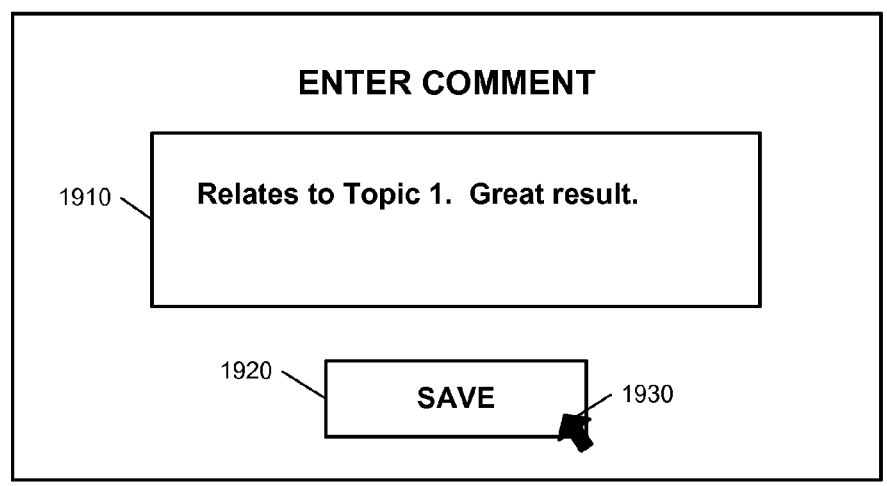

FIG. 19 illustrates a comment interface 1900 that may be displayed based on selection of a comment interface control 1750 included in the interface 1700. The interface 1900 includes a comment input field 1910 and a save control 1920. The comment input field 1910 enables a user to enter a comment that includes one or more words or phrases that define the user's comment on a search result. When a user selects the save control 1920 using, for example, an input device 1930, the search system saves the comment entered into the comment input field 1910 in association with the appropriate search result.

Figure 20:
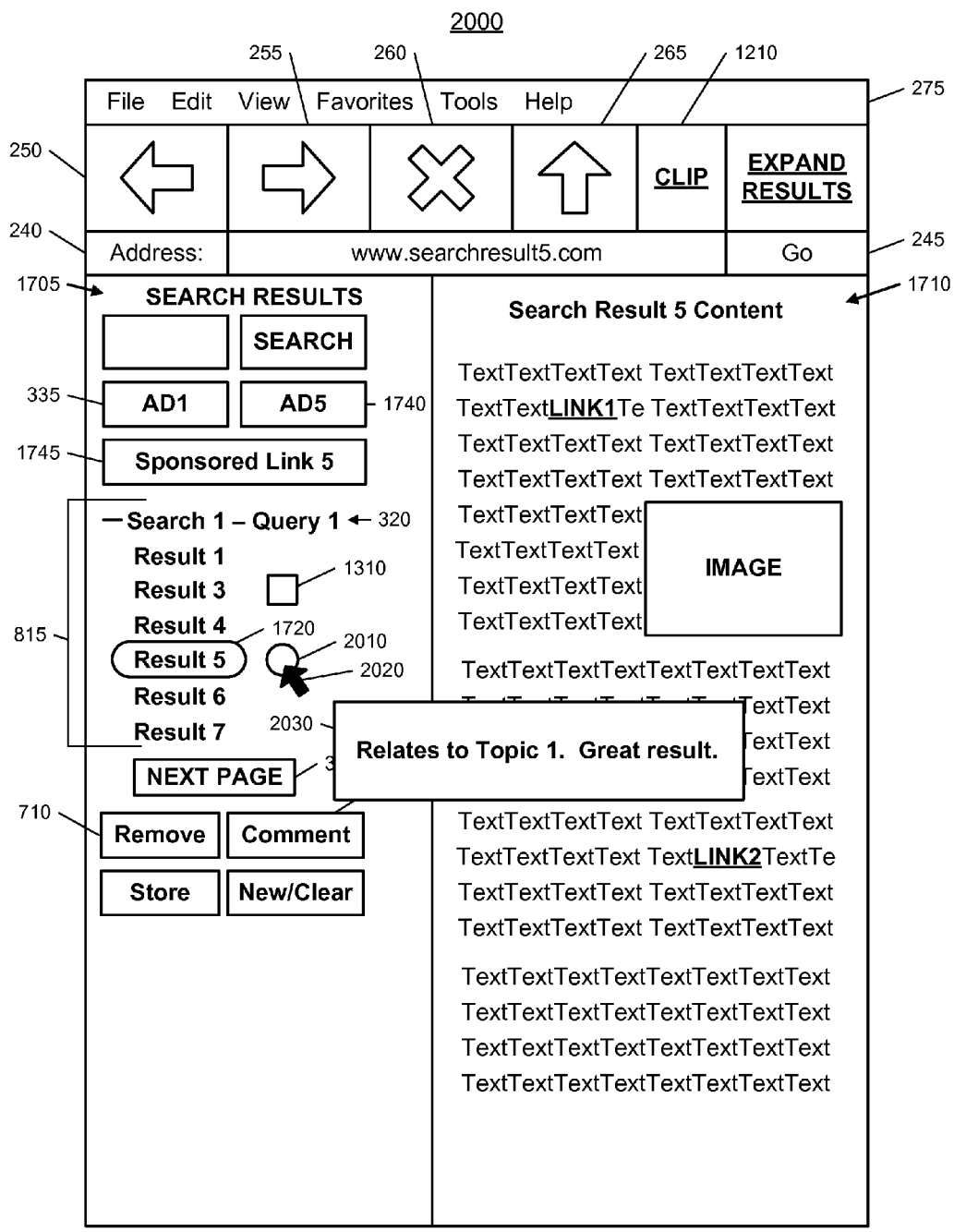

FIG. 20 illustrates an interface 2000 that may be displayed based on entry of a comment in connection with a search result. The interface 2000 includes an update to the search results portion 1705. Specifically, the search results portion 1705 has been updated to include a comment indicator 2010 displayed in association with Result 5. The comment indicator 2010 provides a visual indication to a user that Result 5 is associated with a comment. In addition, the comment indicator 2010 may be selectable to cause a display of the comment corresponding to Result 5. For instance, as shown, a user input icon 2020 may be displayed and manipulated by a user (e.g., using a mouse) to select (e.g., a mouse click, hover over, etc.) the comment indicator 2010. In response to the selection, a pop-up window 2030 is displayed that includes the comment corresponding to Result 5 that has been entered by a user (i.e., "Relates to Topic 1. Great result."). The comment indicator 2010 may be persistently displayed in the search results portion 1705 as the user reviews the search results. In this regard, as the user selects search results other than Result 5 and causes display of content corresponding to the other search results, the comment indicator 2010 remains displayed in the search results portion 1705 and may be selected to cause a display of the comment corresponding to Result 5 while the content corresponding to the other search results is displayed in the content portion 1710. As such, the user may be able to quickly review the comment corresponding to Result 5 while reviewing the other search results without having to access the Search Result 5 Content and re-review the content.

Figure 21:
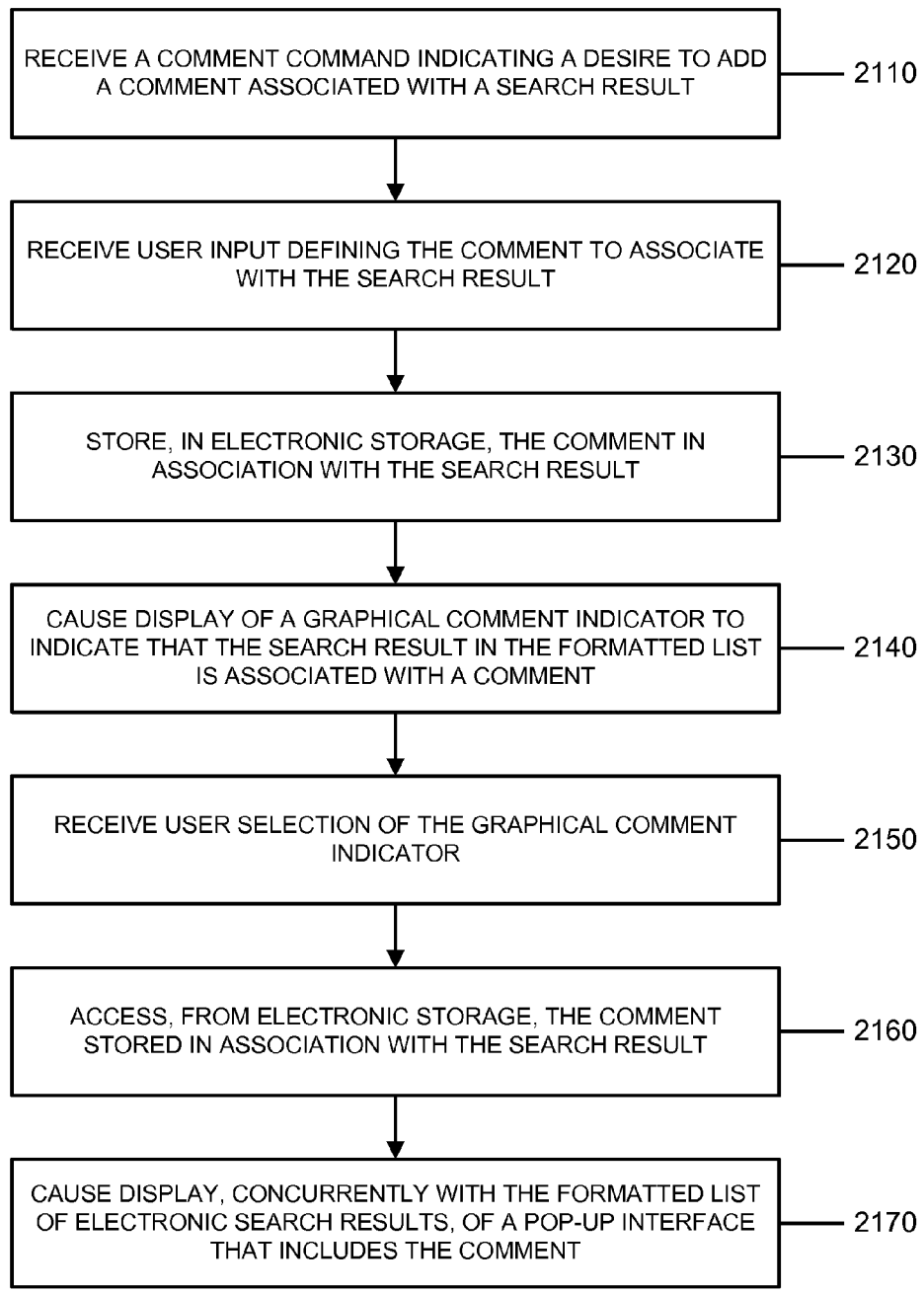

FIG. 21 illustrates an example of a process 2100 for associating a comment with a search result. The search system 500 receives a comment command indicating a desire to add a comment associated with a search result (2110). For instance, as discussed above with respect to FIG. 20, the search system 500 may receive user input selecting a comment interface control or some other type of user input (e.g., an oral comment instruction, a gesture input, etc.) that explicitly indicates a desire to add a comment for a search result.

The search system 500 receives user input defining the comment to associate with the search result (2120). The search system 500 may receive user input in a text entry field in which the user enters one or more words or phrases that define the comment. The search system 500 also may display an interface control with predefined comments and the user may select a predefined comment to add to the search result. The search system 500 further may receive audible user input (e.g., through a microphone) defining the comment. When the search system 500 receives audible user input, the search system 500 may use speech recognition processes to convert the audible input into text and use the text as the comment. Alternatively, the search system 500 may store the audible input as the comment and reproduce the audible input (e.g., using a speaker) when the user later selects the comment.

The search system 500 stores, in electronic storage, the comment in association with the search result (2130). The search system 500 may store the comment in local electronic storage at a client and/or remote electronic storage at a host. The search system 500 also may store comment information that identifies the user associated with the comment and the search result associated with the comment. The search system 500 may use the comment information to later control display of the comment to the appropriate user (e.g., different users may add different comments) and in association with the appropriate search result (e.g., comments may be added for each of multiple different search results).

The search system 500 causes display of a graphical comment indicator to indicate that the search result in the formatted list is associated with a comment (2140). For example, the search system 500 displays a graphical comment indicator (e.g., the comment indicator 2010) adjacent to the search result in the formatted list (e.g., Result 5) that is associated with the comment. The graphical comment indicator may include any type of visual indication (e.g., highlighting, a change in color, a graphical symbol or icon, a text indication, etc.). The graphical comment indicator also may be displayed in any portion of the user interface.

The search system 500 receives user selection of the graphical comment indicator (2150). For instance, the search system 500 may receive a user input command (e.g., a keyboard/keypad button press, a mouse click, a touch screen input, etc.) that selects a graphical comment indicator while the formatted list of electronic search results is displayed concurrently with content from an electronic search result. The concurrently displayed content may be content from the electronic search result associated with the comment or may be content from a different electronic search result. The search system 500 also may receive user input causing a user input icon to hover over the graphical comment indicator.

The search system 500 accesses, from electronic storage, the comment stored in association with the search result (2160). The search system 500 may access the comment from local electronic storage at a client device or from remote electronic storage at a host device. The search system 500 may identify the appropriate comment based on the user providing the selection and/or the search result associated with the graphical comment indicator selected. For instance, the search system 500 may use identification information of the user providing the selection and/or identification information of the search result associated with the graphical comment indicator to index a repository of stored comments and identify the proper comment associated with the graphical comment indicator.

The search system 500 causes display, concurrently with the formatted list of electronic search results, of a pop-up interface that includes the comment (2170). For instance, the search system 500 may display a pop-up window that includes the accessed comment. The pop-up window may be displayed over the formatted list of search results and electronic content, while the formatted list of search results and electronic content are maintained in the display in the background. FIG. 20 shows an example of a pop-up window 2030 that includes a comment.

Figure 22:
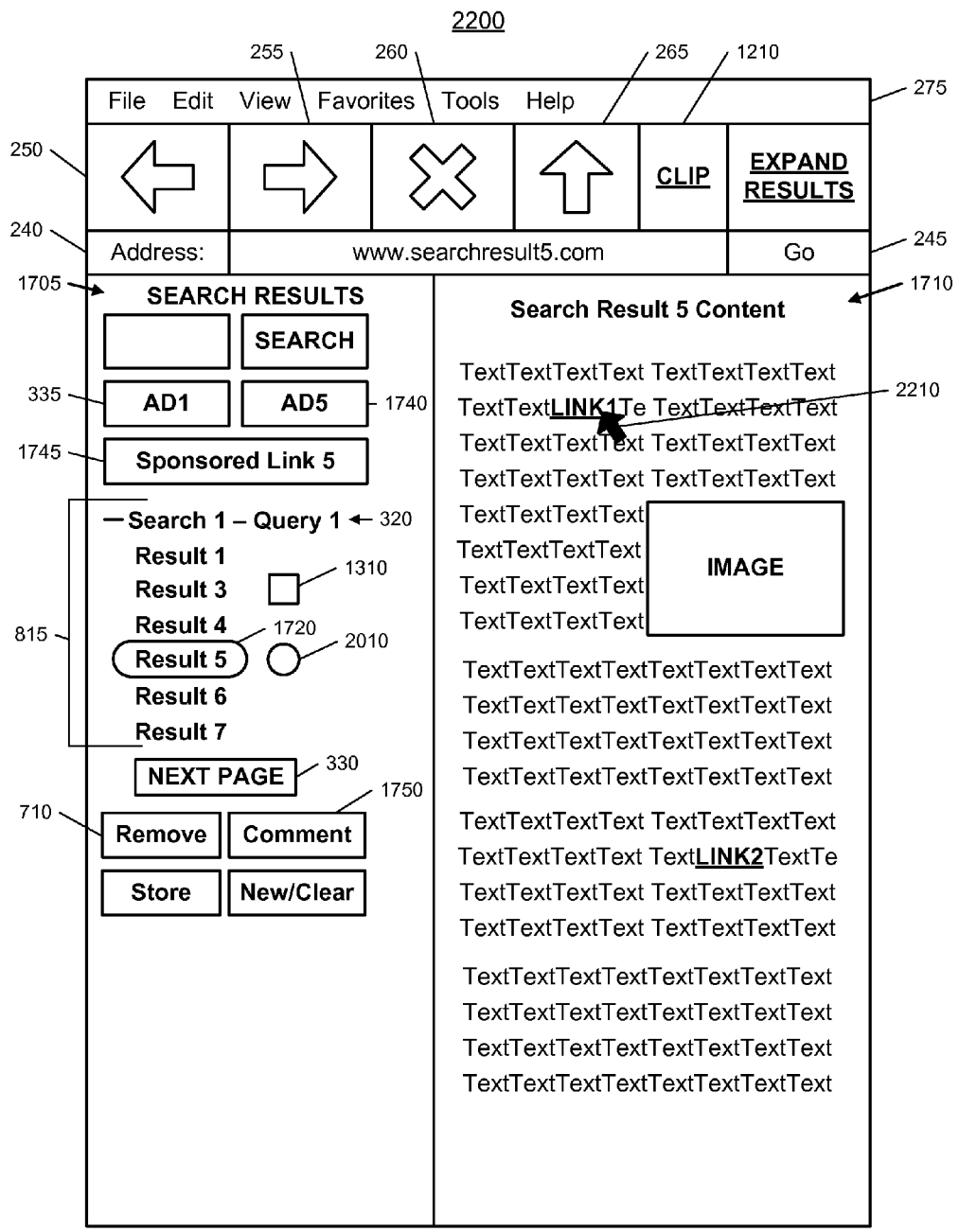
Figure 23:
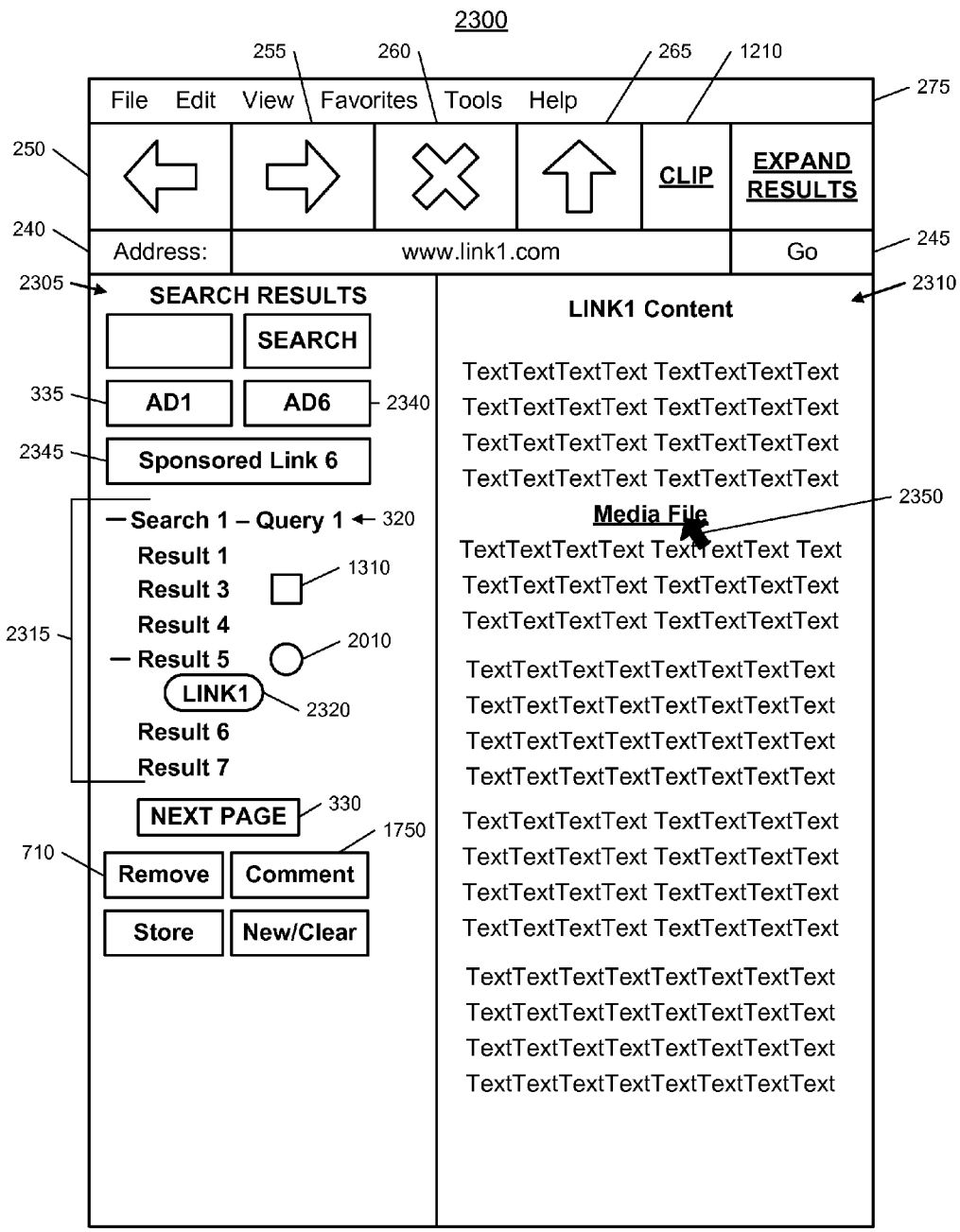
Figure 24:
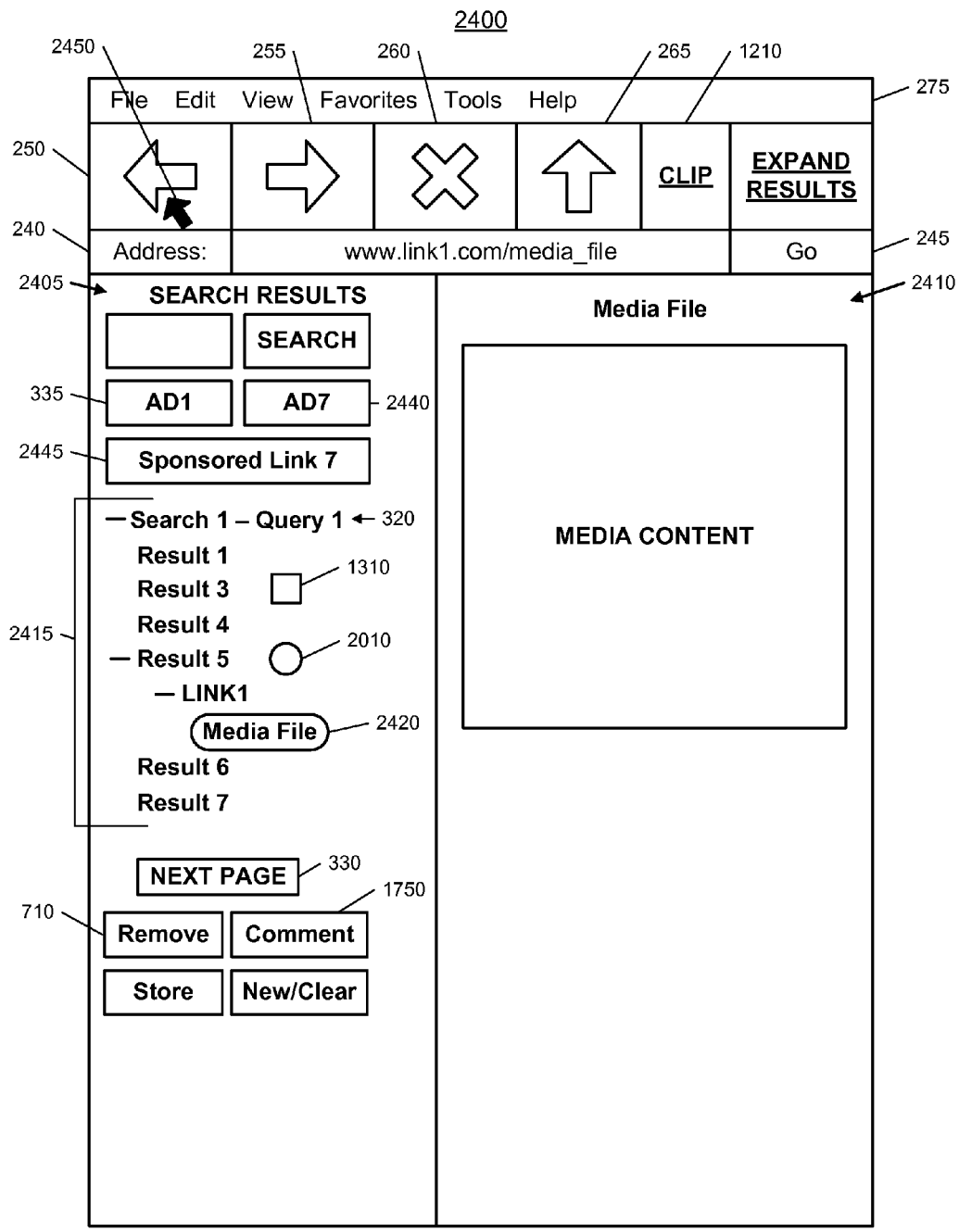

FIGS. 22 to 24 illustrate examples of user interfaces that are updated to include a list of search results with at least one sub-element. Referring to FIG. 22, an interface 2200 displays content corresponding to Result 5 in the formatted list of search results. The content corresponding to Result 5 includes a link "LINK 1" to other content, and a user may be interested in accessing the content linked to by "LINK 1." A user input icon 2210 may be displayed and manipulated by a user (e.g., using a mouse) to select "LINK 1" when viewing the content corresponding to Result 5. For example, the user input icon 2210 may be positioned over "LINK 1" when the user provides user input of a selection command.

FIG. 23 illustrates an interface 2300 that may be displayed based on selection of a link included in content of a search result. For instance, the interface 2300 may be displayed in response to selection of the link "LINK1" displayed in the Search Result 5 Content shown in the interface 2200. The interface 2300 includes a search results portion 2305 and a content portion 2310, each of which has been updated based on the selection of the link displayed in the content associated with Result 5. For instance, the updated items in the search results portion 2305 include an updated list of search results 2315, a displayed result indicator 2320, an advertisement 2340, and a sponsored link 2345. As shown, the updated list of search results 2315 includes a sub-element (e.g., LINK 1). The sub-element represents a link (of any type of media) that was selected by a user as the user was reviewing search results and is selectable by the user to access content corresponding to the link (e.g., LINK1). The sub-element (e.g., LINK 1) is displayed as a sub-element of Result 5 because the link corresponding to the sub-element (e.g., LINK 1) was selected when the user was reviewing Result 5. In this regard, the history of a user's browsing when reviewing search results is tracked and displayed in the search results portion 2305 of the interface 2300.

The displayed result indicator 2320 has been updated and now identifies LINK1 to indicate that the currently displayed content corresponds to LINK1. A control that enables a user to minimize or expand the tracked browsing (e.g., links selected) from Result 5 is displayed to enable a user to control whether or not the tracked browsing is displayed. The second advertisement 2340 and the sponsored link 2345 represent a new advertisement and a new sponsored link that have been selected based on the user's selection of the link "LINK1" included in the content associated with Result 5.

The content portion 2310 displays a representation of electronic content linked to by the selected link (e.g., content corresponding to LINK1). In response to the selection of LINK1, the electronic content linked to the selected link (e.g., content corresponding to LINK1) may be accessed and displayed in the content portion 2310.

The content corresponding to "LINK 1" includes a link ("Media_File") to other content, and a user may be interested in accessing the content linked to by the "Media_File" link. A user input icon 2350 may be displayed and manipulated by a user (e.g., using a mouse) to select the "Media_File" link when viewing the content corresponding to LINK 1. For example, the user input icon 2350 may be positioned over "Media_File" when the user provides user input of a selection command. The "Media_File" may link to an audio and/or video file that is displayed to a user upon selection of the "Media_File" link.

FIG. 24 illustrates an interface 2400 that may be displayed based on selection of a link included in content of a search result. For instance, the interface 2400 may be displayed in response to selection of the link "Media_File" displayed in the LINK1 Content shown in the interface 2300. The interface 2400 includes a search results portion 2405 and a content portion 2410, each of which has been updated based on the selection of the link displayed in the content associated with LINK1. For instance, the updated items in the search results portion 2405 include an updated list of search results 2415, a displayed result indicator 2420, an advertisement 2440, and a sponsored link 2445. As shown, the updated list of search results 2415 includes a sub-element (e.g., Media File). The sub-element represents a link (of any type of media) that was selected by a user as the user was reviewing search results and is selectable by the user to access content corresponding to the link (e.g., Media File). The sub-element (e.g., Media File) is displayed as a sub-element of LINK1 because the link corresponding to the sub-element (e.g., Media File) was selected when the user was reviewing LINK1. In this regard, the history of a user's browsing when reviewing search results is tracked and displayed in the search results portion 2405 of the interface 2400. The user may select a tracked link (e.g., a sub-element) displayed in the updated list of search results 2415 to access content corresponding to the tracked link while content from another search result or another link is being displayed. Accordingly, a displayed sub-element may be similar to a displayed search result in the updated list of search results 2415.

The displayed result indicator 2420 has been updated and now identifies Media File to indicate that the currently displayed content corresponds to Media File. A control that enables a user to minimize or expand the tracked browsing (e.g., links selected) from LINK1 is displayed to enable a user to control whether or not the tracked browsing is displayed. The second advertisement 2440 and the sponsored link 2445 represent a new advertisement and a new sponsored link that have been selected based on the user's selection of the link "Media_File" included in the content associated with LINK1.

The content portion 2410 displays a representation of electronic content linked to by the selected link (e.g., a video corresponding to Media File). In response to the selection of the link "Media_File," the electronic content linked to by the selected link (e.g., the video corresponding to Media File) may be accessed and displayed in the content portion 2410. The content corresponding to the selected link (e.g., the video corresponding to Media File) also may be downloaded and stored in local storage to enable faster browsing of the content at a later time. Downloading the content also may enable the user to retrieve the content at a later time if the link changes or the content is removed, replaced, updated, changed, etc. In this case, the downloaded content may be accessed when the user selects the sub-element Media File.

Figure 25:
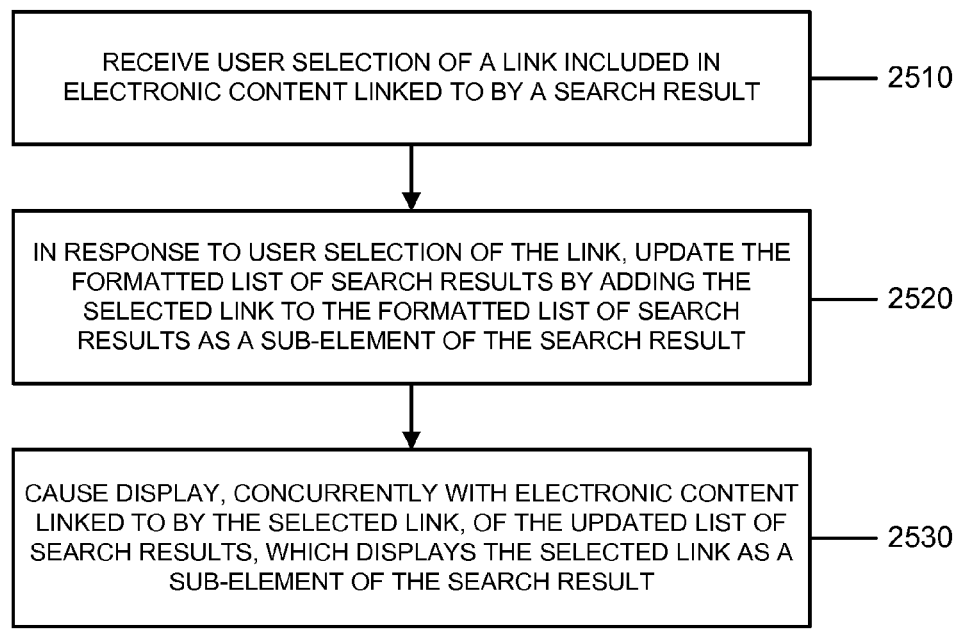

FIG. 25 illustrates an example of a process 2500 for updating a list of search results to include selected links as sub-elements in the list of search results. The search system 500 receives user selection of a link included in electronic content linked to by a search result (2510). For instance, the search system 500 may receive a user input command (e.g., a keyboard/keypad button press, a mouse click, a touch screen input, etc.) that selects a link included in electronic content linked to by a search result.

In response to user selection of the link, the search system 500 updates the formatted list of search results by adding the selected link to the formatted list of search results as a sub-element of the search result (2520). The search system 500 may identify the search result corresponding to content in which the link was included and include a representation of the selected link as a sub-element of the identified search result. The search system 500 may display the sub-element in a manner which distinguishes it from the search results included in the list (e.g., at an offset position, in a different color/font, etc.). The representation of the sub-element may be text of the link selected, text of a title (e.g., a web page title) of the link, or any other type of text and/or graphic that may be used to identify the sub-element. The sub-element also may be selectable to enable a user to access content corresponding to the sub-element by selecting the sub-element. The sub-elements displayed in the list may be persistent and viewed while the user views other search results or other links. The sub-elements also may be minimized and expanded automatically and/or manually as a user reviews the search results. A user further may be able to manipulate the tracked sub-elements in the list of search results (e.g., remove sub-elements, promote sub-elements in the list, reorganize the sub-elements, associate a sub-element with a different search result, etc.).

The search system 500 causes display, concurrently with electronic content linked to by the selected link, of the updated list of search results, which displays the selected link as a sub-element of the search result (2530). For instance, the search system 500 may access and display electronic content linked to by the selected link in a content portion of a browser interface and may display the updated list of search results in a search results portion of the browser interface. FIGS. 23 and 24 display interfaces 2300 and 2400, respectively, which display, concurrently with electronic content linked to by a selected link, an updated list of search results, which displays the selected link as a sub-element of a search result.

Referring again to FIG. 24, the interface 2400 includes a back interface control 250 that is part of a browser interface and has functionality defined by the browser. As shown in FIG. 24, a user input icon 2450 may be displayed and manipulated by a user (e.g., using a mouse) to select the back interface control 250 when the Media File link is selected. For example, the user input icon 2450 may be positioned over the back interface control 250 when the user provides user input of a selection command.

Figure 26:
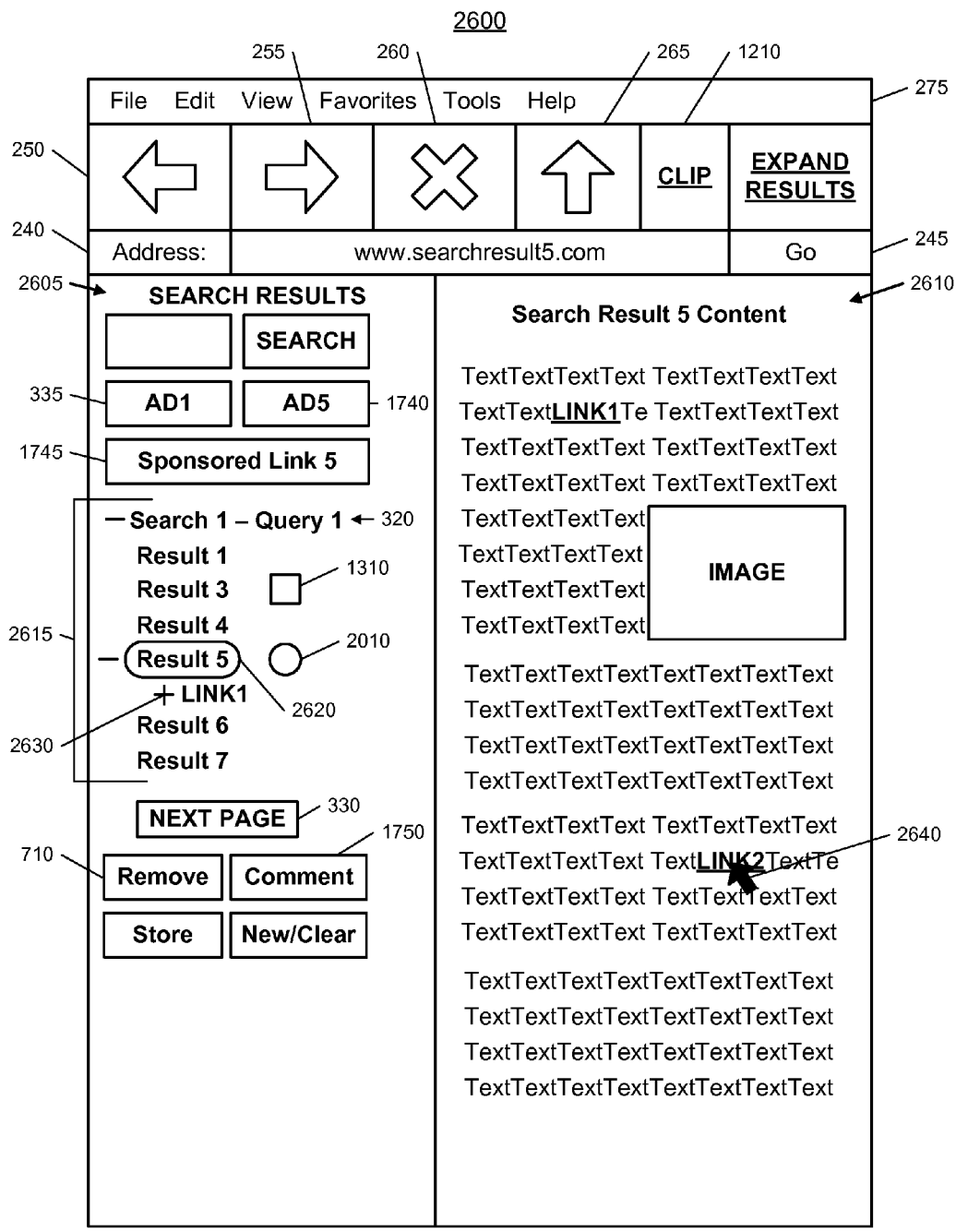

FIG. 26 illustrates an interface 2600 that may be displayed based on user selection of a back interface control in the interface 2400. The interface 2600 includes a search results portion 2605 and a content portion 2610, each of which has been updated based on the selection of the back interface control 250. For instance, the updated items in the search results portion 2605 include an updated list of search results 2615, a displayed result indicator 2620, an expansion control 2630, an advertisement 1740, and a sponsored link 1745. As shown, the sub-element Media File from the interface 2400 has been automatically minimized without human intervention in the updated list of search results 2615 and the selected result has been returned to the search result (e.g., Result 5) from which the tracked browsing initiated. Accordingly, the functionality of the back browser control 250 has been modified. For instance, the back browser control 250 may cause the browser to return to the most recently selected search result (e.g., Result 5) or may cause the browser to return to the search result (e.g., Result 5) at a top of a list of a tracked link being displayed when the back interface control was selected. In other implementations, the functionality of the back interface control 250 may remain the same and the interface 2600 may be displayed when the back interface control 250 is selected twice after display of the interface 2400.

The displayed result indicator 2620 has been updated and now identifies Result 5 to indicate that the currently displayed content corresponds to Result 5. A control 2630 that enables a user to minimize or expand the tracked browsing (e.g., links selected) from LINK1 is displayed to enable a user to control whether or not the tracked browsing is displayed. As such, the sub-elements (e.g., tracked links) from the content corresponding to Result 5 (e.g., a first level of tracked browsing) remains in the display and additional sub-elements (e.g., tracked links) are automatically minimized (e.g., hidden, reduced in size, reduced in focus, etc.) from display. By automatically minimizing at least some of the tracked browsing, the user may be able to focus on the higher level items included in the list of search results and, if desired, view additional tracked browsing using the control 2630. In some examples, all of the tracked browsing associated with Result 5 may be minimized in the interface 2600. The second advertisement 1740 and the sponsored link 1745 represent the advertisement and the sponsored link that correspond to Result 5 and were previously displayed.

The content portion 2610 displays a representation of electronic content linked to by the selected link (e.g., content corresponding to Result 5). In response to the selection of the back interface control 250, the electronic content linked to by Result 5 may be accessed (e.g., from local storage, over a network, etc.) and displayed in the content portion 2610. The content corresponding to Result 5 includes a link "LINK 2" to other content, and a user may be interested in accessing the content linked to by "LINK 2." A user input icon 2640 may be displayed and manipulated by a user (e.g., using a mouse) to select "LINK 2" when viewing the content corresponding to Result 5. For example, the user input icon 2640 may be positioned over "LINK 1" when the user provides user input of a selection command.

Figure 27:
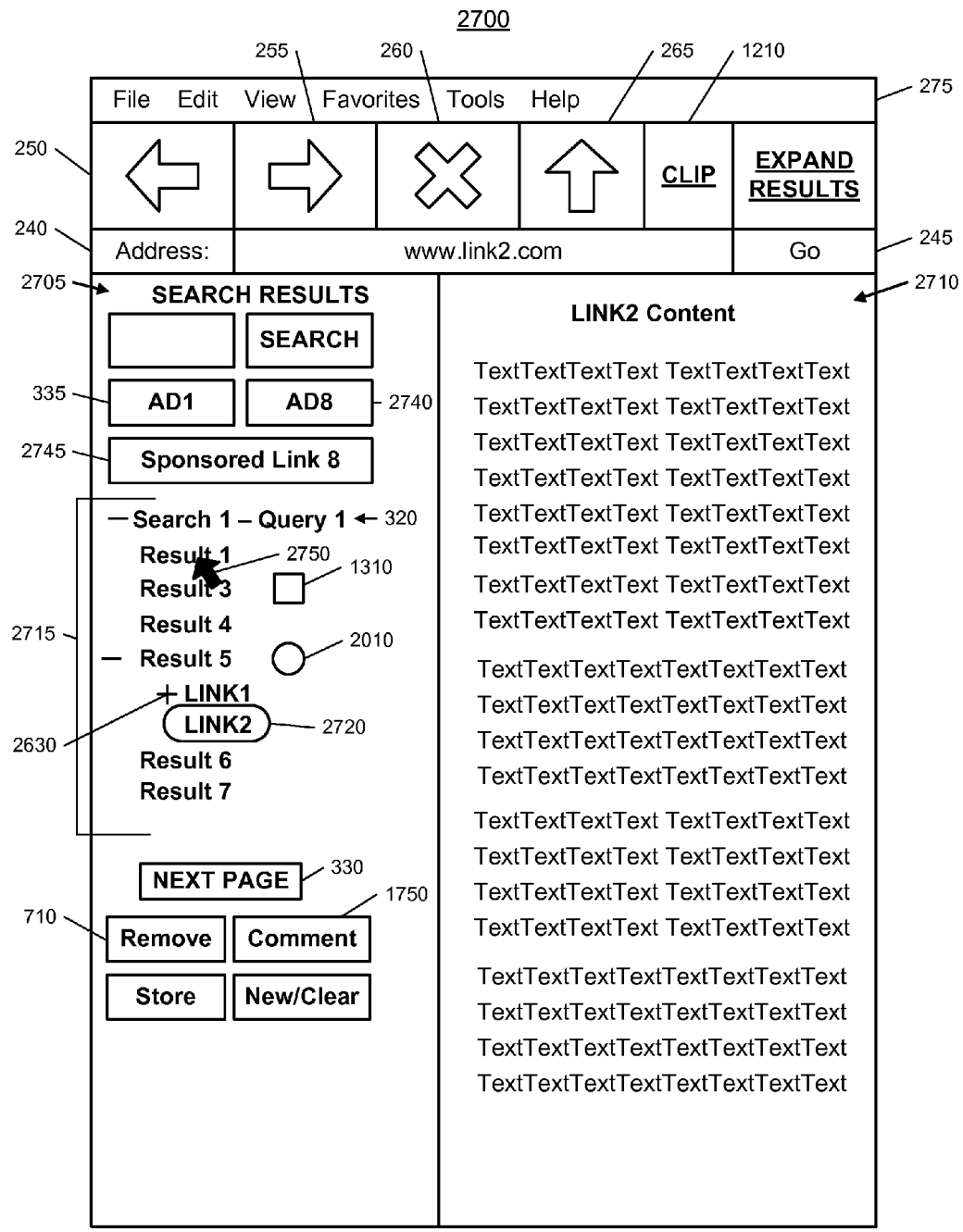

FIG. 27 illustrates an interface 2700 that may be displayed based on user selection of a link 2640 (e.g., LINK 2) in the interface 2600. The interface 2700 includes a search results portion 2705 and a content portion 2710, each of which has been updated based on the selection of the link displayed in the content associated with Result 5. For instance, the updated items in the search results portion 2705 include an updated list of search results 2715, a displayed result indicator 2720, an advertisement 2740, and a sponsored link 2745. As shown, the updated list of search results 2715 includes a second sub-element (e.g., LINK 2). The second sub-element represents a second link (of any type of media) that was selected by a user as the user was reviewing search results and is selectable by the user to access content corresponding to the second link (e.g., LINK 2). The second sub-element (e.g., LINK 2) is displayed as a second sub-element of Result 5 because the link corresponding to the second sub-element (e.g., LINK 2) was selected when the user was reviewing Result 5 and was the second link from the content corresponding to Result 5 that the user selected (e.g., LINK 1 was the first link selected). In this regard, the history of a user's browsing when reviewing search results is tracked and displayed in the search results portion 2705 of the interface 2700. The tracked history shows the links selected and an order of a selection.

The displayed result indicator 2720 has been updated and now identifies LINK2 to indicate that the currently displayed content corresponds to LINK2. A control that enables a user to minimize or expand the tracked browsing (e.g., links selected) from Result 5 remains displayed to enable a user to control whether or not the tracked browsing is displayed. The second advertisement 2740 and the sponsored link 2745 represent a new advertisement and a new sponsored link that have been selected based on the user's selection of the link "LINK2" included in the content associated with Result 5.

The content portion 2710 displays a representation of electronic content linked to by the selected link (e.g., content corresponding to LINK2). In response to the selection of LINK2, the electronic content linked to by the selected link (e.g., content corresponding to LINK2) may be accessed and displayed in the content portion 2710.

As shown in FIG. 27, a user input icon 2750 may be displayed and manipulated by a user (e.g., using a mouse) to select a search result included in the list of search results 2715. For example, the user input icon 2750 may be positioned over Result 1 when the user provides user input of a selection command. In this example, the user input results in selection of Result 1. In response to the selection, the browser may access electronic content associated with the Result 1 and update a display based on the selection.

Figure 28:
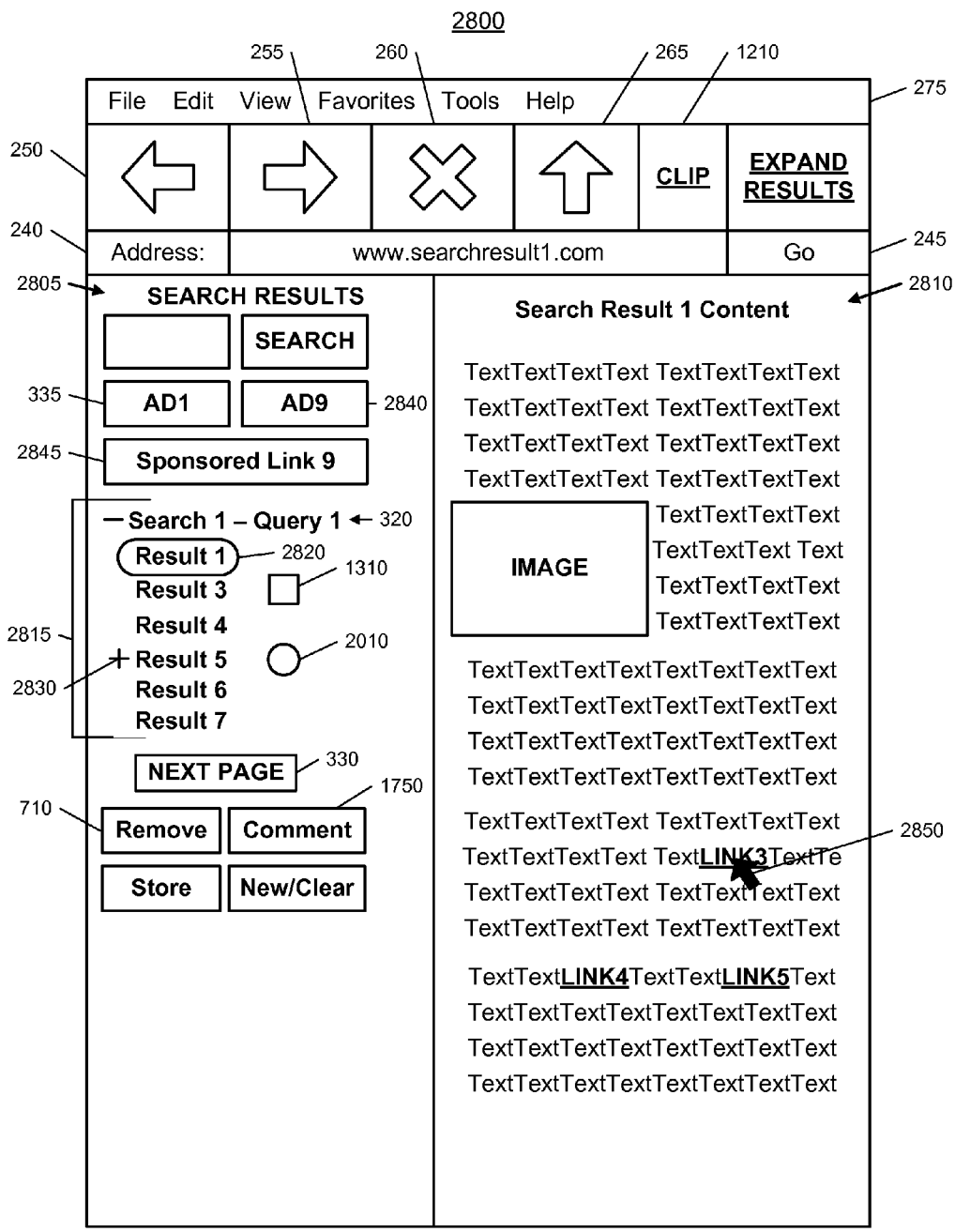

FIG. 28 illustrates an interface 2800 that may be displayed based on user selection of a search result (e.g., Result 1) in the interface 2700. The interface 2800 includes a search results portion 2805 and a content portion 2810, each of which has been updated based on the selection of Result 1. For instance, the updated items in the search results portion 2805 include an updated list of search results 2815, a displayed result indicator 2820, an expansion control 2830, an advertisement 2840, and a sponsored link 2845. As shown, the sub-elements (e.g., browsing history) related to Result 5 have been automatically minimized without human intervention in the updated list of search results 2815 in response to the selected result being changed to another search result (e.g., changed to Result 1).

The displayed result indicator 2820 has been updated and now identifies Result 1 to indicate that the currently displayed content corresponds to Result 1. A control 2830 that enables a user to minimize or expand the tracked browsing (e.g., links selected) from Result 5 is displayed to enable a user to control whether or not the tracked browsing is displayed. As such, the sub-elements (e.g., tracked links) from the content corresponding to Result 5 are automatically minimized (e.g., hidden, reduced in size, reduced in focus, etc.) from display in response to selection of another search result. By automatically minimizing at least some of the tracked browsing, the user may be able to focus on the items included in the list of search results and, if desired, view tracked browsing associated with Result 5 using the control 2830. The second advertisement 2840 and the sponsored link 2845 represent a new advertisement and a new sponsored link that have been selected based on the user's selection of the Result 1.

The content portion 2810 displays a representation of electronic content linked to by the selected search result (e.g., content corresponding to Result 1). In response to the selection of Result 1, the electronic content linked to by the selected result (e.g., content corresponding to Result 1) may be accessed and displayed in the content portion 2810.

Figure 29:
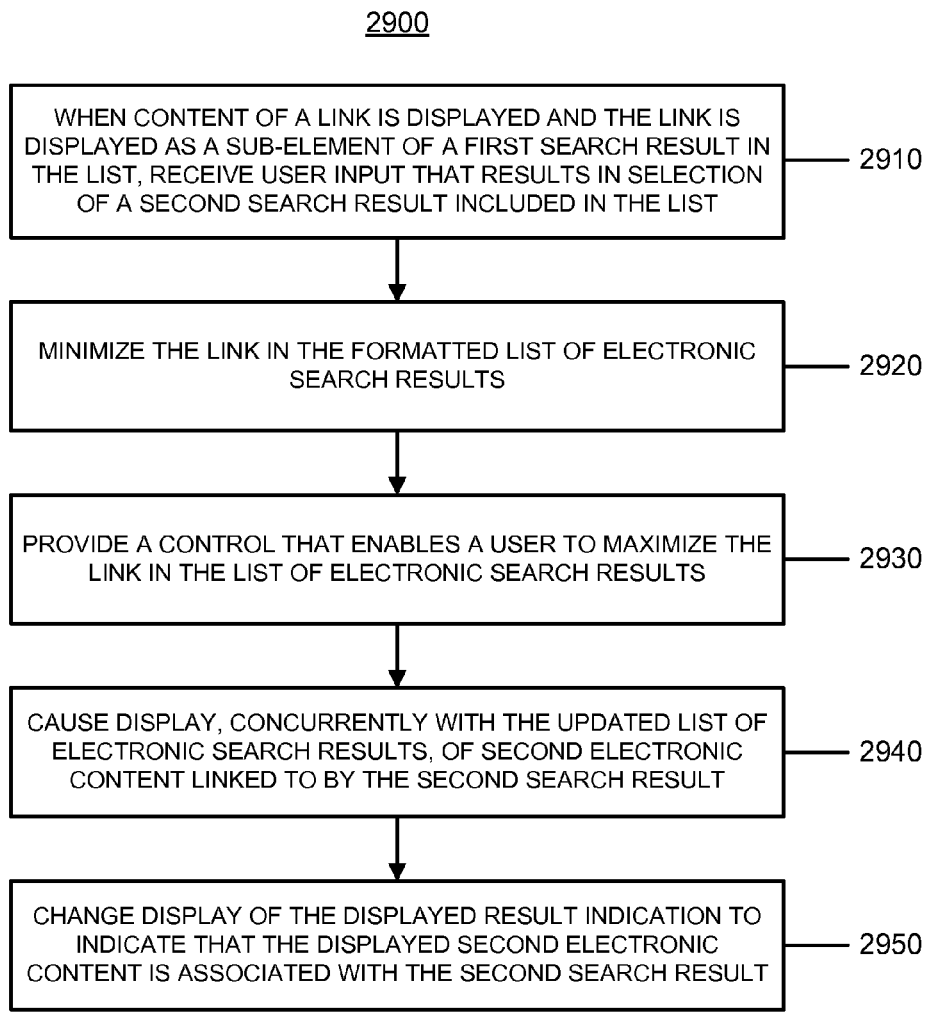

FIG. 29 illustrates an example of a process 2900 for automatically minimizing sub-elements included in a list of search results. When content of a link is displayed and the link is displayed as a sub-element of a first search result in the list, the search system 500 receives user input that results in selection of a second search result included in the list (2910). For instance, when content of a link is displayed and the link is displayed as a sub-element of a first search result in the list, the search system 500 may receive a user input command (e.g., a keyboard/keypad button press, a mouse click, a touch screen input, etc.) that selects a second, different search result included in the list of search results. The search system 500 may receive a user input command that selects a link to a second, different search result included in the electronic content of the link or may receive other user input that selects a second, different search result (e.g., selection of a back interface control in a browser).

The search system 500 minimizes the link in the formatted list of electronic search results (2920). For instance, the search system 500 reduces a focus on or size of the link in the formatted list of electronic search results. The search system 500 may reduce a focus of the link by changing a display color of the link (e.g., displaying in a lighter color that appears grayed out), removing a highlight or graphical indication that brings attention to the link, reducing a clarity of the displayed link, etc. The search system 500 may reduce a size of the link in the formatted list of electronic search results by displaying the link with a smaller font size, removing the link from display completely (e.g., hiding the link), etc. FIGS. 26 to 28 illustrate examples of sub-elements that have been minimized in a list of search results.

The search system 500 provides a control that enables a user to maximize the link in the list of electronic search results (2930). For example, the search system 500 displays a control (e.g., the control 2830) adjacent to the search result in the formatted list (e.g., Result 5) that is associated with the sub-elements that have been minimized. The control may include any type of control (e.g., an interface button, a list expander, etc.) and may be activated by any type of user input (e.g., a keyboard/keypad button press, a mouse click, a touch screen input, etc.). The control also may be displayed in any portion of the user interface. In some implementations, providing the control may include modifying the functionality of the search result (e.g., Result 5) that is associated with the sub-elements that have been minimized such that input related to the search result (e.g., a single mouse click, a right button mouse click, a hover over, etc.) enables a user to maximize the sub-elements.

The search system 500 causes display, concurrently with the updated list of electronic search results, of second electronic content linked to by the second search result (2940). For instance, the search system 500 causes a browser to access, over a network, second electronic content linked to by a URL of the second search result and display the second electronic content in a content portion of the browser (e.g., as shown in content portion 2810 of FIG. 28). The search system 500 may change display, in a content portion of a browser interface on the display device, of the content of the link to the second electronic content linked to by the second search result and may display, in a search results portion of the browser interface on the display device, of the reformatted list of electronic search results.

The search system 500 changes display of the displayed result indication to indicate that the displayed second electronic content is associated with the second search result (2950). For example, the search system 500 may update the displayed result indication to identify a displayed representation of the second search result in the formatted list of search results (e.g., rather than a sub-element of the first search result) and, thereby, indicate that the second electronic content is associated with the second search result (e.g., as shown by the updated displayed result indicator 2820 shown in FIG. 28). The search system 500 may change display of the displayed result indication by removing the prior displayed result indication and displaying a new displayed result indication for the second search result.

Referring again to FIG. 28, the interface 2800 includes links to electronic content included in the content displayed in the content portion 2810 of the interface 2800. As shown in FIG. 28, a user input icon 2850 may be displayed and manipulated by a user (e.g., using a mouse) to select a link (e.g., Link 3) included in the content displayed in the content portion 2810 of the interface 2800. For example, the user input icon 2850 may be positioned over the link (e.g., Link 3) when the user provides user input of a selection command.

Figure 30:
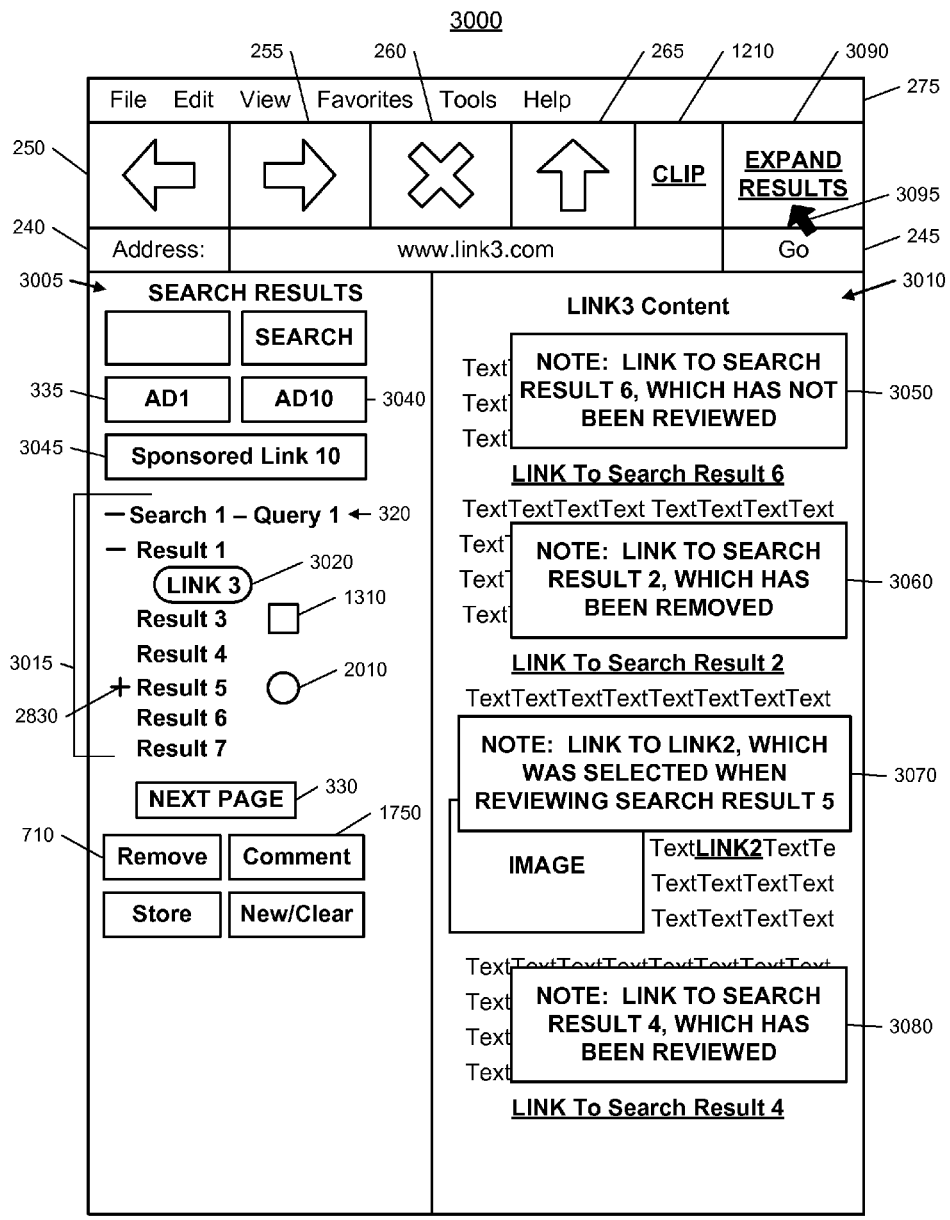

FIG. 30 illustrates an interface 3000 that may be displayed based on user selection of a link (e.g., Link 3) in the interface 2800. For instance, the interface 3000 may be displayed in response to selection of the link "LINK3" displayed in the Search Result 1 Content shown in the interface 2800. The interface 3000 includes a search results portion 3005 and a content portion 3010, each of which has been updated based on the selection of the link displayed in the content associated with Result 1. For instance, the updated items in the search results portion 3005 include an updated list of search results 3015, a displayed result indicator 3020, an advertisement 3040, and a sponsored link 3045. As shown, the updated list of search results 3015 includes a sub-element (e.g., LINK 3). The sub-element represents a link (of any type of media) that was selected by a user as the user was reviewing search results and is selectable by the user to access content corresponding to the link (e.g., LINK 3). The sub-element (e.g., LINK 3) is displayed as a sub-element of Result 5 because the link corresponding to the sub-element (e.g., LINK 3) was selected when the user was reviewing Result 1. In this regard, the history of a user's browsing when reviewing search results is tracked and displayed in the search results portion 3005 of the interface 3000.

The displayed result indicator 3020 has been updated and now identifies LINK3 to indicate that the currently displayed content corresponds to LINK3. A control that enables a user to minimize or expand the tracked browsing (e.g., links selected) from Result 1 is displayed to enable a user to control whether or not the tracked browsing is displayed. The second advertisement 3040 and the sponsored link 3045 represent a new advertisement and a new sponsored link that have been selected based on the user's selection of the link "LINK3" included in the content associated with Result 1.

The content portion 3010 displays a representation of electronic content linked to by the selected link (e.g., content corresponding to LINK3). In response to the selection of LINK3, the electronic content linked to by the selected link (e.g., content corresponding to LINK3) may be accessed and displayed in the content portion 3010.

The content corresponding to "LINK 3" includes links to other content and each of the links may or may not be related to search results or a user's review of the search results. When a link is related to a search result or the user's review of a search result, a pop-up interface (or other graphical indication) may be displayed to indicate to the user that the link is related to a search result or the user's review of a search result. In some implementations, the pop-up interface (or other graphical indication) may provide information related to the user's review of content corresponding the link. For example, the pop-up interface 3050 is displayed proximate to (e.g., directly above) a link to content corresponding to search result 6. Because the link links to the content corresponding to search result 6 and the user has yet to review the content corresponding to search result 6 (e.g., has not selected Result 6) in this particular search session, the pop-up interface 3050 indicates that the link is to search result 6 and also indicates that search result 6 has not been reviewed. Providing a graphical indication that the link is related to a search result with information related to the user's review of content corresponding to the link may assist a user in reviewing the content and making a decision on whether the user wants to select the link.

In another example, the pop-up interface 3060 is displayed proximate to (e.g., directly above) a link to content corresponding to search result 2. Because the link links to the content corresponding to search result 2 and the user has removed search result 2 from the list of search results in this particular search session, the pop-up interface 3060 indicates that the link is to search result 2 and also indicates that search result 2 has been removed. In a further example, the pop-up interface 3070 is displayed proximate to (e.g., directly above) a link to content corresponding to LINK2. Although LINK2 is not a search result, LINK2 was included in content corresponding to Result 5 and was selected by the user when reviewing Result 5. Accordingly, LINK2 is related to the user's review of the search results and information related to the user's review of LINK2 may be provided. Because the link links to the content corresponding to LINK2 and the user selected LINK2 when reviewing Result 5 in this particular search session, the pop-up interface 3070 indicates that the link is to LINK2 and also indicates that LINK2 was selected when the user was reviewing search result 5. In yet another example, the pop-up interface 3080 is displayed proximate to (e.g., directly above) a link to content corresponding to search result 4. Because the link links to the content corresponding to search result 4 and the user has reviewed search result 4 in this particular search session, the pop-up interface 3080 indicates that the link is to search result 4 and also indicates that search result 4 has been reviewed.

The pop-up interfaces 3050 to 3080 may be displayed immediately when the content is accessed and displayed in the content portion 3010. The pop-up interfaces 3050 to 3080 may be displayed for a predetermined amount of time (e.g., three seconds) and then fade from view to enable the user to more easily view the content displayed in the content portion 3010. In some implementations, the pop-up interfaces 3050 to 3080 may not be displayed immediately, but instead may be displayed when the user provides input that suggests the user may be interested in selecting the corresponding link (e.g., moving a user input icon in an area proximate to the link, selecting the link, hovering over the link, providing a command to display information related to links, etc.). In some examples, the links corresponding to the pop-up interfaces 3050 to 3080 may be displayed distinctly from other links to content that is not related to search results or a user's review of the search results. For instance, in these examples, the links may be highlighted, displayed in a different color, displayed with a different font size, and/or displayed with a graphical indicator associated with the link to indicate that information related to the link is available. The user then may provide user input to display the information related to the link if the user desires.

Figure 31:
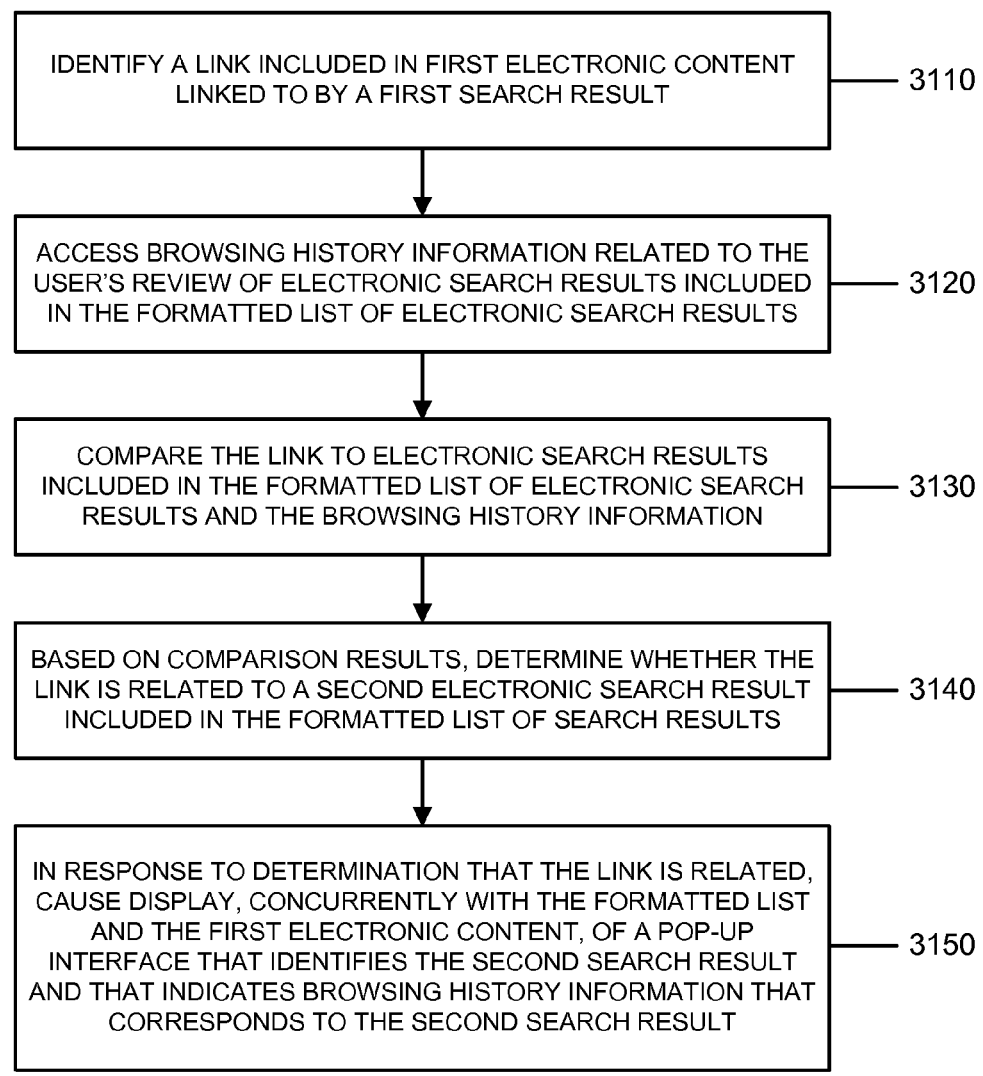

FIG. 31 illustrates an example of a process 3100 for displaying indicators relevant to links included on electronic content. The search system 500 identifies a link included in first electronic content linked to by a first search result (3110). For instance, the search system 500 may scan an electronic document and electronically identify links (e.g., hyperlinks) included in the electronic document. The search system 500 may identify one or more links within an electronic document in response to the electronic document being accessed or may identify one or more links within an electronic document in response to events that occur during a user's review of the electronic document (e.g., when the user positions an input icon over the link).

The search system 500 accesses browsing history information related to the user's review of electronic search results included in the formatted list of electronic search results (3120). For example, the search system 500 may access the browsing history information from local electronic storage of a client device or may receive, over a network, the browsing history information from a remote host device. The accessed browsing history information may include tracked information related to the user's review search results. For instance, the accessed browsing history information may include information indicating whether or not the user has reviewed the search result, how long the user reviewed the search result, whether the user removed the search result, whether the user added a comment to the search result, whether the user clipped content for the search result, links selected when the user reviewed the search result, information related to the user's review of selected links, and/or any other information related to a user's review of the search results included in the list.

The search system 500 compares the link to electronic search results included in the formatted list of electronic search results and the browsing history information (3130). The search system 500 may compare a network address (e.g., a URL) associated with the identified link to network addresses (e.g., URLs) associated with the electronic search results included in the formatted list and the links included in the accessed browsing history information that were selected when the user was reviewing the search results. In some implementations, the search system 500 may access content linked to by the link (e.g., without displaying the content), access content linked to by the electronic search results (e.g., without displaying the content) and the links that were selected when the user was reviewing the search results, and compare the accessed content.

Based on comparison results, the search system 500 determines whether the link is related to a second electronic search result included in the formatted list of search results (3140). For instance, when the search system 500 compares the network address (e.g., the URL) associated with the identified link to network addresses (e.g., URLs) associated with the electronic search results included in the formatted list and the links selected when reviewing search results, the search system 500 determines whether the network address (e.g., the URL) associated with the identified link matches any of the network addresses (e.g., URLs) associated with the electronic search results included in the formatted list or the links selected when reviewing search results. When the search system 500 compares the content linked to by the identified link to the content linked to by the search results included in the formatted list and the links selected when reviewing search results, the search system 500 determines whether the content linked to by the identified link matches content linked to by any of the search results included in the list or the links selected when reviewing results.

In response to a determination that the link is related to a second search result, the search system 500 causes display, concurrently with the formatted list and the first electronic content, of a pop-up interface that identifies the second search result and that indicates browsing history information that corresponds to the second search result (3150). The search system 500 may display the pop-up interface over the formatted list of search results and electronic content, while the formatted list of search results and electronic content are maintained in the display in the background. The search system 500 may display the pop-up interface proximate to the link, proximate to the search result to which the link corresponds, or in any other portion of the interface. The browsing history information that corresponds to the second search result may indicate whether or not the user has reviewed the search result, how long the user reviewed the search result, whether the user removed the search result, whether the user added a comment to the search result, whether the user clipped content for the search result, links selected when the user reviewed the search result, information related to the user's review of selected links, and whether the identified link in the content corresponds to a link selected when reviewing the second search result. FIG. 30 shows examples of pop-up interfaces (e.g., the pop-up interfaces 3050 to 3080) that are displayed proximate to links.

Referring again to FIG. 30, the interface 3000 includes an expand results interface control 3090. The expand results interface control 3090 may be an additional control added to a chrome portion of a browser as a user reviews search results. Adding the expand results interface control 3090 to the chrome portion of the browser may enhance the functionality of the browser and may provide more area in the search results portion 3005 for search results information and other controls. The expand results interface control 3090 enables a user to expand a display of the search results in the formatted list 3015. As shown in FIG. 30, a user input icon 3095 may be displayed and manipulated by a user (e.g., using a mouse) to select the expand results interface control 3090. For example, the user input icon 3095 may be positioned over the expand results interface control 3090 when the user provides user input of a selection command.

Figure 32:
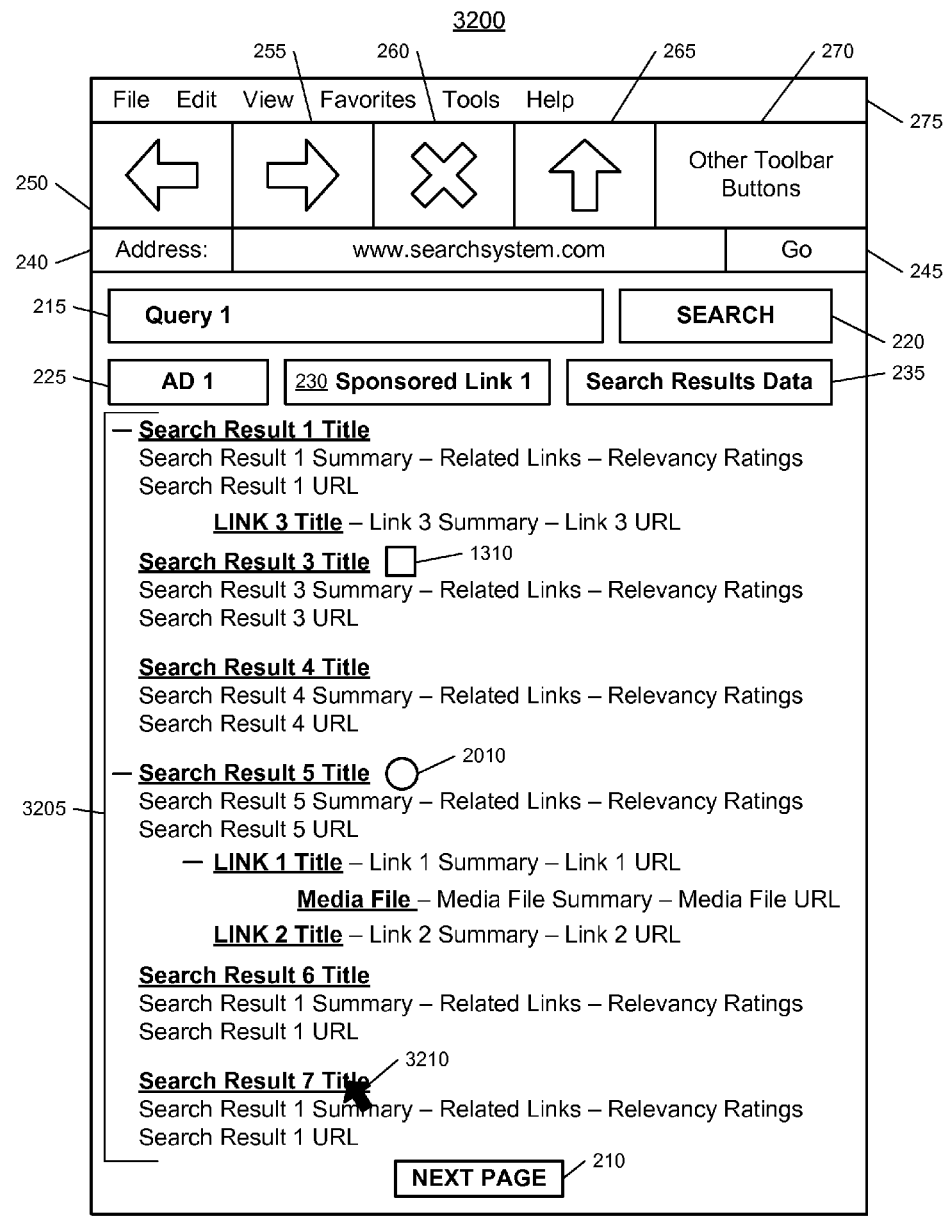

FIG. 32 illustrates an interface 3200 that may be displayed based on user selection of an expand results interface control 3090 in the interface 3000. The interface 3200 includes an expanded list of search results 3205. The expanded list of search results 3205 is displayed in a larger display area than a display area of the search results portion 3005 of the interface 3000. The expanded list of search results 3205 also may include more detailed information (e.g., more detailed summary information) about the search results included in the list of search results. The interface 3200 may be similar to the interface 200 displayed to a user initially in response to a user submitting a query, but with tracked browsing history information related to a user's review of the search results prior to selection of the expand results interface control 3090.

Figure 33:
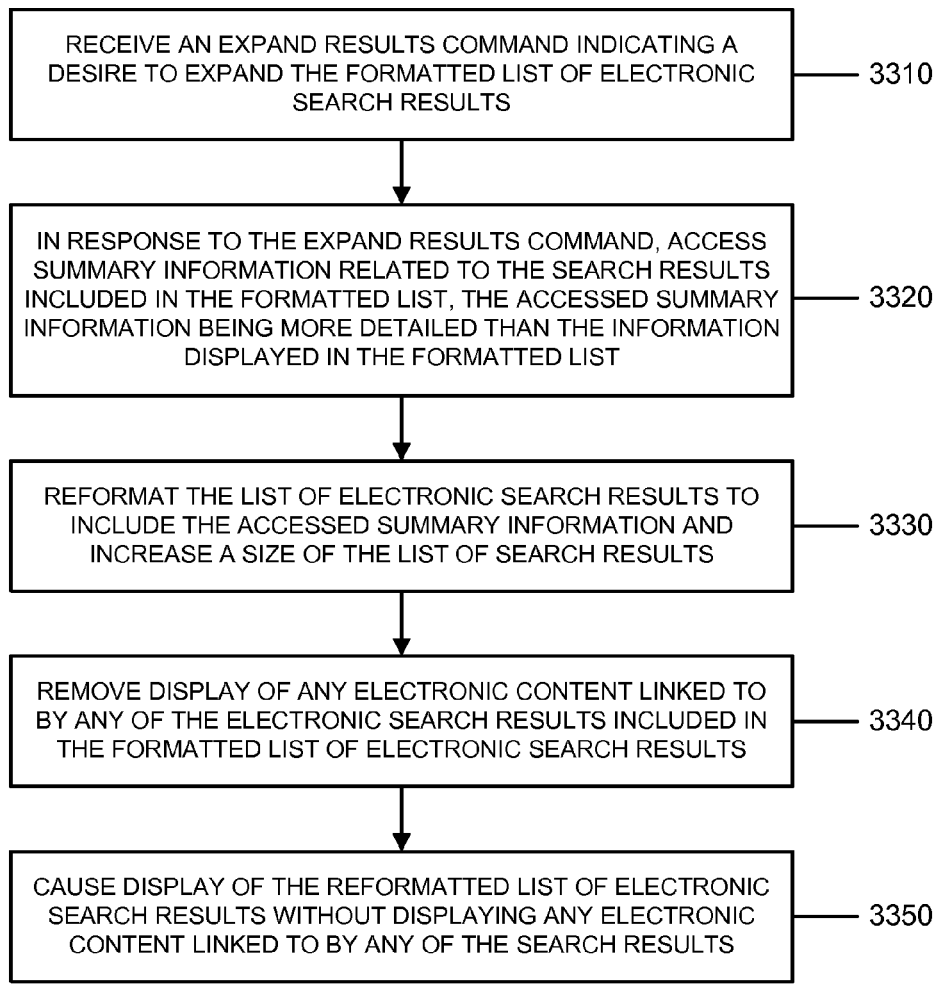

FIG. 33 illustrates an example of a process 3300 for providing an expanded list of search results. The search system 500 receives an expand results command indicating a desire to expand the formatted list of electronic search results (3310). For instance, as discussed above with respect to FIG. 32, the search system 500 may receive user input selecting an expand results interface control or some other type of user input (e.g., an oral comment instruction, a gesture input, etc.) that explicitly indicates a desire to expand a display of the formatted list of search results.

In response to the expand results command, the search system 500 accesses summary information related to the search results included in the formatted list, the accessed summary information being more detailed than the information displayed in the formatted list (3320). The summary information may be more detailed than information displayed in the formatted list. The search system 500 may access the summary information from local electronic storage or may receive, over a network, the summary information from a remote device (e.g., a search engine).

The search system 500 reformats the list of electronic search results to include the accessed summary information and increase a size of the list of search results (3330). The search system 500 may increase a horizontal dimension and/or vertical dimension of an area being used to display the search results. The search system 500 also may increase a font size of the text used to represent the search results. The search system 500 further may space the search results further apart and include the more detailed summary information in the list of search results (e.g., the more detailed title, a summary, related links, relevancy ratings, a network address of the search results, etc.). In some implementations, the search system 500 maintains tracked browsing history (e.g., sub-elements) in the reformatted list of search results. In these implementations, the search system 500 may include more detailed summary information for tracked links in the list of search results (e.g., a more detailed title for the link, a summary of the link, related links to the link, relevancy ratings for the link, a network address of the link, etc.). In addition, the search system 500 may include controls that enable a user to expand/minimize the browsing history for the search results and may include comment/clip indicators for results associated with comments/clipped content.

The search system 500 removes display of any electronic content linked to by any of the electronic search results included in the formatted list of electronic search results (3340) and causes display of the reformatted list of electronic search results without displaying any electronic content linked to by any of the search results (3350). For instance, the search system 500 removes any displayed content linked to by any of the search results and displays the reformatted (e.g., expanded) list of search results in a single interface. The search system 500 may return a browser display to a search engine that initially provided the search results.

Referring again to FIG. 32, a user input icon 3210 may be displayed and manipulated by a user (e.g., using a mouse) to select a search result included in the expanded list (e.g., Search Result 7). For example, the user input icon 3210 may be positioned over the search result included in the expanded list (e.g., Search Result 7) when the user provides user input of a selection command.

Figure 34:
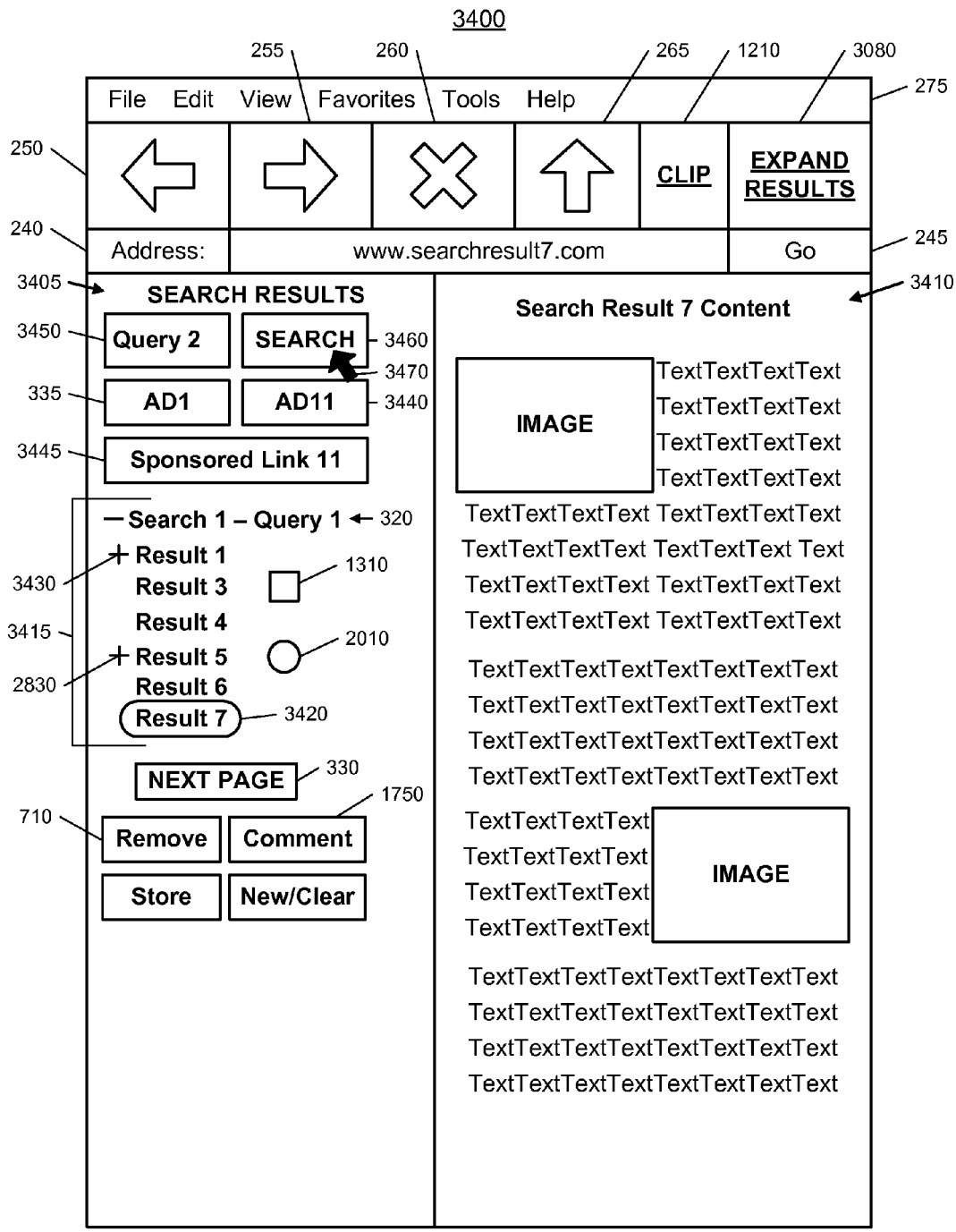

FIG. 34 illustrates an interface 3400 that may be displayed based on user selection of a search result (e.g., Search Result 7) in the interface 3200. The interface 3400 includes a search results portion 3405 and a content portion 3410. The search results portion 3405 includes an updated list of search results 3415, a displayed result indicator 3420, an expansion control 3430, an advertisement 3440, and a sponsored link 3445. As shown, the sub-elements (e.g., browsing history) related to Result 1 have been automatically minimized without human intervention in the updated list of search results 3415 and the updated list of search results 3415 has been reformatted from the expanded list of search results to fit in the search results portion 3405. The displayed result indicator 3420 identifies Result 7 to indicate that the currently displayed content corresponds to Result 7. A control 3430 that enables a user to minimize or expand the tracked browsing (e.g., links selected) from Result 1 is displayed to enable a user to control whether or not the tracked browsing is displayed. The second advertisement 3440 and the sponsored link 3445 represent a new advertisement and a new sponsored link that have been selected based on the user's selection of Result 7.

The content portion 3410 displays a representation of electronic content linked to by the selected search result (e.g., content corresponding to Result 7). In response to the selection of Result 7, the electronic content linked to by the selected result (e.g., content corresponding to Result 7) may be accessed and displayed in the content portion 3410.

The search results portion 3405 also includes an input field 3450 and a search control 3460. The input field 3450 enables a user to enter a search query that includes one or more terms and parameters (e.g., logical operators) defining the desired analysis of the search query. When a user selects the search control 3460 using, for example, an input device 3470, the search system 500 performs a search using the search query entered in the input field 3450 and displays results of the search to the user.

Figure 35:
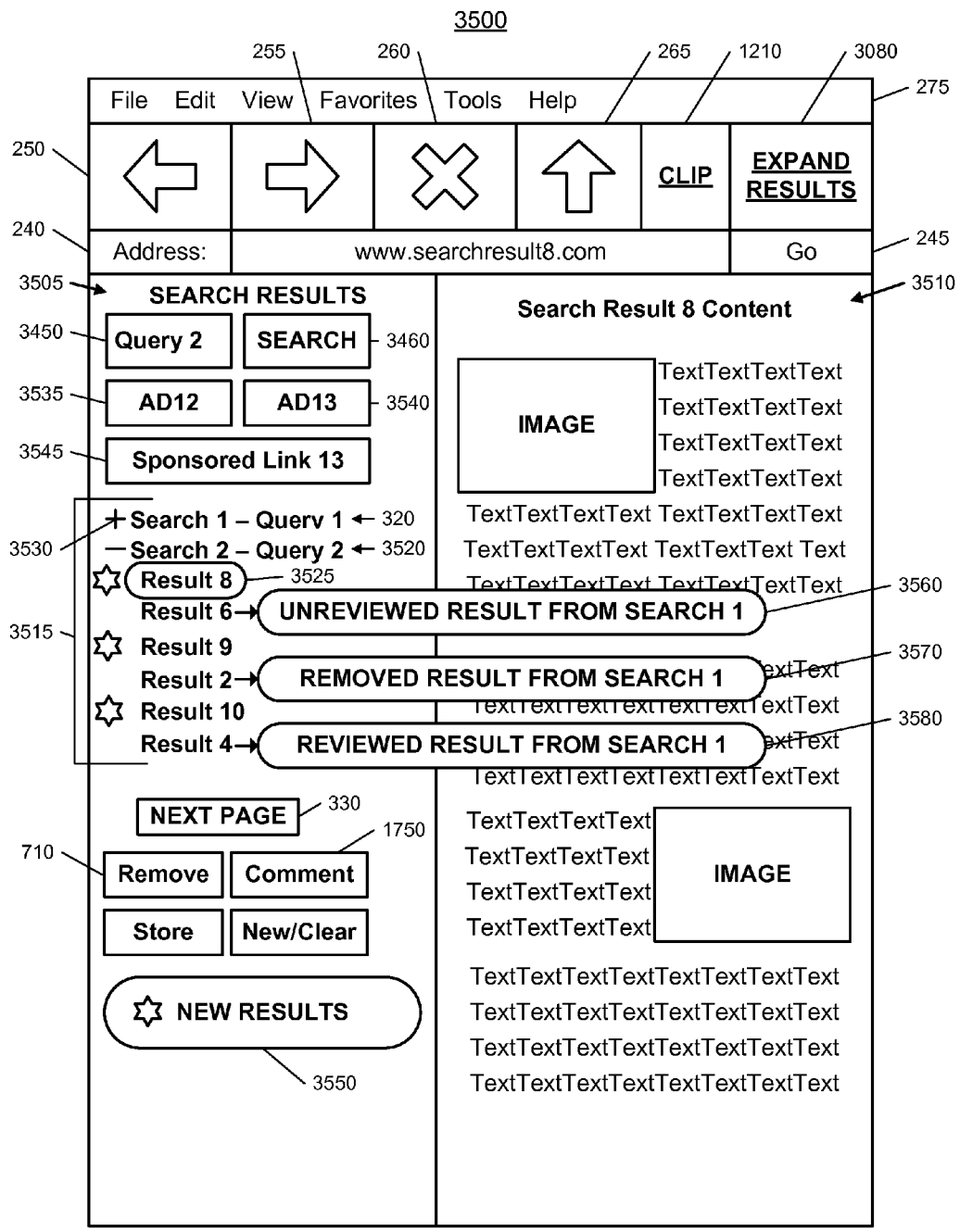

FIG. 35 illustrates an interface 3500 that may be displayed based on user submission of a search query (e.g., Query 2) in the interface 3400. The interface 3500 includes a search results portion 3505 and a content portion 3510, each of which has been updated based on user submission of a search query (e.g., Query 2) in the interface 3400. For instance, the updated items in the search results portion 3505 include an updated list of search results 3515, a second search identifier 3520, a displayed result indicator 3525, an expansion control 3530, a first advertisement 3535, a second advertisement 3540, and a sponsored link 3545. As shown, the updated list of search results 3515 includes search results identified as being responsive to the search query (e.g., Query 2) in the interface 3400. The updated list of search results 3515 may be similar to lists of search results described above, but for a second query that is different than the first query entered in the search session.

The search identifier 3520 identifies a number of the search within a particular search session (e.g., Search 2) to which the list of search results 3515 corresponds and also identifies the query (e.g., Query 2) to which the list of search results 3515 is responsive. The search identifier 3520 is associated with a control element that enables a user to expand (e.g., enable display) or minimize (e.g., hide from display) the list of search results 3515.

The displayed result indicator 3525 has been updated and now identifies Result 8 to indicate that the currently displayed content corresponds to Result 8. The displayed result indicator 3525 identifies Result 8 because Result 8 is the first result included in the list of search results responsive to Query 2 (e.g., the result in the second list that is most relevant to Query 2). The expansion control 3530 is displayed in association with search identifier 320 that corresponds to the first query. The expansion control 3530 is enables a user to expand (e.g., enable display) or minimize (e.g., hide from display) the list of search results responsive to the first query. As shown, in response to submission of a second query in the interface 3400, a first list of search results responsive to the first query is minimized (e.g., hidden from display) automatically without human intervention and a second list of search results responsive to the second query is displayed automatically without human intervention.

The first advertisement 3535 is a new advertisement that has been selected based on the performance of the second search using the second query. The second advertisement 3540 and the sponsored link 3545 represent a new advertisement and a new sponsored link that have been selected based on the selection of the search result "Result 8" included in the second list of search results responsive to the second query.

The content portion 3510 displays a representation of electronic content linked to by the selected search result (e.g., content corresponding to Result 8). In response to the selection of Result 8 (e.g., automatic selection because Result 8 was the first result in the second list of search results), the electronic content linked to the selected result (e.g., content corresponding to Result 8) may be accessed and displayed in the content portion 3510.

The interface 3500 further includes several graphical indications that provide a user with information related a user's previous review of search results in the particular search session. For example, the interface 3500 has a new results graphical indication 3550 that provides an indication of which results in the second list are new results (e.g., results that are not included in the first list of search results responsive to the first query). In this example, the graphical indication 3550 designates a symbol that is displayed adjacent to each of the new search results.

For search results in the second list of search results that are also included in the first list of search results, the interface 3500 includes one or more graphical indications that indicate that the search result was included in the first search and provides information related to the user's review of the search result when reviewing search results returned from the first search. The graphical indication 3560 indicates that the corresponding result (e.g., Result 6) was included in the first search and was not reviewed. The graphical indication 3570 indicates that the corresponding result (e.g., Result 2) was included in the first search and was removed. The graphical indication 3580 indicates that the corresponding result (e.g., Result 4) was included in the first search and was reviewed. The graphical indications 3550 to 3580 may assist a user in review of the second list of search results and may assist the user in leveraging information learned when reviewing the search results returned in the first search. This may be particularly useful when the user did not find the information the user was searching for in the first search and the second search represents an additional search for the desired information (e.g., the second query is a reformulated version of the first query). In this regard, the graphical indications 3550 to 3580 may assist a user in identifying results the user has previously reviewed without having to select the result a second time.

Figure 36:
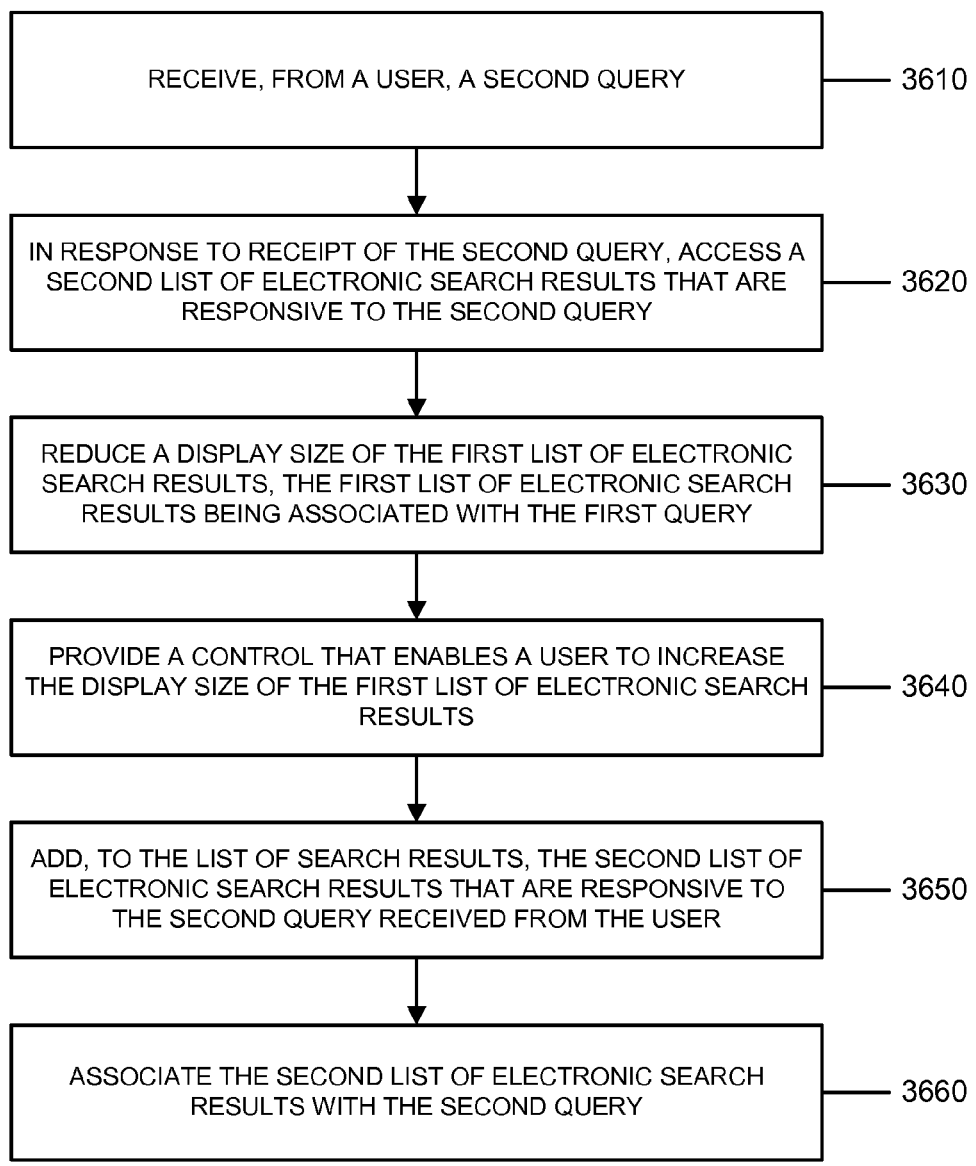

FIG. 36 illustrates an example of a process 3600 for processing a second query. The search system 500 receives, from a user, a second query (3610). For instance, the search system 500 receives user input entering a search query that includes one or more terms and parameters (e.g., logical operators) defining the desired analysis of the search query.

In response to receipt of the second query, the search system 500 accesses a second list of electronic search results that are responsive to the second query (3620). For example, the search system 500 may perform a search of electronic content based on the second query and identify a list of electronic search results that are responsive to the second query. The search system 500 also may submit the second query to a search engine and receive a list of electronic search results identified by the search engine.

The search system 500 minimizes (e.g., reduces a display size) of the first list of electronic search results, the first list of electronic search results being associated with the first query (3630). For instance, the search system 500 reduces a focus on or size of the first list of electronic search results. The search system 500 may reduce a focus of the first list of electronic search results by changing a display color of the first list of electronic search results (e.g., displaying in a lighter color that appears grayed out), removing a highlight or graphical indication that brings attention to the first list of electronic search results, reducing a clarity of the displayed first list of electronic search results, etc. The search system 500 may reduce a size of the first list of electronic search results by displaying the first list of electronic search results with a smaller font size, removing the first list of electronic search results from display completely (e.g., hiding the first list of electronic search results), etc. FIG. 35 illustrates an example of a first list of search results that has been minimized.

The search system 500 provides a control that enables a user to increase the display size of the first list of electronic search results (3640). For example, the search system 500 displays a control (e.g., the control 3530) adjacent to the search identifier associated with the first list of electronic search results that has been minimized. The control may include any type of control (e.g., an interface button, a list expander, etc.) and may be activated by any type of user input (e.g., a keyboard/keypad button press, a mouse click, a touch screen input, etc.). The control also may be displayed in any portion of the user interface. In some implementations, providing the control may include modifying the functionality of the search identifier (e.g., the search identifier 320) that is associated with the first list of electronic search results that has been minimized such that input related to the search identifier (e.g., a single mouse click, a right button mouse click, a hover over, etc.) enables a user to maximize the first list of electronic search results.

The search system 500 adds, to the list of search results, the second list of electronic search results that are responsive to the second query received from the user (3650). For instance, the search system 500 may display the second list of electronic search results as a second list of search results (e.g., a separate list). The search system 500 also may add the second list of search results to the end of the first list of search results to include a single, combined list of search results.

The search system 500 associates the second list of electronic search results with the second query (3660). For instance, the search system 500 may visually distinguish the second list of electronic search results from the first list of electronic search results (e.g., display the second list of search results in another color, or use any other technique described throughout the disclosure). The search system 500 may display a search identifier related to the second list of search results to associate the second list of electronic search results with the second query. The search identifier may include the second query.

Figure 37:
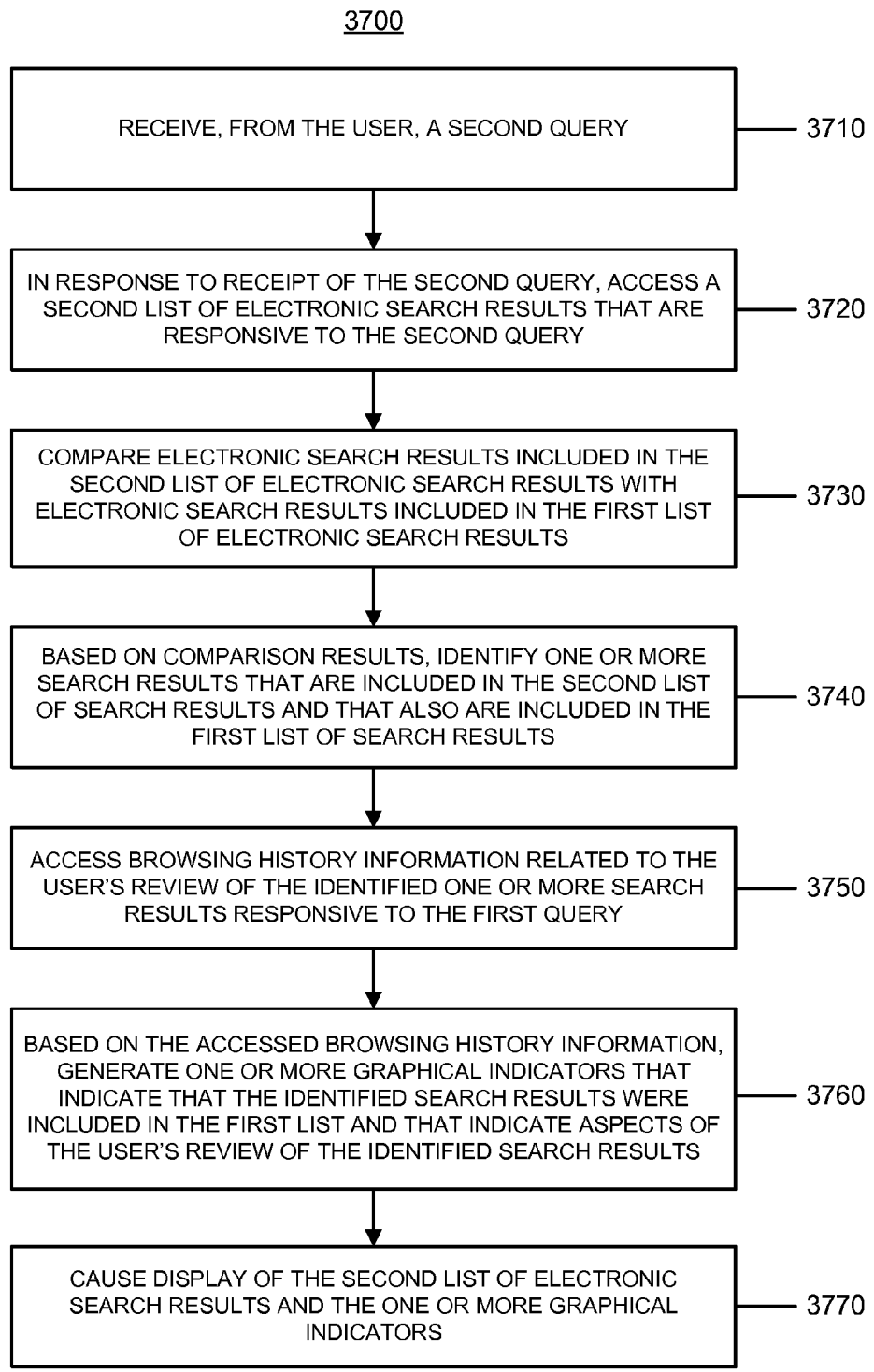

FIG. 37 illustrates an example of a process 3700 for displaying an indication for an electronic search result included a list of search results that is based on whether the electronic search result was included in a prior search and aspects of a user's review of the electronic search result. The search system 500 receives, from a user, a second query (3710). For instance, the search system 500 receives user input entering a search query that includes one or more terms and parameters (e.g., logical operators) defining the desired analysis of the search query.

In response to receipt of the second query, the search system 500 accesses a second list of electronic search results that are responsive to the second query (3720). For example, the search system 500 may perform a search of electronic content based on the second query and identify a list of electronic search results that are responsive to the second query. The search system 500 also may submit the second query to a search engine and receive a list of electronic search results identified by the search engine.

The search system 500 compares electronic search results included in the second list of electronic search results with electronic search results included in the first list of electronic search results (3730). The search system 500 may compare network addresses (e.g., URLs) associated with search results included in the second list to network addresses (e.g., URLs) associated with the electronic search results included in the first list. In some implementations, the search system 500 may access content linked to by the search results included in the second list (e.g., without displaying the content), access content linked to by the search results in the first list (e.g., without displaying the content), and compare the accessed content.

Based on comparison results, the search system 500 identifies one or more search results that are included in the second list of search results and that also are included in the first list of search results (3740). For instance, when the search system 500 compares the network addresses (e.g., URLs) associated with the search results in the second list to network addresses (e.g., URLs) associated with the search results in the first list, the search system 500 determines whether the network addresses (e.g., URLs) associated with the search results in the second list match any of the network addresses (e.g., URLs) associated with the search results in the first list. When the search system 500 compares the content linked to by the search results in the second list to the content linked to by the search results in the first list, the search system 500 determines whether the content linked to by the search results in the second list matches content linked to by any of the search results in the first list.

The search system 500 accesses browsing history information related to the user's review of the identified one or more search results responsive to the first query (3750). For example, the search system 500 may access the browsing history information from local electronic storage of a client device or may receive, over a network, the browsing history information from a remote host device. The accessed browsing history information may include tracked information related to the user's review search results. For instance, the accessed browsing history information may include information indicating whether or not the user has reviewed the search result, how long the user reviewed the search result, whether the user removed the search result, whether the user added a comment to the search result, whether the user clipped content for the search result, links selected when the user reviewed the search result, information related to the user's review of selected links, and/or any other information related to a user's review of the search results included in the list.

Based on the accessed browsing history information, the search system 500 generates one or more graphical indicators that indicate that the identified search results were included in the first list and that indicate aspects of the user's review of the identified search results (3760) and causes display of the second list of electronic search results and the one or more graphical indicators (3770). The search system 500 may display the graphical indicators over the second list of search results and electronic content, while the second list of search results and electronic content are maintained in the display in the background. The search system 500 may display the graphical indicators proximate to the corresponding search results, or in any other portion of the interface. The browsing history information that corresponds to the search results may indicate whether or not the user has reviewed the search result, how long the user reviewed the search result, whether the user removed the search result, whether the user added a comment to the search result, whether the user clipped content for the search result, links selected when the user reviewed the search result, information related to the user's review of selected links, and whether the identified link in the content corresponds to a link selected when reviewing the second search result. FIG. 35 shows examples of graphical indicators (e.g., the graphical indications 3550 to 3580) that are displayed.

Figure 38:
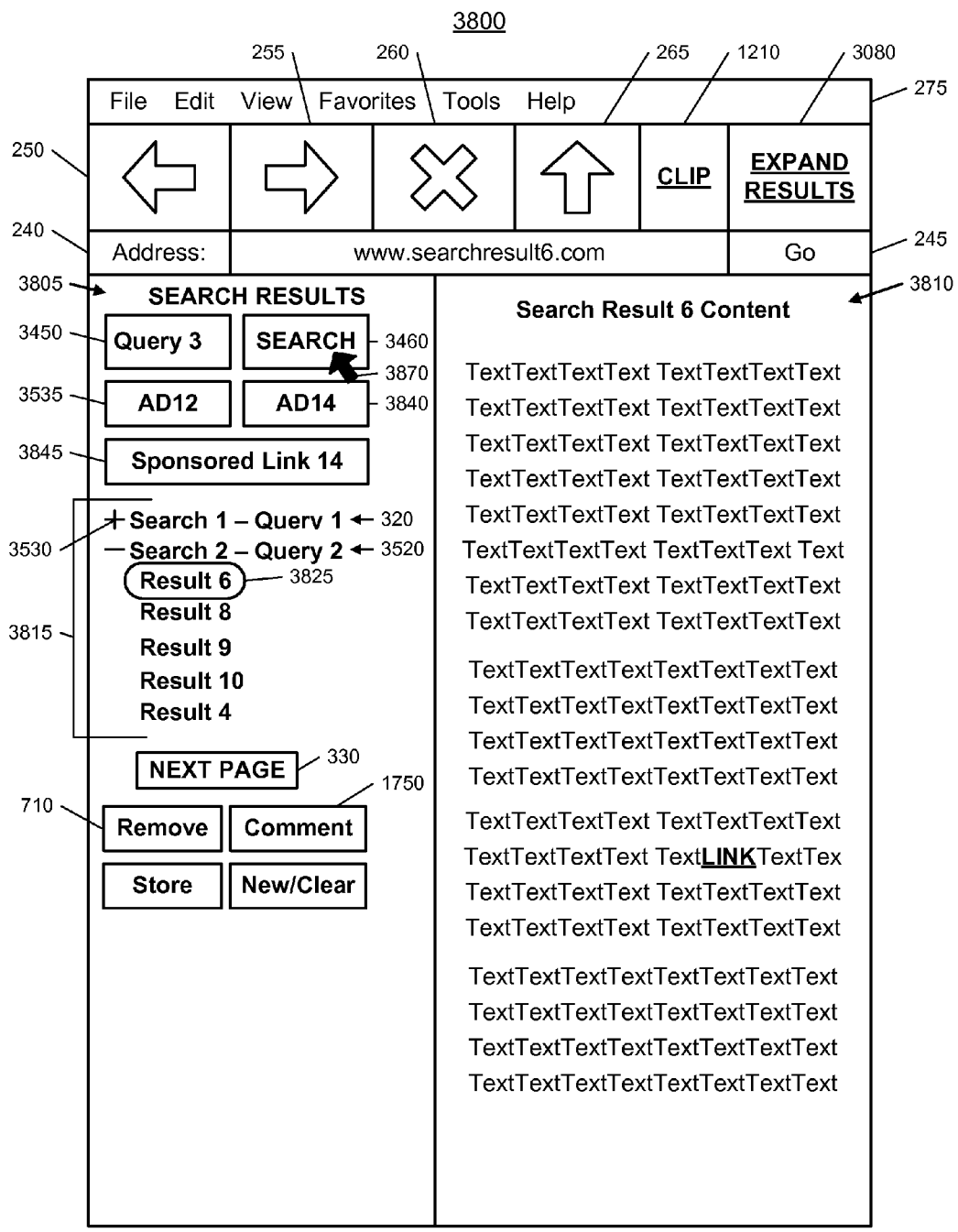

FIG. 38 illustrates an interface 3800 that may be displayed based on user submission of a search query (e.g., Query 2) in the interface 3400. The interface 3800 may be displayed as an alternative to the interface 3500 discussed above with respect to FIG. 35. In the interface 3800, past browsing history of search results is used to sort and order the second list of search results responsive to the second search query (e.g., Query 2).

The interface 3800 includes a search results portion 3805 and a content portion 3810, each of which has been updated based on user submission of a search query (e.g., Query 2) in the interface 3400. For instance, the items in the search results portion 3805 that are updated and different from the interface 3500 include an updated list of search results 3815, a displayed result indicator 3825, a second advertisement 3840, and a sponsored link 3845. As shown, the updated list of search results 3815 includes search results identified as being responsive to the search query (e.g., Query 2) in the interface 3400. The updated list of search results 3815 may be similar to lists of search results described above, but for a second query that is different than the first query entered in the search session. The updated list of search results 3815 may be sorted and ordered based on past browsing history of search results that the system automatically tracks without human intervention. For instance, as shown, Result 2, which was included in the updated list of search results 3515, is not included in the updated list of search results 3815 because Result 2 was removed from the first list of search results responsive to the first query (e.g., Query 1) when the user was reviewing the first list of search results and the system may filter out results that were previously removed. In addition, Result 6, which was included in the updated list of search results 3515, but not reviewed by the user, is ordered first in the updated list of search results 3815 because Result 6 was included in both the first search and the second search (e.g., suggesting that Result 6 is relevant to the user's desired information) and has not been reviewed by the user. The new results (e.g., Result 8, Result 9, and Result 10) are ordered next in the updated list of search results 3815 based on their respective relevancy ratings to the second query and prior results that have been reviewed (e.g., Result 4) are ordered last in the updated list of search results 3815 based on their respective relevancy ratings to the second query. Using the past browsing history tracked for the user may provide more accurate sorting and ordering of search results that differs from merely using the relevancy ratings to the second query.

The displayed result indicator 3825 has been updated and now identifies Result 6 to indicate that the currently displayed content corresponds to Result 6. The displayed result indicator 3825 identifies Result 6 because Result 6 is the first result included in the list of search results responsive to Query 2. The second advertisement 3840 and the sponsored link 3845 represent a new advertisement and a new sponsored link that have been selected based on the selection of the search result "Result 6" included in the second list of search results.

The content portion 3810 displays a representation of electronic content linked to by the selected search result (e.g., content corresponding to Result 6). In response to the selection of Result 6 (e.g., automatic selection because Result 6 was the first result in the second list of search results), the electronic content linked to the selected result (e.g., content corresponding to Result 6) may be accessed and displayed in the content portion 3810.

Figure 39:
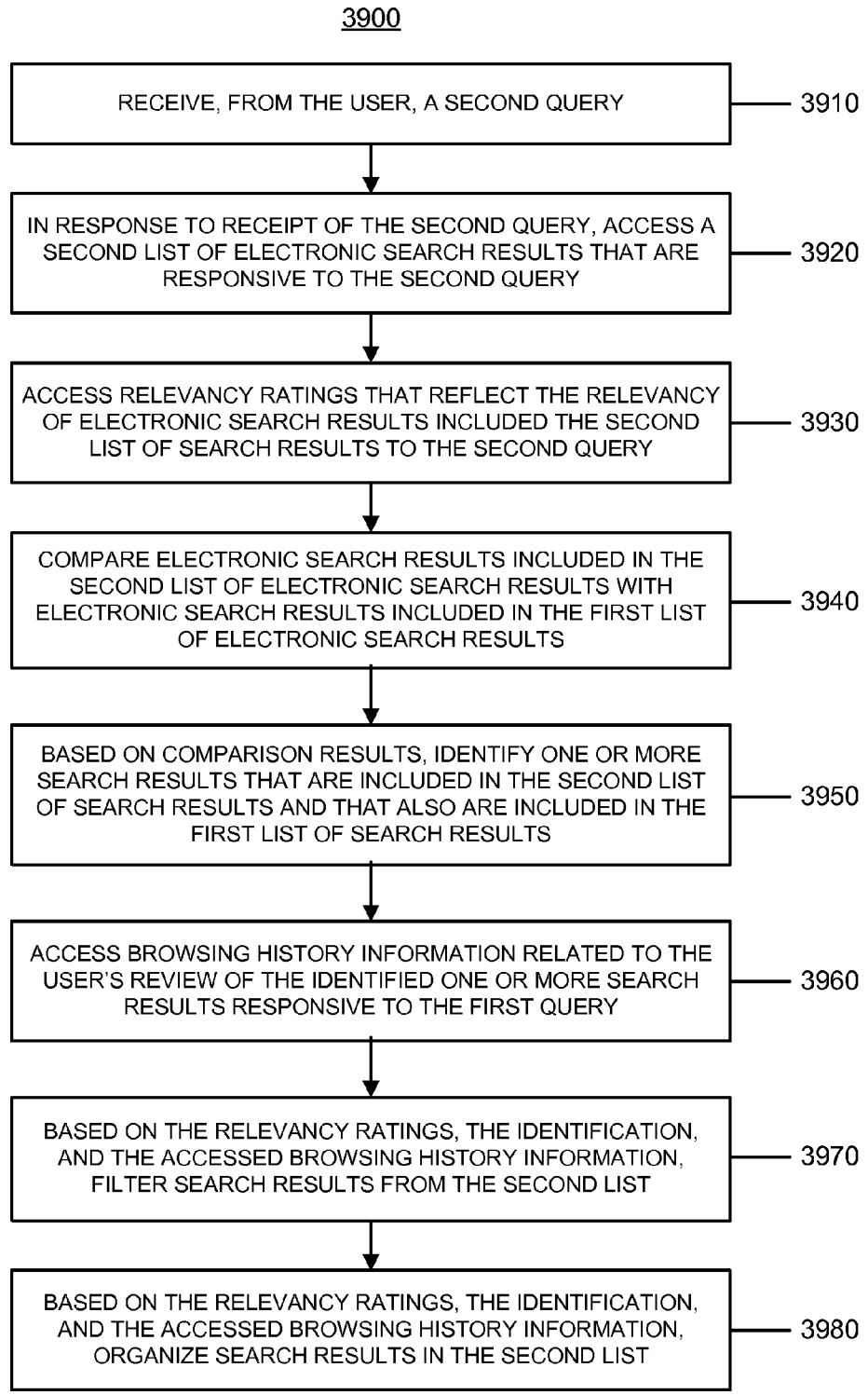

FIG. 39 illustrates an example of a process 3900 for organizing search results responsive to a query based on prior searches. The search system 500 receives, from a user, a second query (3910). For instance, the search system 500 receives user input entering a search query that includes one or more terms and parameters (e.g., logical operators) defining the desired analysis of the search query.

In response to receipt of the second query, the search system 500 accesses a second list of electronic search results that are responsive to the second query (3920). For example, the search system 500 may perform a search of electronic content based on the second query and identify a list of electronic search results that are responsive to the second query. The search system 500 also may submit the second query to a search engine and receive a list of electronic search results identified by the search engine.

The search system 500 accesses relevancy ratings that reflect the relevancy of electronic search results included the second list of search results to the second query (3930). For example, the search system 500 may access the relevancy ratings from local electronic storage of a client device, may receive, over a network, the relevancy ratings from a remote host device, or may compute the relevancy ratings. The relevancy ratings may indicate a degree (e.g., a percentage) of how relevant a particular result is to the second query.

The search system 500 compares electronic search results included in the second list of electronic search results with electronic search results included in the first list of electronic search results (3940). The search system 500 may compare network addresses (e.g., a URLs) associated with search results included in the second list to network addresses (e.g., URLs) associated with the electronic search results included in the first list. In some implementations, the search system 500 may access content linked to by the search results included in the second list (e.g., without displaying the content), access content linked to by the search results in the first list (e.g., without displaying the content), and compare the accessed content.

Based on comparison results, the search system 500 identifies one or more search results that are included in the second list of search results and that also are included in the first list of search results (3950). For instance, when the search system 500 compares the network addresses (e.g., URLs) associated with the search results in the second list to network addresses (e.g., URLs) associated with the search results in the first list, the search system 500 determines whether the network addresses (e.g., URLs) associated with the search results in the second list match any of the network addresses (e.g., URLs) associated with the search results in the first list. When the search system 500 compares the content linked to by the search results in the second list to the content linked to by the search results in the first list, the search system 500 determines whether the content linked to by the search results in the second list matches content linked to by any of the search results in the first list.

The search system 500 accesses browsing history information related to the user's review of the identified one or more search results responsive to the first query (3960). For example, the search system 500 may access the browsing history information from local electronic storage of a client device or may receive, over a network, the browsing history information from a remote host device. The accessed browsing history information may include tracked information related to the user's review search results. For instance, the accessed browsing history information may include information indicating whether or not the user has reviewed the search result, how long the user reviewed the search result, whether the user removed the search result, whether the user added a comment to the search result, whether the user clipped content for the search result, links selected when the user reviewed the search result, information related to the user's review of selected links, and/or any other information related to a user's review of the search results included in the list.

Based on the relevancy ratings, the identification, and the accessed browsing history information, the search system 500 filters search results from the second list (3970). For instance, the search system 500 may filter search results for which the accessed browsing history information indicates that the search result has been previously removed by the user and may filter search results associated with relevancy ratings that are below a threshold. In some implementations, the search system 500 may adjust a relevancy rating threshold or may have multiple, different thresholds based on browsing history information. In these implementations, the search system 500 may use a first relevancy threshold for results that have been reviewed and not removed from a prior search and may use a second relevancy threshold that is higher than the first relevancy threshold for results that have been removed from a prior search (e.g., a previously removed search result needs to be more relevant to the second query than a result that was not removed to remain in the list). The search system 500 also may set/use different relevancy ratings based on whether the search result was reviewed (e.g., a higher threshold for results reviewed and a lower threshold for results that were not reviewed), how long the user reviewed a result in a prior search (e.g., a higher threshold for results reviewed a shorter amount of time), whether the user added a comment to the search result, (e.g., a lower threshold for results on which the user commented), and whether the user clipped content for the search result (e.g., a lower threshold for results from which the user clipped content). New results may use a different threshold than prior results.

Based on the relevancy ratings, the identification, and the accessed browsing history information, the search system 500 organizes search results in the second list (3980). For example, the search system 500 may group similar types of results together (e.g., new results, reviewed results, unreviewed results, removed results, etc.). The search system 500 also may weight relevancy ratings based on whether the search result was included in a prior search and the browsing history of search results included in a prior search. For instance, the search system 500 may use a first weighting for results from a prior search that have not been reviewed, a second weighting for new results, a third weighting for results from a prior search that have been reviewed, and a fourth weighting for results from a prior search that have been removed. The first weighting may result in a higher relevancy to the search than the second weighting, the second weighting may result in a higher relevancy to the search than the third weighting, and the third weighting may result in a higher relevancy to the search than the fourth weighting. The search system 500 may order results based on the relevancy ratings weighted based on the accessed browsing history.

Referring again to FIG. 38, a user input icon 3870 may be displayed and manipulated by a user (e.g., using a mouse) to perform a third search. For instance, the user input icon 3870 may be positioned over the search control 3460 when the user provides input of a selection command and has entered a third query (e.g., Query 3) in the input field 3450.

Figure 40:
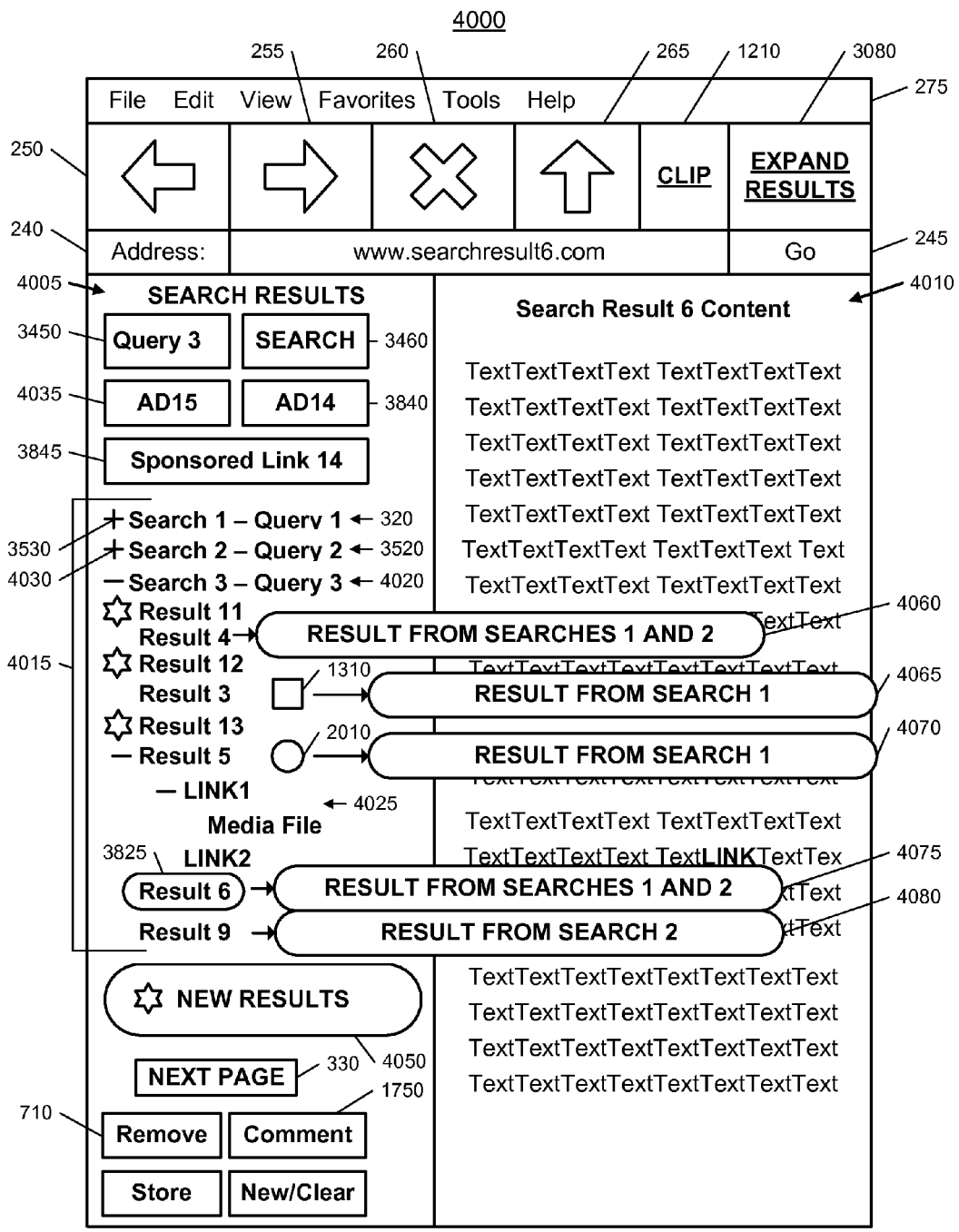

FIG. 40 illustrates an interface 4000 that may be displayed based on user submission of a search query (e.g., Query 3) in the interface 3800. The interface 4000 includes a search results portion 4005 and a content portion 4010, each of which has been updated based on user submission of a third search query (e.g., Query 3) in the interface 3800. For instance, the updated items in the search results portion 4005 include an updated list of search results 4015, a third search identifier 4020, browsing history 4025 (e.g., sub-elements related to selected links), an expansion control 4030, and a first advertisement 4035. As shown, the updated list of search results 4015 includes search results identified as being responsive to the third search query (e.g., Query 3) in the interface 3400. The updated list of search results 4015 may be similar to lists of search results described above, but for a third query that is different than the first query and the second query entered in the search session.

The search identifier 4020 identifies a number of the search within a particular search session (e.g., Search 3) to which the list of search results 4015 corresponds and also identifies the query (e.g., Query 3) to which the list of search results 4015 is responsive. The search identifier 4020 is associated with a control element that enables a user to expand (e.g., enable display) or minimize (e.g., hide from display) the list of search results 4015.

The displayed result indicator 3825 has not been updated and identifies Result 6 to indicate that the currently displayed content corresponds to Result 6. The displayed result indicator 3825 identifies Result 6 because Result 6 is included in the list of search results responsive to Query 3 (e.g., a result in the third list) and was selected at the time the third query (e.g., Query 3) was submitted by the user. Accordingly, although Result 6 is not the most relevant result to the third query in the third list of search results, Result 6 is selected because Result 6 was selected when the third query (e.g., Query 3) was submitted.

The browsing history 4025 (e.g., sub-elements related to selected links) provides a graphical representation of tracked browsing of search results that were included in a prior search. For instance, if the user selected a link when reviewing content corresponding to a particular search result, the selected link is displayed as a sub-element of the search result in the third list of search results. The browsing history 4025 also may include comment indicators for search results associated with user comments and clip indicators for search results associated with clipped content. By automatically displaying the tracked browsing history when initially displaying the third list of search results, the user may be able to more easily and quickly review the third list of search results.

The expansion control 4030 is displayed in association with search identifier 3520 that corresponds to the second query. The expansion control 4030 enables a user to expand (e.g., enable display) or minimize (e.g., hide from display) the second list of search results responsive to the second query. As shown, in response to submission of a third query in the interface 3800, a second list of search results responsive to the second query is minimized (e.g., hidden) automatically without human intervention and a third list of search results responsive to the third query is displayed automatically without human intervention.

The first advertisement 4035 is a new advertisement that has been selected based on the performance of the third search using the third query. The second advertisement 3840 and the sponsored link 3845 remain the same because Result 6 remains selected.

The content portion 4010 displays a representation of electronic content linked to by the selected search result (e.g., content corresponding to Result 6). Because Result 6 was selected at the time the third query (e.g., Query 3) was submitted by the user, the content portion 4010 maintains display of content displayed in the content portion 3810.

The interface 4000 further includes several graphical indications that provide a user with information related a user's previous searches in the particular search session. For example, the interface 4000 has a new results graphical indication 4050 that provides an indication of which results in the third list are new results (e.g., results that are not included in the first list or second list). In this example, the graphical indication 4050 designates a symbol that is displayed adjacent to each of the new search results.

For search results in the third list of search results that are also included in both the first list of search results and the second list of search results, the interface 4000 includes one or more graphical indications (e.g., graphical indications 4060 and 4075) that indicate that the search result was included in the first search and the second search. For search results in the third list of search results that are included in the first list of search results, but not the second list of search results, the interface 4000 includes one or more graphical indications (e.g., graphical indications 4065 and 4070) that indicate that the search result was included in the first search (e.g., included in the first search, but not the second search). For search results in the third list of search results that are not included in the first list of search results, but are included in the second list of search results, the interface 4000 includes one or more graphical indications (e.g., graphical indication 4080) that indicate that the search result was included in the second search (e.g., included in the second search, but not the first search).

Figure 41:
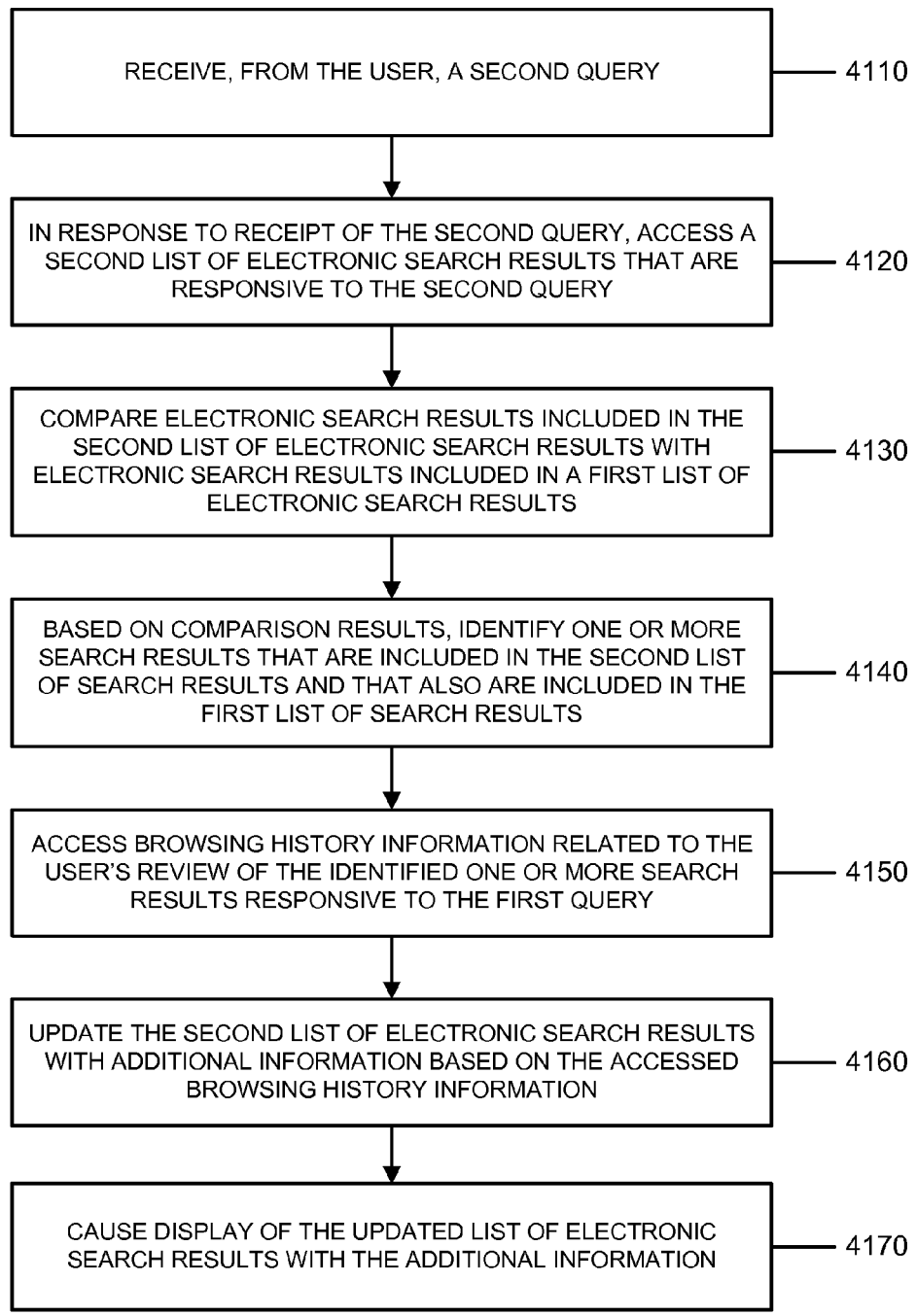

FIG. 41 illustrates an example of a process 4100 for supplementing a list of search results with browsing history information related to a user's prior review of the search results. The search system 500 receives, from a user, a second query (4110). For instance, the search system 500 receives user input entering a search query that includes one or more terms and parameters (e.g., logical operators) defining the desired analysis of the search query.

In response to receipt of the second query, the search system 500 accesses a second list of electronic search results that are responsive to the second query (4120). For example, the search system 500 may perform a search of electronic content based on the second query and identify a list of electronic search results that are responsive to the second query. The search system 500 also may submit the second query to a search engine and receive a list of electronic search results identified by the search engine.

The search system 500 compares electronic search results included in the second list of electronic search results with electronic search results included in a first list of electronic search results (4130). The search system 500 may compare network addresses (e.g., URLs) associated with search results included in the second list to network addresses (e.g., URLs) associated with the electronic search results included in the first list. In some implementations, the search system 500 may access content linked to by the search results included in the second list (e.g., without displaying the content), access content linked to by the search results in the first list (e.g., without displaying the content), and compare the accessed content.

Based on comparison results, the search system 500 identifies one or more search results that are included in the second list of search results and that also are included in the first list of search results (4140). For instance, when the search system 500 compares the network addresses (e.g., URLs) associated with the search results in the second list to network addresses (e.g., URLs) associated with the search results in the first list, the search system 500 determines whether the network addresses (e.g., URLs) associated with the search results in the second list match any of the network addresses (e.g., URLs) associated with the search results in the first list. When the search system 500 compares the content linked to by the search results in the second list to the content linked to by the search results in the first list, the search system 500 determines whether the content linked to by the search results in the second list matches content linked to by any of the search results in the first list.

The search system 500 accesses browsing history information related to the user's review of the identified one or more search results responsive to the first query (4150). For example, the search system 500 may access the browsing history information from local electronic storage of a client device or may receive, over a network, the browsing history information from a remote host device. The accessed browsing history information may include tracked information related to the user's review of search results. For instance, the accessed browsing history information may include information indicating whether or not the user has reviewed the search result, how long the user reviewed the search result, whether the user removed the search result, whether the user added a comment to the search result, whether the user clipped content for the search result, links selected when the user reviewed the search result, information related to the user's review of selected links, and/or any other information related to a user's review of the search results included in the list.

The search system 500 updates the second list of electronic search results with additional information based on the accessed browsing history information (4160). For example, the search system 500 adds additional information to the second list of electronic search results that reflects tracked browsing history of search results included in the second list of electronic search results. The search system 500 may limit the tracked browsing history to searches included in the same search session as the current search or may use the tracked browsing history for any prior searches (e.g., whether or not they were performed by the user performing the current search). The additional information added by the search system 500 may include previously selected links as sub-elements of the search result associated with content from which the links were selected. Furthermore, the additional information added by the search system 500 may include comments (e.g., comment indicators), clipped content (e.g., clip indicators), and/or any other type of information related to a user's past browsing history of search results included in the second list of electronic search results.

The search system 500 causes display of the updated list of electronic search results with the additional information (4170). The search system 500 may display the updated list of electronic search results with the additional information upon initial presentation of the search results in response to the second query. The search system 500 may display the additional information in a manner similar to how the search system 500 displays tracked browsing (e.g., selected links) discussed above. The additional information may include selected links, comments, clipped content, and/or any other type of graphic that represents accessed browsing history. FIG. 40 shows an example of an updated list of electronic search results that is displayed, initially and automatically without human intervention, with additional information.

Figure 42:
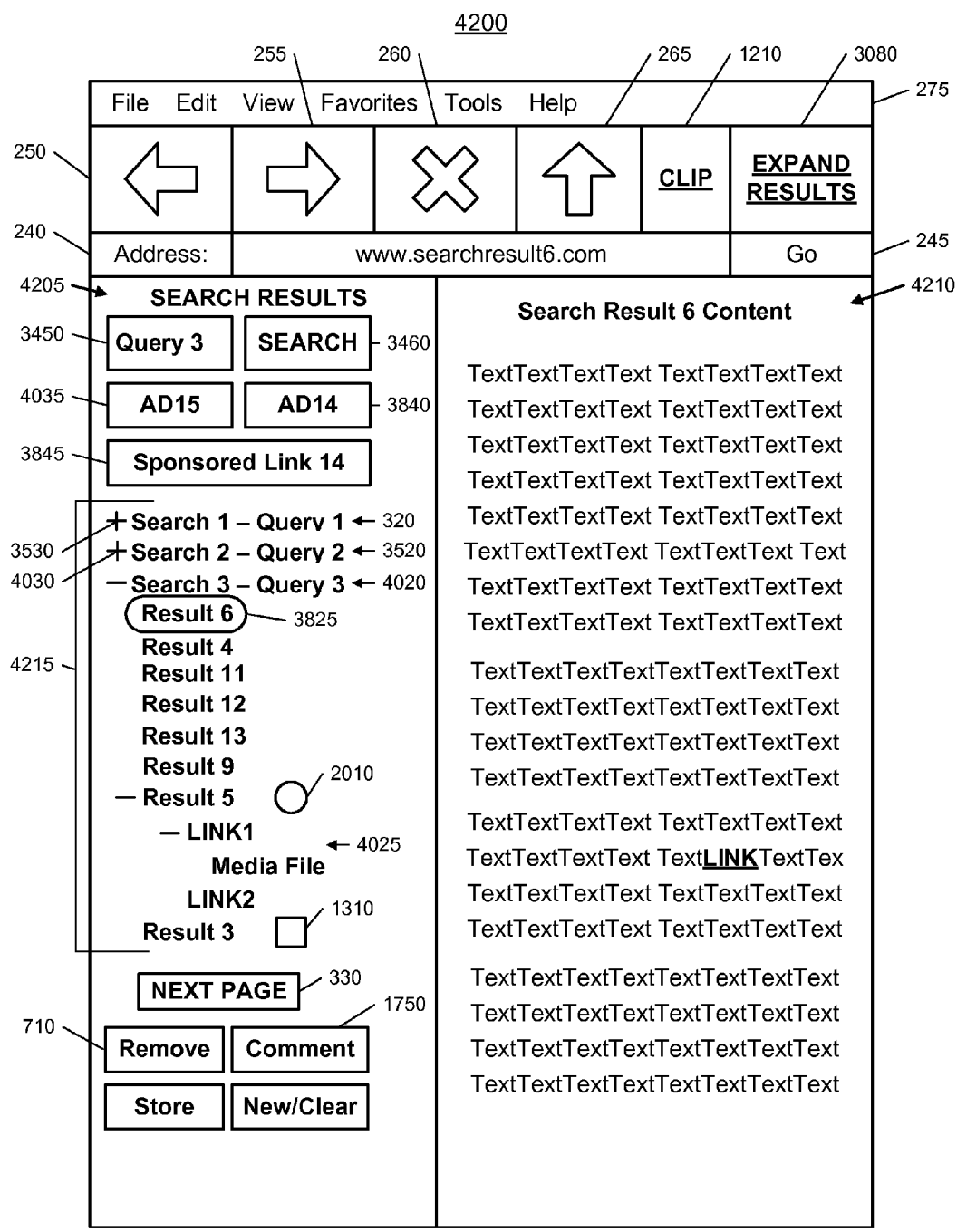

FIG. 42 illustrates an interface 4200 that may be displayed based on user submission of a search query (e.g., Query 3) in the interface 3800. The interface 4200 may be displayed as an alternative to the interface 4000 discussed above with respect to FIG. 40. In the interface 4200, past browsing history of search results is used to sort and order the third list of search results responsive to the third search query (e.g., Query 3).

The interface 4200 includes a search results portion 4205 and a content portion 4210, each of which has been updated based on user submission of a search query (e.g., Query 3) in the interface 3800. For instance, the items in the search results portion 4205 that are updated and different from the interface 4000 include an updated list of search results 4215. As shown, the updated list of search results 4215 includes search results identified as being responsive to the search query (e.g., Query 3) in the interface 3800. The updated list of search results 4215 may be similar to lists of search results described above, but for a third query that is different than the first query and the second query entered in the search session. The updated list of search results 4215 may be sorted and ordered based on past browsing history of search results that the system automatically tracks without human intervention. For instance, as shown, Result 6 is presented first in the third list of search results because Result 6 was included in all (or the most recent two) prior searches (e.g., search 1 and search 2) and selected for review. Result 4 is presented second in the third list of search results because Result 4 was included in all (or the most recent two) prior searches (e.g., search 1 and search 2), but not selected for review. Because Result 6 was previously selected for review and Result 4 was not previously selected for review, Result 6 is ordered higher than Result 4 in the third list of search results (e.g., in a position indicating higher relevancy to the query). In other implementations, different criteria may be used in ordering search results based on tracked review of search results returned in response to prior queries (e.g., Result 4 may be ordered higher than Result 6 in some implementations).

Results 11-13 are presented next in the third list of search results because Results 11-13 are new and have not been included in search results returned for a previous query in the particular search session (or, perhaps, at all). Result 9 follows Results 11-13 in the third list of search results because Result 9 was found in the most recent prior search (e.g., search 2). Results 5 and 3 follow Result 9 in the third list of search results because Results 5 and 3 were found in results returned in one search prior to most recent search (e.g., search 1). Result 5 may be listed before Result 3 in the third list of search results because Result 5 is associated with more tracked browsing history than Result 3.

The content portion 4210 displays a representation of electronic content linked to by the selected search result (e.g., content corresponding to Result 6). In response to the selection of Result 6 (e.g., automatic selection because Result 6 was the first result in the third list of search results), the electronic content linked to by the selected result (e.g., content corresponding to Result 6) may be accessed and displayed in the content portion 4210.

Figure 43:
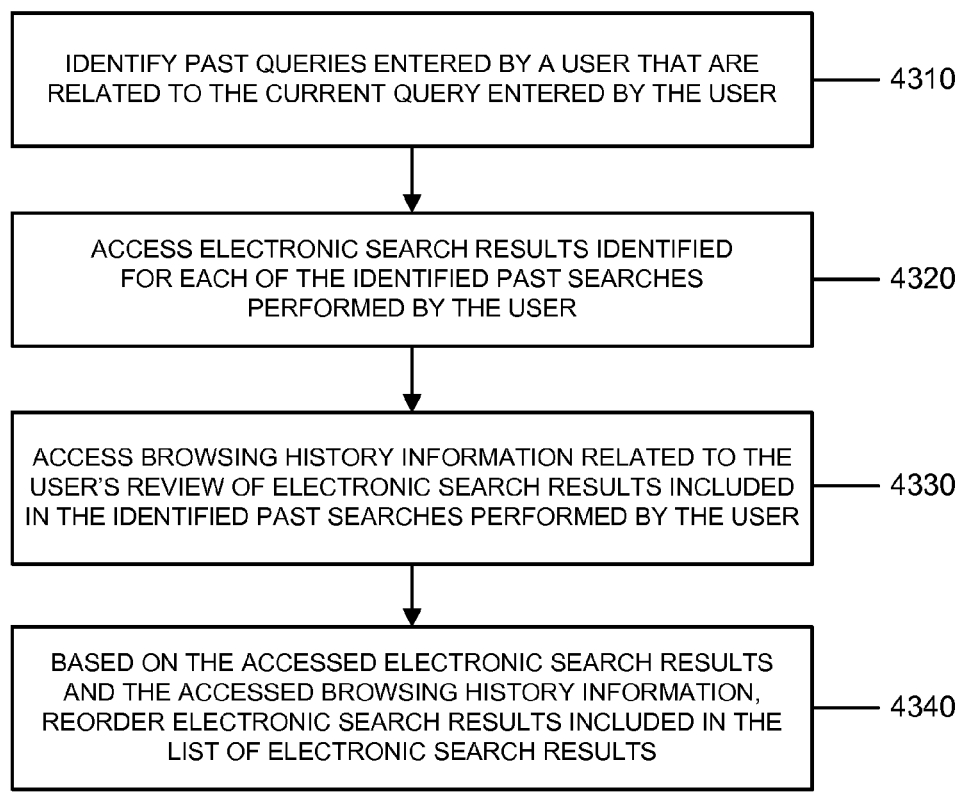

FIG. 43 illustrates an example of a process 4300 for automatically reordering search results included in a list of search results based on past browsing history. The search system 500 identifies past queries entered by a user that are related to the current query entered by the user (4310). For example, the search system 500 may identify queries the user has entered within the search session corresponding to the current query. In this example, the search system 500 may define the search session as queries entered since the user logged on to (e.g., initiated use of) the search system 500, queries entered since the user last cleared the search session history, a past threshold number of queries (e.g., past 10 queries), queries entered within a past threshold period of time (e.g., past 60 minutes), etc.

The search system 500 also may identify past queries that are related to the current query. For instance, the search system 500 may compare the current query to past queries (e.g., all past queries submitted by the user or a relatively large number of past queries) and identify queries that have similar terms (e.g., the same terms, terms related to the same subject, synonyms, etc.). The search system 500 may analyze the most recently entered queries in order, continue to identify past queries that are related to the current query, and stop analyzing queries further in the past when a query is found that is not sufficiently related to the current query. In this regard, the search system 500 may identify queries within a query reformulation session that appears to be directed to finding information on a single subject.

The search system 500 accesses electronic search results identified for each of the identified past searches performed by the user (4320). The search system 500 may access stored search results related to each of the past queries. The search results may be stored in local/remote electronic storage at a time when the query corresponding to the search was executed. The search system 500 also may identify search results in a new search process for each of the identified past queries in response to entry of the current query.

The search system 500 accesses browsing history information related to the user's review of electronic search results included in the identified past searches performed by the user (4330). For example, the search system 500 accesses locally or remotely stored information that reflects the user's browsing of past search results. In this example, the browsing history may identify which search results the user reviewed, which search results the user did not review, how long the user reviewed the search results, whether the user commented or clipped content associated with the search result, etc. The browsing history also may include links selected from the search result and any other information related to the user's browsing of search results.

Based on the accessed electronic search results and the accessed browsing history information, the search system 500 reorders electronic search results included in the list of electronic search results (4340). For instance, the search system 500 may reorder search results based on the number of past queries with which the search result is associated, how long the user reviewed the search results, whether or not the user reviewed the search results, whether or not the user added comments or clipped content associated with the search results, etc. Reordering the search results may include arranging the search results in an order that is different than the ranking of the search results with respect to relevance to the current query.

For instance, a first search result that is most relevant to the current query may have appeared in a prior related search and may have been reviewed by the user for a relatively brief period of time. Because the user has reviewed the first search result and only for a relatively brief period of time, the search system 500 may determine that the first search result is not relevant or of interest to the user, even though the first search result is ranked as the most relevant to the current query by a ranking process and would have been displayed first in the list if no browsing history existed. In this case, the search system 500 may remove the first search result from the list or order other search results that are identified by the ranking process as being less relevant to the current query than the first search result higher in the list (e.g., a position in the list for more relevant results). In some examples, the search system 500 may identify groups of search results with similar browsing history (e.g., new results, repeated results that have been reviewed, repeated results that have not been reviewed, etc.), the groups may be ranked (e.g., new results followed by repeated results that have not been reviewed followed by repeated results that have been reviewed, etc.), and the relevancy scores with respect to the current query assigned by a ranking process may be used to order the results within the groups. Other implementations may use more browsing history and other past search result information to inform search result sorting and ordering, and may weight the browsing history, past search result information, and relevancy rankings differently than described above.

Figure 44:
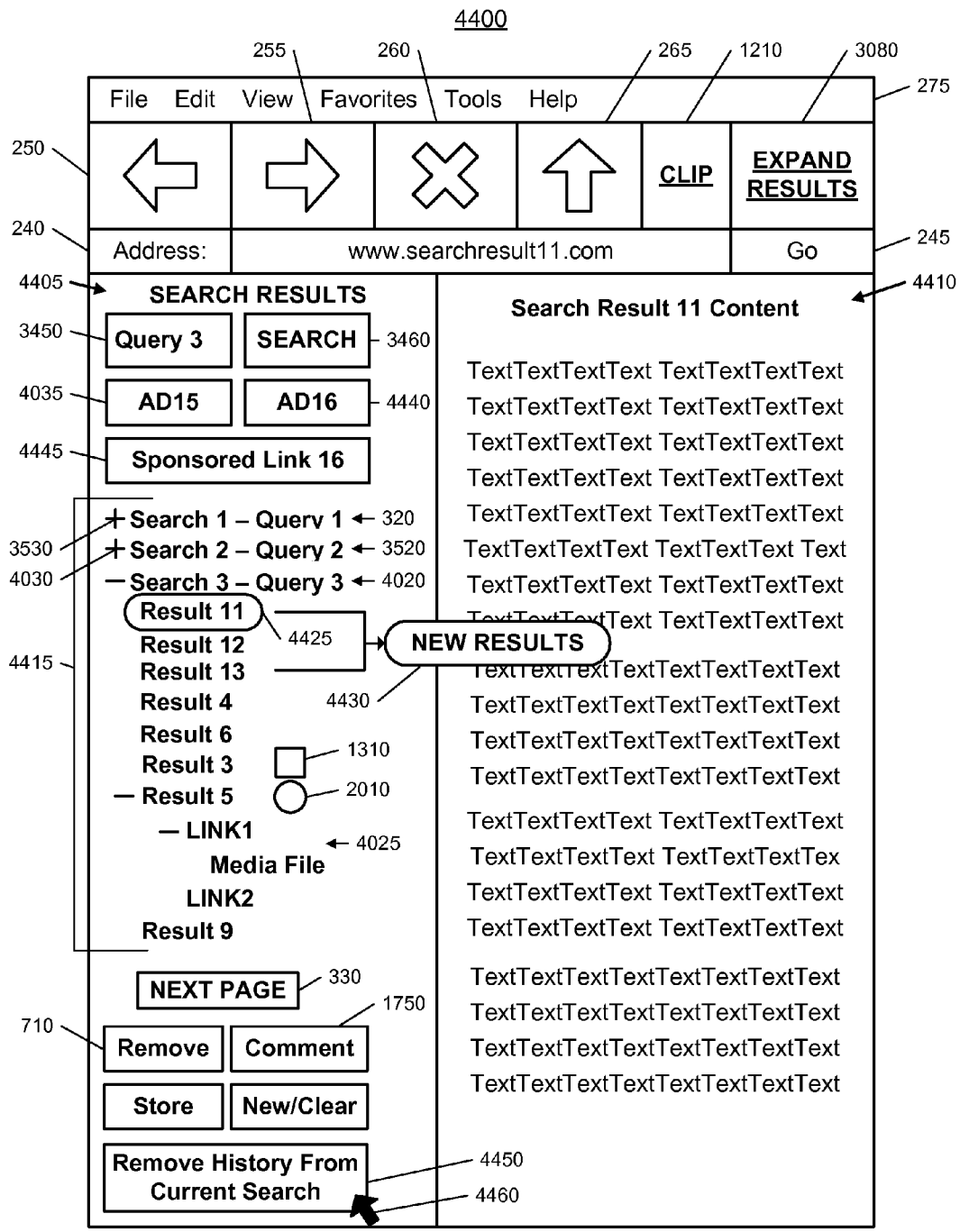

FIG. 44 illustrates an interface 4400 that may be displayed based on user submission of a search query (e.g., Query 3) in the interface 3800. The interface 4400 may be displayed as an alternative to the interface 4000 and the interface 4200 discussed above with respect to FIG. 40 and FIG. 42, respectively. In the interface 4400, collectively relevancy of search results to the current query and past queries is used to sort and order the third list of search results responsive to the third search query (e.g., Query 3).

The interface 4400 includes a search results portion 4405 and a content portion 4410, each of which has been updated based on user submission of a search query (e.g., Query 3) in the interface 3800. For instance, the items in the search results portion 4405 that are updated and different from the interface 4000 and the interface 4200 include an updated list of search results 4415, a displayed result indicator 4425, a new results indicator 4430, a second advertisement 4440, and a sponsored link 4445. As shown, the updated list of search results 4415 includes search results identified as being responsive to the search query (e.g., Query 3) in the interface 3800. The updated list of search results 4415 may be similar to lists of search results described above, but for a third query that is different than the first query and the second query entered in the search session. The updated list of search results 4415 may be sorted and ordered based on collective relevancy of search results that the system automatically tracks without human intervention. For instance, new results (e.g., Results 11-13) may be grouped separately and distinguished from results included in searches related to past queries. As shown, the new results (e.g., Results 11-13) are listed first in the third list of search results and distinguished from the past search results by the new results indicator 4430. Specifically, the new results indicator 4430 identifies the new results in the third list of search results and visually distinguishes the new results from past results in the third list of search results using a graphical interface element.

For results that were returned as being responsive to a past query (e.g., a query performed previously in the current search session or identified as being related to the current query), the past results are ordered based on their collective relevancy to the current query as well as past queries. The collective relevancy of a threshold number of searches may be used (e.g., two past searches), the collective relevancy of all past searches may be used, and/or the collective relevancy of a variable number of searches may be used. The variable number may be determined based on an automatic process performed by a computer that compares previously-entered queries to the current query to determine whether similarities exist such that using collective relevance will be beneficial to the result ranking/ordering process.

For example, as shown, the results in the list 4415 other than the new results (i.e., Results 11-13) are ordered based on the collective relevancy of the results to the first, second, and third queries/searches described throughout the disclosure. In this example and for illustrative purposes, relevancy scores have been assigned to the search results by assigning an integer number starting at nine for the first search result and decrementing the number for each position lower in the list. Specifically, for the first query/search and the order of results shown in FIG. 7, Result 1 is assigned relevancy score 9, Result 2 is assigned relevancy score 8, Result 3 is assigned relevancy score 7, Result 4 is assigned relevancy score 6, Result 5 is assigned relevancy score 5, Result 6 is assigned relevancy score 4, and Result 7 is assigned relevancy score 3. For the second query/search and the order of results shown in FIG. 38, Result 6 is assigned relevancy score 9, Result 8 is assigned relevancy score 8, Result 9 is assigned relevancy score 7, Result 10 is assigned relevancy score 6, and Result 4 is assigned relevancy score 5. For the third query/search and the order of results shown in FIG. 40, Result 11 is assigned relevancy score 9, Result 4 is assigned relevancy score 8, Result 12 is assigned relevancy score 7, Result 3 is assigned relevancy score 6, Result 13 is assigned relevancy score 5, Result 5 is assigned relevancy score 4, Result 6 is assigned relevancy score 3, and Result 9 is assigned relevancy score 2. The relevancy scores described above are illustrative only and assigned for ease of explanation. Other types of relevancy scoring and ranking may be used in ranking results based on collective relevance.

To arrive at a collective relevance score for each search result, the relevancy scores assigned above are added together to arrive at a collective relevance score. Accordingly, the collective relevance scores for the results included in the third search results are as follows: Result 4 has a collective relevance score of 20 (7+5+8), Result 3 has a collective relevance score of 14 (8+0+6), Result 5 has a collective relevance score of 10 (6+0+4), Result 6 has a collective relevance score of 17 (5+9+3), and Result 9 has a collective relevance score of 10 (0+8+2). As shown in FIG. 44, the results in the list 4415 are ordered based on the collective relevancy scores. This order is different than the order of the search results if only the relevancy scores to the current query were used and reflects the collective relevancy of the search results to each of the searches included in the current search session. As shown, although Result 5 and Result 9 have the same collective relevancy score, Result 5 is ordered prior to Result 9 because it has higher relevancy to the current query than Result 9 (e.g., relevancy to the current query is used to break the tie).

In some implementations, rather than treating the relevancy scores related to past queries with equal weight as relevancy scores related to the current query, different weightings may be used (e.g., relevancy scores related to the current query may be given a higher weight than relevancy scores related to past queries). For instance, in the example described above, the relevancy scores related to Query 1 may be given a first weight (e.g., 1) that is relatively lower than a second weight (e.g., 2) given to relevancy scores related to Query 2. The second weight given to relevancy scores related to Query 2 may be relatively lower than a third weight (e.g., 3) given to relevancy scores related to Query 3. In this example, the relevancy scores may be multiplied by the corresponding weight when computing the collective relevancy scores. Accordingly, the collective relevance scores for the results included in the third search results are as follows: Result 4 has a collective relevance score of 41 (7+10+24), Result 3 has a collective relevance score of 26 (8+0+18), Result 5 has a collective relevance score of 18 (6+0+12), Result 6 has a collective relevance score of 32 (5+18+9), and Result 9 has a collective relevance score of 22 (0+16+6). The order determined based on the weighted collective relevance scores is different than the order of the search results using collective relevance scores without weighting and reflects the collective relevancy of the search results to each of the searches included in the current search session with a decreasing degree of significance based on how long ago the search was performed. Using weighting factors results in the order of Result 5 and Result 9 being reversed because Result 9 has a higher weighted score than Result 5.

Other implementations may assign weights to past searches in a different manner. For instance, weights may be assigned based on the similarity of the past query associated with the past search to the current query (e.g., a higher weight may be assigned for relevancy scores related to Query 1 than relevancy scores related to Query 2 when Query 1 has a higher degree of similarity to Query 3 than Query 2). Also, values of weights may correspond to how long ago the search was performed. For example, when Query 1 was performed 20 minutes prior to Query 2 and Query 2 was performed 10 minutes prior to Query 3, Query 1 may be given a weight of 0.5 and Query 2 may be given a weight of 2. In this example, if Query 1 was performed 10 minutes prior to Query 2, then Query 1 may be given a weight of 1. Other implementations may use different weighting decisions and other processes for arriving at the collective relevancy scores.

The displayed result indicator 4425 has been updated and now identifies Result 11 to indicate that the currently displayed content corresponds to Result 11. The displayed result indicator 4425 identifies Result 11 because Result 11 is the first result included in the list of search results responsive to Query 3. The second advertisement 4440 and the sponsored link 4445 represent a new advertisement and a new sponsored link that have been selected based on the selection of the search result "Result 11" included in the third list of search results.

The content portion 4410 displays a representation of electronic content linked to by the selected search result (e.g., content corresponding to Result 11). In response to the selection of Result 11 (e.g., automatic selection because Result 11 was the first result in the third list of search results), the electronic content linked to by the selected result (e.g., content corresponding to Result 11) may be accessed and displayed in the content portion 4410.

Figure 45:
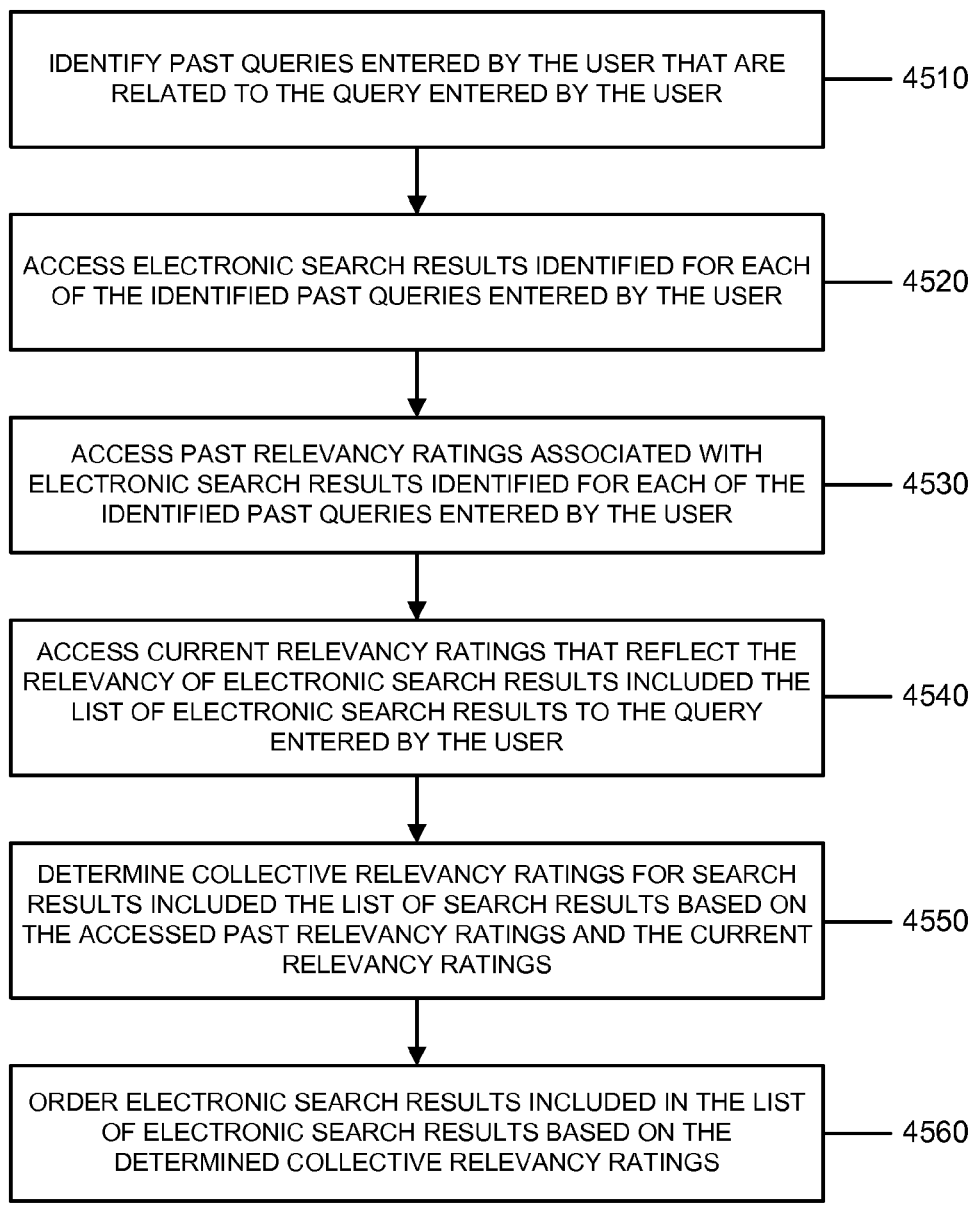

FIG. 45 illustrates an example of a process 4500 for automatically ordering a list of search results based on collective relevancy scores. The search system 500 identifies past queries entered by a user that are related to the current query entered by the user (4510). For example, the search system 500 may identify queries the user has entered within the search session corresponding to the current query and also may identify past queries that are related to the current query. The search system 500 may identify past queries using techniques similar to those described above with respect to numeral 4310 shown in FIG. 43.

The search system 500 accesses electronic search results identified for each of the identified past searches performed by the user (4520). The search system 500 may access electronic search results using techniques similar to those described above with respect to numeral 4320 shown in FIG. 43.

The search system 500 accesses past relevancy ratings associated with electronic search results identified for each of the identified past queries entered by the user (4530). The search system 500 may access stored relevancy ratings related to search results for each of the past queries. The relevancy ratings may be stored in local/remote electronic storage at a time when the query corresponding to the search was executed. The search system 500 also may compute relevancy ratings in a new rating process for each of the identified past queries in response to entry of the current query.

The search system 500 accesses current relevancy ratings that reflect the relevancy of electronic search results included the list of electronic search results to the query entered by the user (4540). For instance, the search system 500 may access current relevancy ratings from local/remote electronic storage when accessing the search results. The search system 500 also may compute relevancy ratings in a new rating process for the current query in response to entry of the current query.

The search system 500 determines collective relevancy ratings for search results included the list of search results based on the accessed past relevancy ratings and the current relevancy ratings (4550). For example, the search system 500 computes, for each search result, a collective relevancy rating using the past relevancy ratings and the current relevancy rating for the search result. The collective relevancy rating may reflect a summation of the past relevancy ratings and the current relevancy rating, a weighted summation of the past relevancy ratings and the current relevancy rating, and/or any other formula that combines the past relevancy ratings and the current relevancy rating into a single collective relevancy rating. Some examples of determining collective relevancy ratings are described with respect to FIG. 44.

The search system 500 orders electronic search results included in the list of electronic search results based on the determined collective relevancy ratings (4560). The search system 500 may order the search results using any type of ordering technique, but uses the collective relevancy ratings to determine the order. For instance, the search system 500 may identify the first search result in a list as the result having a collective relevancy rating that reflects the highest collective relevance to the current query and the past queries. The search system 500 may order the results in decreasing collective relevance to the current query and the past queries. Some examples of ordering are described with respect to FIG. 44.

Referring again to FIG. 44, the interface 4400 includes a remove history interface control 4450. The remove history interface control 4450 enables a user to remove browsing history information from the search results in the formatted list 4415. As shown in FIG. 44, a user input icon 4460 may be displayed and manipulated by a user (e.g., using a mouse) to select the remove history interface control 4450. For example, the user input icon 4460 may be positioned over the remove history interface control 4450 when the user provides user input of a selection command.

Figure 46:
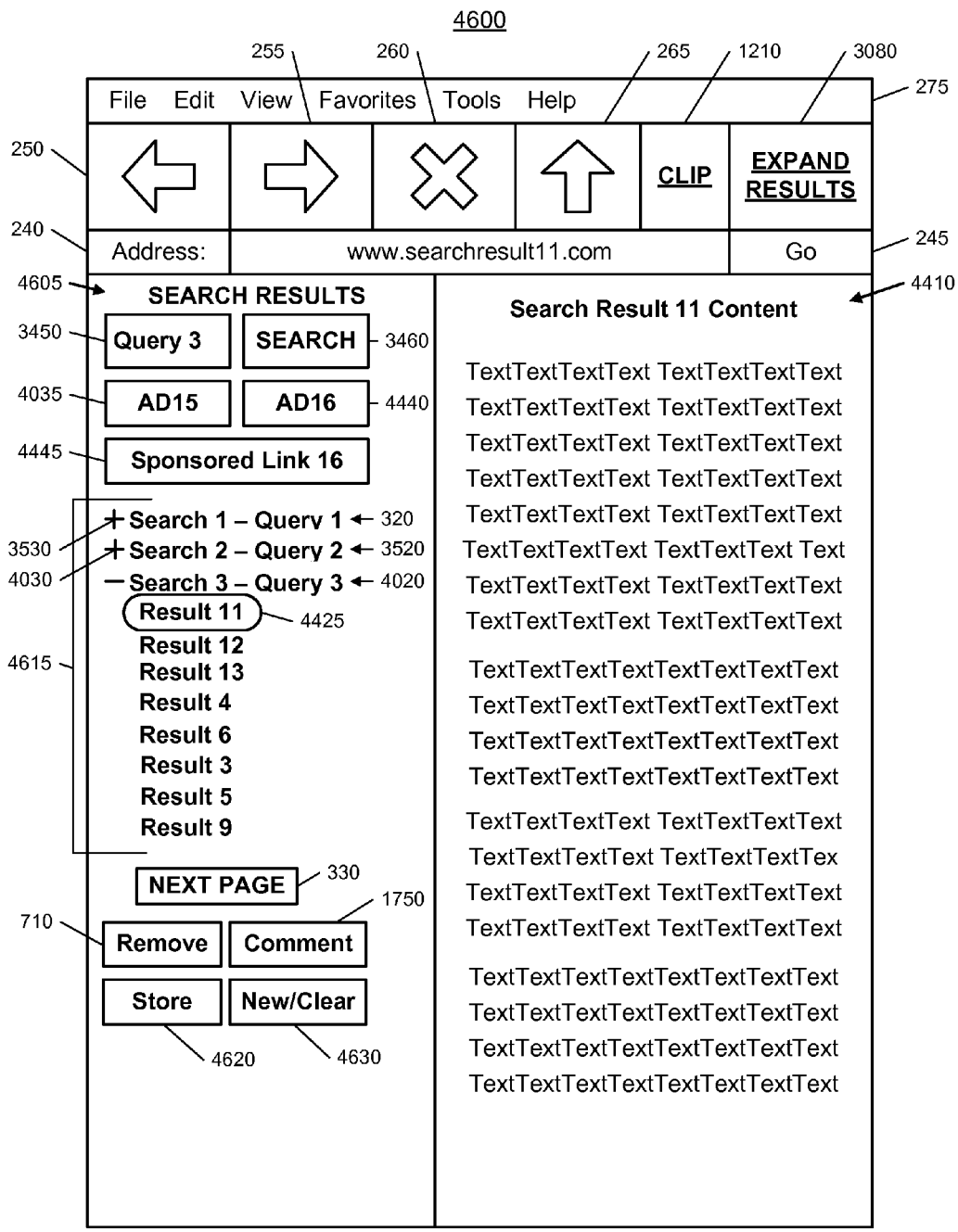

FIG. 46 illustrates an interface 4600 that may be displayed based on user selection of a remove history interface control in the interface 4400. The interface 4600 includes an updated search results portion 4605 that includes an updated list of search results 4615. As shown, the updated list of search results 4615 is the same as the list of search results 4415, except that the displayed browsing history information has been removed from display. For example, the sub-elements displayed in the list have been removed, the clip/comment indicators have been removed, and the list of search results 4615 is displayed as if no browsing history has occurred with respect to the results in the list. The browsing history may be removed from electronic storage or may remain in electronic storage such that a user may provide user input that causes the browsing history to be displayed again in the list.

Figure 47:
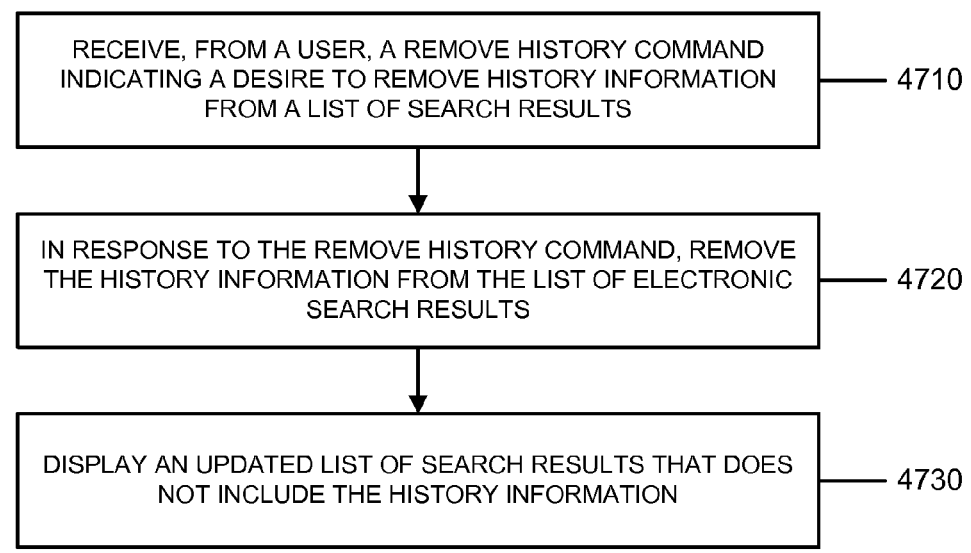

FIG. 47 illustrates an example of a process 4700 for removing browsing history from a list of search results. The search system 500 receives, from a user, a remove history command indicating a desire to remove history information from a list of search results (4710). In response to the remove history command, the search system 500 removes the history information from the list of electronic search results (4720). Then, the search system 500 displays an updated list of search results that does not include the history information (4730).

Referring again to FIG. 46, the interface 4600 includes a store interface control 4620 and a new/clear interface control 4630. The store interface control 4620 enables a user to store information from the current search session in electronic storage for later access. In response to selection of the store interface control 4620, electronic information related to the current search session (e.g., queries entered and search results identified, browsing history information, clipped content, comments, list manipulation information such as removed results and reordering information, etc.) is stored that enables the user to resume the search session at a later date with all of the information displayed as if the search session did not end. The new/clear interface control 4630 enables a user to start a new search session (e.g., clear the current session). In response to selection of the new/clear interface control 4630, the search results portion of the interface 4600 is cleared and a new search session is started with entry of a new query. As such, when a user begins searching for a new information need, the user can start a new session to track searching information associated with the new information need and clear tracked search information related to a prior information need that is not related to the new information need.

Figure 48:
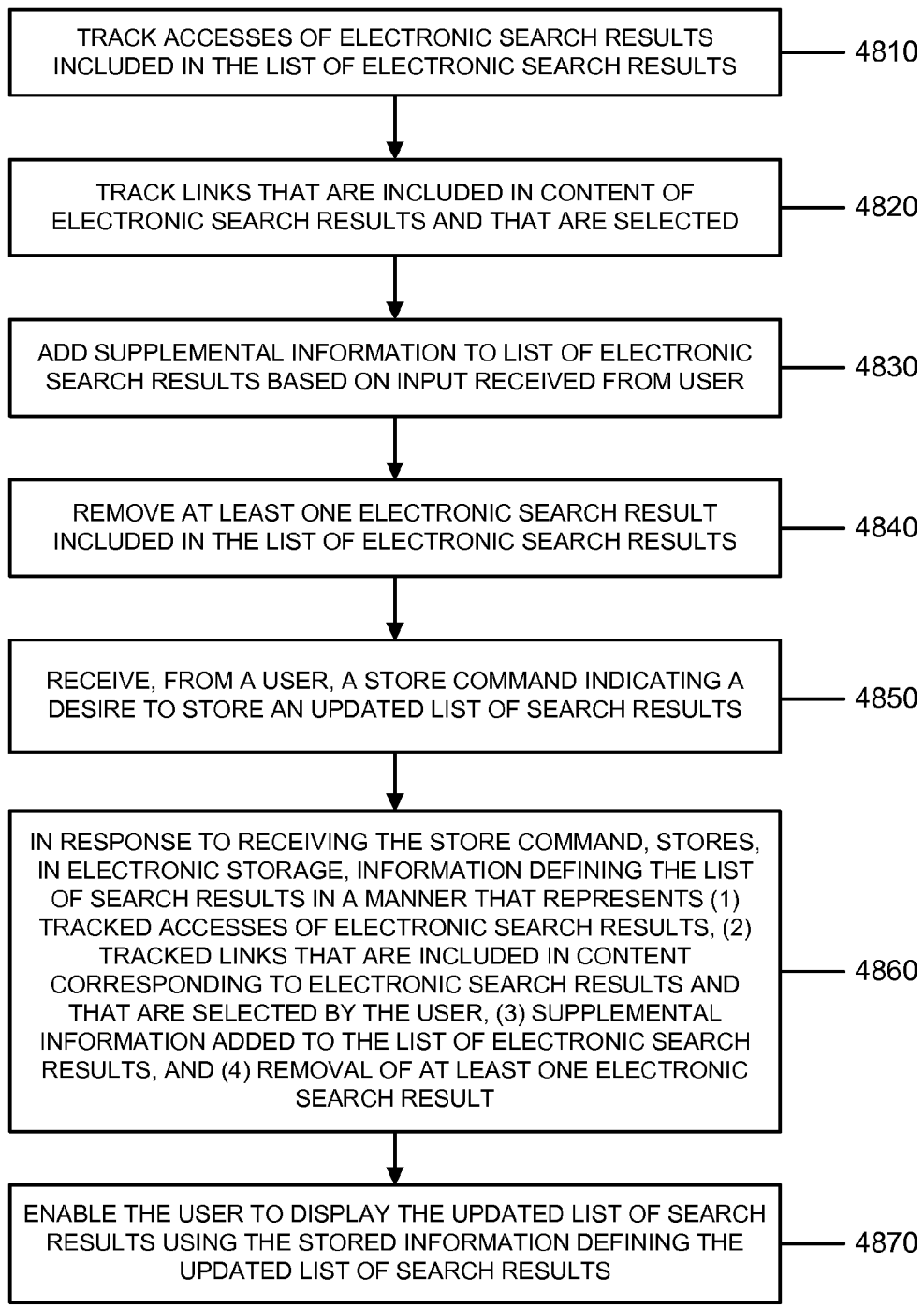

FIG. 48 illustrates an example of a process 4800 for storing one or more lists of search results reviewed by a user during a search session in a manner that reflects tracked browsing of the search results by the user. The search system 500 tracks accesses of electronic search results included in the list of electronic search results (4810). For instance, the search system 500 monitors, for each of the search results, whether a user selects the search result and reviews content corresponding to the search result. The search system 500 also may track how long the user accessed/reviewed the search result.

The search system 500 tracks links that are included in content of electronic search results and that are selected (4820). For example when the user accesses a search result, the search system 500 monitors whether the user selects a link included in content corresponding to the search result. The search system 500 may track which links the user selects.

The search system 500 adds supplemental information to the list of electronic search results based on input received from user (4830). The search system 500 may add supplemental information by adding comments to a search result or clipping content related to the search result, or adding other types of information related to the search results.

The search system 500 removes at least one electronic search result included in the list of electronic search results (4840). For instance, the search system 500 may receive user input indicating a desire to remove a search result from the list and remove the search result based on the user input. The search system 500 also may automatically remove a search result based on user access of the search result (e.g., access for a relatively short period of time, no access for a relatively large period of time, etc.).

The search system 500 further may update order information associated with the list of search results. For example, the search system 500 may receive user input indicating a desire to reorder a search results in the list and update the order based on the user input. The search system 500 also may automatically update an order based on user access of search results (e.g., reorder a first result prior to a second result when the user accesses the first result longer than the second result).

The search system 500 receives, from a user, a store command indicating a desire to store an updated list of search results (4850). For instance, as discussed above with respect to FIG. 46, the search system 500 may receive user input selecting a store interface control or some other type of user input (e.g., an oral comment instruction, a gesture input, etc.) that explicitly indicates a desire to store search result information.

In response to receiving the store command, the search system 500 stores, in electronic storage, information defining the list of search results in a manner that represents (1) tracked accesses of electronic search results, (2) tracked links that are included in content corresponding to electronic search results and that are selected by the user, (3) supplemental information added to the list of electronic search results, and (4) removal of at least one electronic search result (and/or reordering of search results) (4860). The search system 500 may store the search results information in local electronic storage at a client and/or remote electronic storage at a host. The search system 500 also may store search results information that identifies the user associated with the search results, an identifier for the search session corresponding to the search results information, and/or a date of the search results information. The search system 500 may use the information to later control display of the search results information to the appropriate user.

FIG. 49 illustrates an example of a data structure 4900 for storing information related to search results. The data structure 4900 includes a column 4901 that identifies the result, a column 4902 that identifies sub-elements associated with the result, a column 4903 that identifies whether comments are associated with the result and, if so, a link to a file storing the comments, a column 4904 that identifies whether clipped content is associated with the result and, if so, a link to a file storing the clipped content, a column 4905 that identifies a status of the result (e.g., removed, reviewed, unreviewed, etc.), and a column 4906 that identifies whether the result is associated with another search and, if so, which search or searches.

The data structure 4900 is associated with a particular search session and includes data for each search included in the search session. As shown, the data structure includes a first portion 4910 corresponding the first search (e.g., the search performed using Query 1), a second portion 4920 corresponding the second search (e.g., the search performed using Query 2), and a third portion 4930 corresponding the third search (e.g., the search performed using Query 3).

The search system 500 enables the user to display the updated list of search results using the stored information defining the updated list of search results (4870). For instance, the search system 500 may access search results data (e.g., the data structure 4900) and recreate the interface when the search session was saved. The search system 500 also may display an interface that differs from the interface when the search session was saved, but enables the user to access all of the search results information by providing user input. In this case, the search system 500 may display search identifiers for each of searches included in the search session with expand controls that enable the user to display the search results information associated with any one of the searches included in the search session (e.g., the interface when the search session was saved, but with all of the search results information minimized/collapsed). By enabling a user to store search session information and then use the search session information to resume the search session, the user may be able to resume a search more conveniently and more quickly track down information the user located in the past using the search system.

Figure 50:
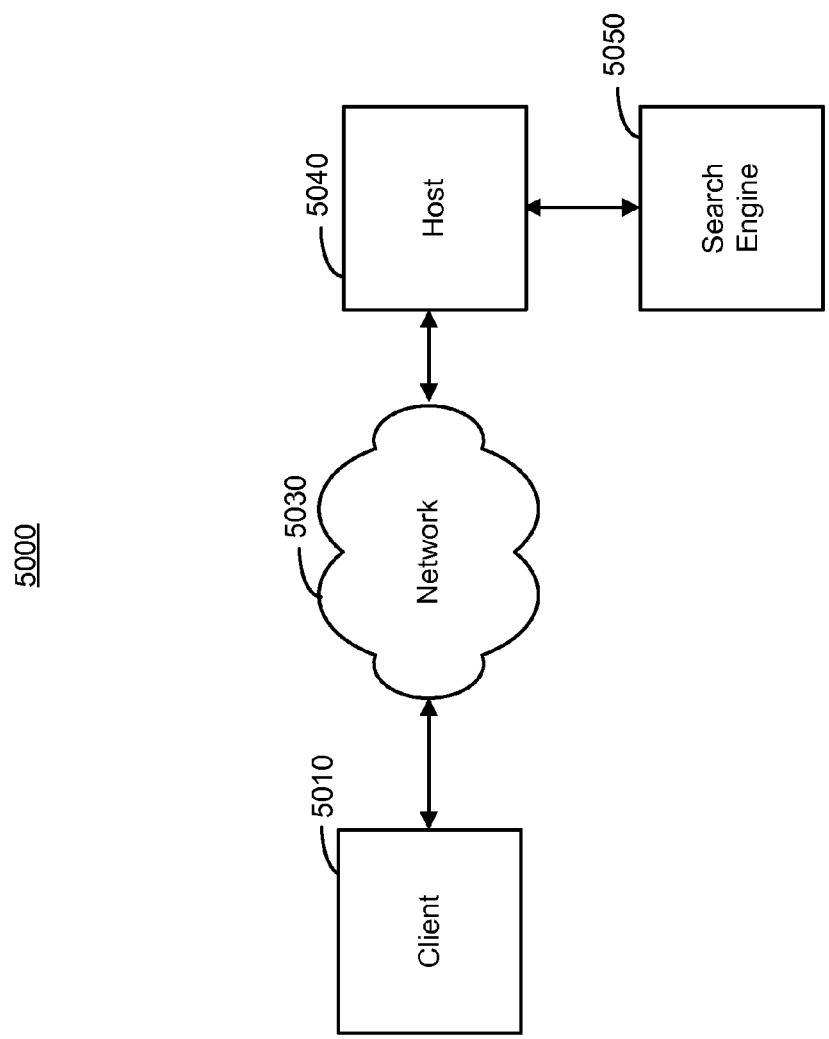

FIG. 50 illustrates a system 5000 that includes a client 5010 configured to interface with a host 5040 (that accesses a search engine 5050) via a network 5030. The client 5010 is configured to receive a search query. The client 5010 may provide the search query to the host 5040 via network 5030. The host 5040 may be configured to provide the search query to the search engine 5050 and, in response, receives search results from the search engine 5050. The host 5040 then may provide the search results to the client 5010, via network 5030, for display to the user.

Each of the client 5010 and the host 5040 may be implemented by, for example, a general-purpose computer capable of responding to and executing instructions in a defined manner, a personal computer, a special-purpose computer, a workstation, a server, a device, a component, other equipment or some combination thereof capable of responding to and executing instructions. The client 5010 and host 5040 may be configured to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, or tangible storage medium that is capable of being delivered to the client 5010, or the host 5040.

The client 5010 may include one or more devices capable of accessing content on the host 5040. The client 5010 may include a general-purpose computer (e.g., a personal computer (PC)) capable of responding to and executing instructions in a defined manner, a workstation, a notebook computer, a PDA ("Personal Digital Assistant"), a wireless phone, a component, other equipment, or some combination of these items that is capable of responding to and executing instructions.

More particularly, client 5010 may be configured to receive a search query from a user and provide the search query to host 5040. Client 5010 also may be configured to receive corresponding search results from the host 5040. Client 5010 may display one or more UIs for a user to enter the search query and to display the search results.

The network 5030 provides a direct or indirect communication link between the client system 5010 and the host 5040, irrespective of physical separation. Examples of a delivery network 5030 include the Internet, the World Wide Web, WANs, LANs, analog or digital wired and wireless telephone networks (e.g., PSTN ("Public Switched Telephone Network"), ISDN ("Integrated Services Digital Network"), and DSL ("Digital Subscriber Line") including various forms of DSL such as SDSL ("Single-line Digital Subscriber Line"), ADSL ("Asymmetric Digital Subscriber Loop), HDSL ("High bit-rate Digital Subscriber Line"), and VDSL ("Very high bit-rate Digital Subscriber Line)), radio, television, cable, satellite, and/or any other delivery mechanism for carrying data.

The host 5040 generally includes one or more devices configured to receive a search query and return search results responsive to the search query. Host 5040 may access search engine 5050, which is capable of producing search results for search queries. The host 5040 may include a general-purpose computer having a central processor unit (CPU), and memory/storage devices that store data and various programs such as an operating system and one or more application programs. Other examples of a host 5040 includes a workstation, a server, a special purpose device or component, a broadcast system, other equipment, or some combination thereof capable of responding to and executing instructions in a defined manner. The host 5040 also may include an input/output (I/O) device (e.g., video and audio input and conversion capability), and peripheral equipment such as a communications card or device (e.g., a modem or a network adapter) for exchanging data with the network 5030.

The host 5040 is generally capable of executing instructions under the command of a controller. The host 5040 may be used to provide content to the client 5010. The controller may be implemented by a software application loaded on the host 5040 for commanding and directing communications exchanged directly with the client 5010 or through an intermediary. Other examples of the controller include a device, a computer, a computer system, or a combination thereof, for independently or collectively instructing the client 5010 or the host 5040 to interact and operate as described. The host 5040 may be embodied permanently or temporarily in any type of machine, component, physical or virtual equipment, storage medium capable of providing instructions to the client 5010, or the host 5040.

Search engine 5050 typically resides on the host 5040 and is capable of executing searches based on a search query provided by host 5040, as described above. Examples of search engine 5050 include a device, a computer, a computer system, or a combination thereof, for independently or collectively instructing host 5040 to interact and operate as described.

In some implementations, and as described, the techniques described herein may be integrated as a component or functionality of a particular search engine. Alternatively, such techniques may be supplied to a user as a third party plug-in that may be used in association with one or more particular search engines. As such, the plug-in may be configured to work with existing browsers, as well as those that are yet to be brought to market.

The plug-in may be configured to display search results with pre-search activities performed by a user in a variety of applications (e.g., browsers, word processing, audio/video and email). A user may enter a search query into an interface provided by the plug-or in a traditional search engine. A traditional search engine may include an Internet search performed by an online search engine, a search engine integrated into a particular web site or a search engine provided by an online service provider, a search of a user's local computer or a search for both Internet and local content.

If the user provides the search query into an interface provided by the plug-in, the plug-in may submit the search query to a default or user-selected search engine. If the user provides the search query into a traditional search engine, the plug-in may automatically intervene and control display of search results.

The described systems, methods, and techniques may be implemented in digital electronic circuitry, computer hardware, or in combinations of these elements and software. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method comprising:
receiving a first search query that was entered by a user and includes one or more terms that define the first search query;
performing a search using the first search query to identify search results that are responsive to the first search query;
based on performing the search using the first search query, identifying a first list of search results that are responsive to the first search query, the first list of search results including at least a first search result that is responsive to the first search query and that links to first electronic content;
causing display of the first list of search results identified based on performing the search using the first search query, the display of the first list of search results including the first search result;
after causing display of the first list of search results identified based on performing the search using the first search query, receiving user input selecting the first search result included in the display of the first list of search results;

receiving a second search query that was entered by the user and includes one or more terms that define the second search query, the second search query being different than the first search query;

performing a search using the second search query to identify search results that are responsive to the second search query;

based on performing the search using the second search query, identifying a second list of search results that are responsive to the second search query, the second list of search results including at least a second search result that is responsive to the second search query and that links to second electronic content, the second list of search results being different than the first list of search results and the second search result being different than the first search result;

causing display of the second list of search results identified based on performing the search using the second search query, the display of the second list of search results including the second search result;

after causing display of the second list of search results identified based on performing the search using the second search query, receiving user input selecting the second search result included in the display of the second list of search results;

subsequent to receiving user input selecting the first search result included in the display of the first list of search results and subsequent to receiving user input selecting the second search result included in the display of the second list of search results, receiving a third search query that was entered by the user and includes one or more terms that define the third search query, the third search query being different than the first search query and being different than the second search query;

performing a search using the third search query to identify search results that are responsive to the third search query;

based on performing the search using the third search query, identifying a third list of search results that are responsive to the third search query, the third list of search results being different than the first list of search results and being different than the second list of search results, the third list of search results including the first search result that links to the first electronic content, the second search result that links to the second electronic content, and a third search result that links to third electronic content, that has not been selected by the user prior to receiving the third search query, and that is different than the first search result and the second search result;

based on the selection, prior to receiving the third search query, of the first search result included in the display of the first list of search results, the selection, prior to receiving the third search query, of the second search result included in the display of the second list of search results, and the third list of search results including the first search result and the second search result, grouping, by at least one processor and within a display of the third list of search results identified based on performing the search using the third search query, a first representation of the first search result and a second representation of the second search result together in a group separate from a third representation of the third search result that has not been selected by the user, even though relevancy ratings, to the third search query, for the first search result, the second search result, and the third search result do not suggest grouping the first search result and the second search result together in the group separate from the third search result that has not been selected by the user.

2. The method of claim 1, wherein grouping, within the display of the third list of search results identified based on performing the search using the third search query, the first representation of the first search result and the second representation of the second search result together in the group separate from the third representation of the third search result that has not been selected by the user comprises reordering, within the third list of search results identified based on performing the search using the third search query, the first representation of the first search result and the second representation of the second search result based on a determination that the first search result was selected prior to receiving the third search query and that the second search result was selected prior to receiving the third search query.

3. The method of claim 1, wherein grouping, within the display of the third list of search results identified based on performing the search using the third search query, the first representation of the first search result and the second representation of the second search result together in the group separate from the third representation of the third search result that has not been selected by the user comprises arranging, within the display of the third list of search results identified based on performing the search using the third search query, the first representation of the first search result and the second representation of the second search result in an order that is different than a ranking of the first search result and the second search result with respect to relevance, to the third search query, of the first search result and the second search result.

4. The method of claim 1, further comprising ordering, within the group separate from the third representation of the third search result that has not been selected by the user, the first representation of the first search result and the second representation of the second search result based on a first relevancy rating that describes relevance of the first search result to the third search query and a second relevancy rating that describes relevance of the second search result to the third search query.

5. The method of claim 1, further comprising, based on the selection, prior to receiving the third search query, of the first search result included in the display of the first list of search results, the selection, prior to receiving the third search query, of the second search result included in the display of the second list of search results, and the third list of search results including the first search result and the second search result, causing display, within the display of the third list of search results identified based on performing the search using the third search query, of a first graphical indicator that is proximate to the first representation of the first search result, that distinguishes the first representation of the first search result from the third representation of the third search result, and that indicates that the first search result was previously selected, and a second graphical indicator that is proximate to the second representation of the second search result, that distinguishes the second representation of the second search result from the third representation of the third search result, and that indicates that the second search result was previously selected.

6. The method of claim 1:
wherein causing display of the first list of search results identified based on performing the search using the first search query comprises causing display of a representation of the first search result that includes description information that is descriptive of the first search result and that enables the user to link to the first electronic content; and wherein grouping, within the display of the third list of search results identified based on performing the search using the third search query, the first representation of the first search result and the second representation of the second search result together in the group separate from the third representation of the third search result that has not been selected by the user comprises causing display of a reformatted representation of the first search result that has reduced description information of the first search result as compared to the description information included in the representation of the first search result in the display of the first list of search results and that enables the user to link to the first electronic content.

7. The method of claim 6, wherein causing display of the reformatted representation of the first search result that has reduced description information of the first search result as compared to the description information included in the representation of the first search result in the display of the first list of search results and that enables the user to link to the first electronic content comprises causing display, concurrently with electronic content linked to by a search result included in the third list of search results, of the reformatted representation of the first search result that has reduced description information of the first search result as compared to the description information included in the representation of the first search result in the display of the first list of search results and that enables the user to link to the first electronic content.

8. The method of claim 1, further comprising, based on accessed browsing history information that tracks whether or not the user has reviewed electronic content corresponding to search results, filtering search results from the third list of search results identified based on performing the search using the third search query.

9. The method of claim 8, further comprising grouping, within a display of the filtered, third list of search results, reviewed search results for which the accessed browsing history information indicates that the user has reviewed electronic content linked to by the reviewed search results.

10. The method of claim 1:
wherein receiving user input selecting the first search result included in the display of the first list of search results comprises receiving user input selecting the first search result to cause display of the first electronic content linked to by the first search result; and
wherein receiving user input selecting the second search result included in the display of the second list of search results comprises receiving user input selecting the second search result to cause display of the second electronic content linked to by the second search result.

* * * * *